United States Patent
Goto et al.

(10) Patent No.: US 9,661,242 B2
(45) Date of Patent: May 23, 2017

(54) SOLID STATE IMAGING APPARATUS, SIGNAL READING METHOD, AND ELECTRONIC APPARATUS

(71) Applicant: Sony Corporation, Tokyo (JP)

(72) Inventors: Takayuki Goto, Tokyo (JP); Hiroaki Ebihara, Kanagawa (JP); Rei Yoshikawa, Kanagawa (JP); Koichi Okamoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 120 days.

(21) Appl. No.: 13/944,497

(22) Filed: Jul. 17, 2013

(65) Prior Publication Data

US 2014/0022427 A1    Jan. 23, 2014

(30) Foreign Application Priority Data

Jul. 23, 2012  (JP) ................. 2012-162688
Mar. 26, 2013  (JP) ................. 2013-064791
May 13, 2013  (JP) ................. 2013-101533

(51) Int. Cl.
| | | |
|---|---|---|
| *H04N 5/347* | (2011.01) | |
| *H04N 5/235* | (2006.01) | |
| *H04N 5/232* | (2006.01) | |
| *H04N 5/357* | (2011.01) | |
| *H04N 5/363* | (2011.01) | |
| *H04N 5/3745* | (2011.01) | |
| *H04N 5/378* | (2011.01) | |

(52) U.S. Cl.
CPC .......... *H04N 5/347* (2013.01); *H04N 5/2355* (2013.01); *H04N 5/23241* (2013.01); *H04N 5/3575* (2013.01); *H04N 5/363* (2013.01); *H04N 5/378* (2013.01); *H04N 5/3745* (2013.01)

(58) Field of Classification Search
CPC ............. H04N 5/23241; H04N 5/2355; H04N 5/3575; H04N 5/363; H04N 5/3745; H04N 5/37457; H04N 5/378; H04N 5/347
USPC ...... 348/294, 302, 308; 250/208.1; 257/291, 257/292, 294, 302, 308
See application file for complete search history.

(56) References Cited

U.S. PATENT DOCUMENTS

| | | | | |
|---|---|---|---|---|
| 6,452,153 B1 * | 9/2002 | Lauxtermann et al. | ... | 250/208.1 |
| 7,081,922 B2 * | 7/2006 | Mentzer | ...... | 348/230.1 |
| 7,777,171 B2 * | 8/2010 | Parks | ...... | 250/214.1 |
| 8,149,312 B2 * | 4/2012 | Kwon | ...... | H04N 5/335 |
| | | | | 257/445 |
| 8,735,795 B2 * | 5/2014 | Qiao | ...... | H04N 5/2351 |
| | | | | 250/208.1 |
| 2009/0084943 A1 | 4/2009 | Solhusvik et al. | | |
| 2012/0312964 A1 * | 12/2012 | Yamashita | ...... | H04N 5/37457 |
| | | | | 250/208.1 |

(Continued)

*Primary Examiner* — Lin Ye
*Assistant Examiner* — Chriss Yoder, III
(74) *Attorney, Agent, or Firm* — Chip Law Group

(57) ABSTRACT

There is provided a solid state imaging apparatus including a pixel array in which a plurality of unit pixels are arranged two-dimensionally. Each pixel includes a photoelectric conversion element, a transfer transistor which transfers a charge accumulated in the photoelectric conversion element to floating diffusion, a reset transistor which resets the charge of the floating diffusion, and an output transistor which outputs the charge of the floating diffusion. The floating diffusion of at least one of the plurality of unit pixels is electrically connected via the output transistor.

13 Claims, 39 Drawing Sheets

(56) References Cited

U.S. PATENT DOCUMENTS

2012/0327280 A1* 12/2012 Ishii .............................. 348/301

* cited by examiner

SOLID STATE IMAGING APPARATUS, SIGNAL READING METHOD, AND ELECTRONIC APPARATUS

BACKGROUND

The present disclosure relates to a solid state imaging apparatus, a signal reading method, and an electronic apparatus, and more specifically to a solid state imaging apparatus, a signal reading method, and an electronic apparatus which can perform illuminance detection and movement detection.

In the related art, while high resolutions and high frame rates may be required in the reading of signals in an image sensor, there are cases where low power consumption, high S/N (Signal to Noise Ratio), and wide dynamic ranges may not be particularly required, and conversely, while very low power consumption, high S/N and wide dynamic ranges may be required, there are cases where high resolutions and high frame rates are allowed for certain values.

In general, the former may be required when imaging a photographic subject by an imaging apparatus on which an image sensor is mounted.

On the other hand, image sensors of recent years also include a movement detection function which detects movement of the photographic subject, and an illuminance detection function which detects illuminance of the photographing environment, and the latter may be required when performing illuminance detection and movement detection.

For example, an image sensor has been provided, which detects illuminance by simultaneously reading the pixel values of all pixels of a pixel array, as an image sensor which includes an illuminance detection function (for example, US 2009/0084943A).

SUMMARY

In the case where there is a movement detection function in an image sensor, the pixel array is divided into a plurality of regions, and it may be necessary to read the pixel values in each of the regions. Further, in the case where there is an illuminance detection function in an image sensor, since a very wide dynamic range may be required, it is desirable to read the pixel values for each partial region obtained by dividing the pixel array into a plurality of regions, rather than for all the pixels collectively, and to perform a determination of whether or not the values for each partial region are saturated.

In a general illuminometer, averaged light enters a photodiode, even in the case where there is a distribution of illuminance in the photographing environment, by a light diffusion plate placed in front of the photodiode. On the other hand, a lens is placed in front of a photodiode in a camera module formed by combining an image sensor and a lens. In such a camera module, for example, a camera module using a fixed focal length lens such as a so-called sub-camera (also called an in-camera) included in a mobile phone, light sources are brought into focus which are in positions separated by a degree of separation of several tens of cm or more. Therefore, the illuminance of light entering the pixel array will have a large distribution, and a very wide dynamic range may be required in the image sensor.

However, in a system which reads signals from the reset transistors of pixels, such as in the technology of US 2009/0084943A, reading the signals from partial regions other than the outermost circumference will be difficult in the case where the pixel array is divided into a plurality of regions, and in reality, it may not be possible to divide into partial regions of 3×3 or more. That is, in the technology of the related art, detecting illuminance and movement for each partial region of an imaging region is not able to be performed, and more accurate illuminance detection is not able to be performed.

Further, in the case of the above described configuration, it may be necessary to include a switch for setting the power supply of the reset transistors of the pixels to a floating state. This has a disadvantage in that when this switch is made larger, the surface area increases and the chip size becomes larger, and when this switch is made smaller, the impedance of the power supply line increases and the image quality deteriorates.

The present disclosure is performed by considering such a situation, and can perform more accurate illuminance detection and movement detection.

According to a first embodiment of the present technology, there is provided a solid state imaging apparatus including a pixel array in which a plurality of unit pixels are arranged two-dimensionally. Each pixel includes a photoelectric conversion element, a transfer transistor which transfers a charge accumulated in the photoelectric conversion element to floating diffusion, a reset transistor which resets the charge of the floating diffusion, and an output transistor which outputs the charge of the floating diffusion. The floating diffusion of at least one of the plurality of unit pixels is electrically connected via the output transistor.

The solid state imaging apparatus may further include an addition node which adds the charge output from the output transistor of the at least one of the plurality of unit pixels, and an addition signal reading circuit which reads the charge added in the addition node as an addition signal.

The addition node may add the charges output from the output transistors of all the unit pixels in the pixel array.

The addition node may be provided for each pixel block which is a set of the unit pixels in each region of the pixel array, and adds the charge output from the output transistor of the unit pixels included in the pixel block.

Each unit pixel may further include an amplification transistor which outputs a signal corresponding to the charge of the floating diffusion. For each pixel block, the amplification transistor of a prescribed unit pixel included in the pixel block may output the addition signal to the addition signal reading circuit.

For the solid state imaging apparatus, a vertical signal line may be provided for each column of the unit pixels. For each pixel block, the amplification transistor of the prescribed unit pixel included in the pixel block may output the addition signal to the addition signal reading circuit via the vertical signal line.

Each unit pixel may further include a selection transistor which supplies an output of the amplification transistor to the vertical signal line. For each pixel block, the amplification transistor of the unit pixel including the selection transistor selected by a driving signal supplied to each row of the unit pixels may output the addition signal to the addition signal reading circuit via the vertical signal line.

The addition signal reading circuit may include an A/D convertor connected to the vertical signal line to which the addition signal for each pixel block is output, and a dummy load connected to the vertical signal line to which the addition signal for each pixel block is not output.

The addition signal reading circuit may include an A/D convertor for each column connected to the vertical signal line. For each pixel block, the addition signal may be output to the A/D convertor connected to the vertical signal line of a column selected by a column selection signal.

The solid state imaging apparatus may further include a substrate potential control circuit which applies a prescribed potential to a substrate on which the pixel array is formed. The substrate potential control circuit may apply a ground potential to the substrate at a time when performing a shutter operation which discharges the charge accumulated in the photoelectric conversion element, and applies a prescribed positive potential to the substrate at a time when performing an accumulation operation which accumulates the charge in the photoelectric conversion element.

The substrate potential control circuit may apply, after performing the accumulation operation, the ground potential to the substrate at a time when performing a pixel signal reading operation which reads the charge output from the unit pixel as a pixel signal.

According to the first embodiment of the present technology, there is provided a signal reading method of performed by a solid state imaging apparatus including a pixel array in which a plurality of unit pixels are arranged two-dimensionally. Each pixel includes a photoelectric conversion element, a transfer transistor which transfers a charge accumulated in the photoelectric conversion element to floating diffusion, a reset transistor which resets the charge of the floating diffusion, and an output transistor which outputs the charge of the floating diffusion. The floating diffusion of at least one of the plurality of unit pixels is electrically connected via the output transistor. The signal reading method includes reading an addition signal to which the charge output from the output transistor of the at least one of the plurality of unit pixels is added.

According to the first embodiment of the present technology, there is provided an electronic apparatus including a solid state imaging apparatus including a pixel array in which a plurality of unit pixels are arranged two-dimensionally. Each pixel includes a photoelectric conversion element, a transfer transistor which transfers a charge accumulated in the photoelectric conversion element to floating diffusion, a reset transistor which resets the charge of the floating diffusion, and an output transistor which outputs the charge of the floating diffusion. The floating diffusion of at least one of the plurality of unit pixels is electrically connected via the output transistor.

According to a second embodiment of the present technology, there is provided a solid state imaging apparatus including a pixel array in which a plurality of unit pixels are arranged two-dimensionally. Each pixel outputs a signal corresponding to a charge accumulated in a photoelectric conversion element. The solid state imaging apparatus further includes a vertical signal line formed for each column of the unit pixels, and an addition signal reading circuit which reads an addition signal by adding the signal output to the vertical signal line of a prescribed column of the unit pixels. The addition signal reading circuit includes capacitive elements provided corresponding to the prescribed columns, and an end of each of the capacitive elements is connected to the vertical signal line, and an output circuit which is connected to another end of each of the capacitive elements and which adds and outputs the signal output to the vertical signal line.

The addition signal reading circuit may further include a switch which electrically connects the vertical signal line and the capacitive element.

The solid state imaging apparatus may further include an addition node which adds the signals output from a pixel block which is a set of the unit pixels. The addition signal reading circuit may include a plurality of the output circuits which add and output the signals from the addition node output to the vertical signal lines for each of a plurality of columns.

According to a third embodiment of the present technology, there is provided a solid state imaging apparatus including a pixel array in which a plurality of unit pixels are arranged two-dimensionally, wherein each pixel includes a photoelectric conversion element, a transfer transistor which transfers a charge accumulated in the photoelectric conversion element to floating diffusion, a reset transistor which resets the charge of the floating diffusion, and an amplification transistor which outputs a signal corresponding to the charge of the floating diffusion, and a reading circuit which reads addition signals to which charges are added which are output via power supply wiring connected to drains of the reset transistors of the unit pixels arranged in a prescribed region of the pixel array. The power supply wiring is formed by electrically separating an effective pixel region in which the unit pixels are arranged as effective pixels, and an optical black region in which the unit pixels are arranged as optical black pixels. The reading circuit reads each of the addition signals of the effective pixel region and the addition signals of the optical black region.

The solid state imaging apparatus may further include a vertical signal line formed for each column of the unit pixels, and a load MOS (Metal Oxide Semiconductor) which is connected to the vertical signal line and which constitutes the amplification transistor and a source follower circuit The load MOS may be turned off at a time when the reading circuit reads the addition signal.

The solid state imaging apparatus may further include a first transistor which connects the power supply wiring of the effective pixel region to a power supply, and a second transistor which connects the power supply wiring of the optical black region to the power supply. The second transistor may be configured so that a junction capacity is smaller than that of the first transistor.

The power supply wiring of the effective pixel region may be configured so that a wiring layout is different from that of the power supply wiring of the optical black region.

In an embodiment of the present disclosure, the floating diffusion of at least one of the plurality of unit pixels is electrically connected via the output transistors.

In a second embodiment of the present disclosure, signals output to the vertical signal lines of prescribed columns of the unit pixels are added together.

In a third embodiment of the present disclosure, power supply wiring is formed by electrically separating an effective pixel region, in which unit pixels are arranged as effective pixels, and an optical black region, in which unit pixels are arranged as optical black pixels, and both the addition signals of the effective pixel region and the addition signals of the optical black region are read.

According to the first to the third embodiments of the present disclosure, it becomes possible to perform more accurate illuminance detection and movement detection.

DETAILED DESCRIPTION OF THE EMBODIMENT(S)

Figure 1:
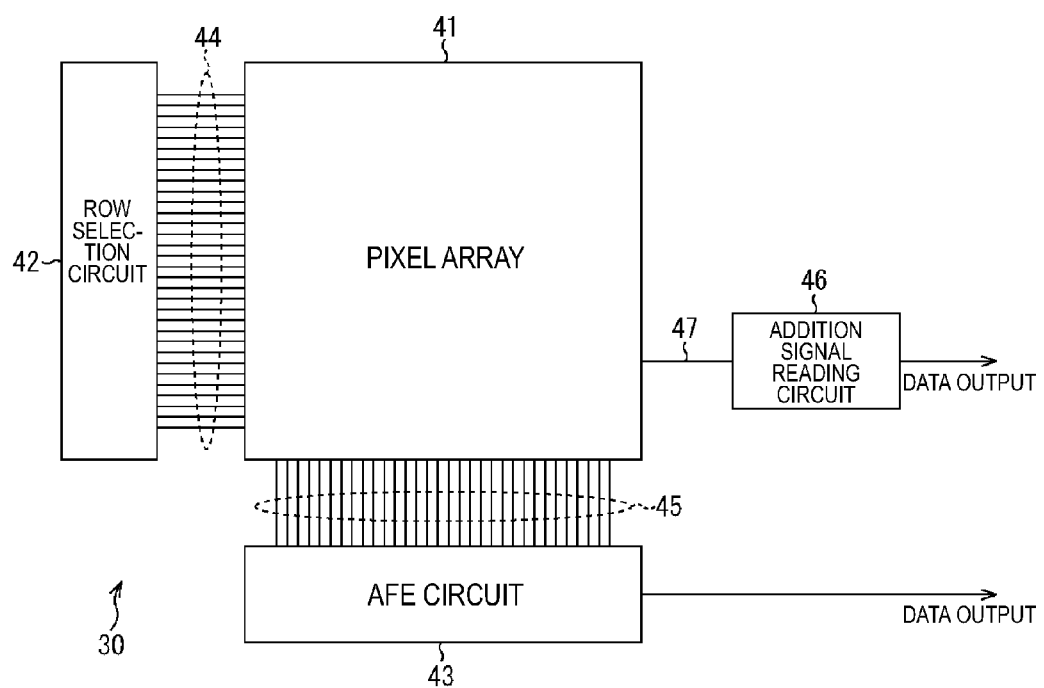
FIG. 1 is a figure which shows a configuration example for a first embodiment of a CMOS image sensor applicable to the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

[First Embodiment of a CMOS Image Sensor Applicable to the Present Disclosure]

FIG. 1 is a figure which shows a configuration example of a CMOS (Complementary Metal Oxide Semiconductor) image sensor as a solid state imaging apparatus applicable to the present disclosure.

The CMOS image sensor 30 includes a pixel array 41, a row selection circuit 42, an AFE (Analog Front End) circuit 43, pixel driving lines 44, vertical signal lines 45, an addition signal reading circuit 46, and an addition node 47. All the pixel array 41 through to the addition node 47 are formed on a semiconductor substrate (chip), which is not shown in the figure.

Unit pixels (the unit pixel 50 of FIG. 2) having a photoelectric conversion element, which generates an optical charge of a charge amount corresponding to an amount of incident light and accumulates the optical charge internally, are arranged two-dimensionally in the pixel array 41. Note that hereinafter, there will also be cases where the optical charge of a charge amount corresponding to an amount of incident light is imply called the "charge", and the unit pixels are simply called the "pixels".

The pixel driving lines 44 are formed in the pixel array 41 along a left-right direction of the figure for each row (an array direction of pixels for the pixel rows), and the vertical signal lines 45 are formed in the pixel array 41 along an up-down direction of the figure for each column (an array direction of pixels for the pixel columns), in accordance with a matrix shaped pixel array. One end of the pixel driving lines 44 are connected to the output ends corresponding to each row of the row selection circuit 42.

The row selection circuit 42 simultaneously drives all the pixels, or drives each pixel by row units or the like, by supplying a driving signal for each pixel of the pixel array 41.

The pixel signals output from each unit pixel of the pixel rows selected by the driving signal supplied from the row selection circuit 42 are supplied to the AFE circuit 43 via the respective vertical signal lines 45.

The AFE circuit 43 performs, for each pixel column of the pixel array 41, a prescribed signal process for the pixel signals output via the vertical signal lines 45 from each unit pixel of the selected rows, and temporarily holds the pixel signals after signal processing. Specifically, the AFE circuit 43 performs a CDS (Correlated Double Sampling) process and A/D (Analog to Digital) conversion for the pixel signals output via the vertical signal lines 45.

Further, the pixel signals output from each unit pixel selected by the driving signal supplied from the row selection circuit 42 are also supplied to the addition signal reading circuit 46 via the addition node 47.

The addition signal reading circuit 46 performs A/D conversion for the pixel signals from each unit pixel added in the addition node 47. Note that the addition signal reading circuit 46 may also perform a CDS process.

The addition node 47 adds the pixel signals output from each unit pixel, and supplies the added pixel signals to the addition signal reading circuit 46 as an addition signal.

In addition, the CMOS image sensor 30 may also include a signal processing section which performs various signal processes such as an addition process or the like for the pixel signals output from the AFE circuit 43, and a data storage section which temporarily holds the data necessary for the signal processes by the signal processing section. Note that the signal processing section and the data storage section may be included on a separate substrate than that of the CMOS image sensor 30, or may be mounted on the same substrate as that of the CMOS image sensor 30.

[Circuit Configuration Example of the Unit Pixels]

Next, a circuit configuration example of each of the unit pixels 50 arranged in a matrix shape in the pixel array 41 of FIG. 1 will be described with reference to FIG. 2.

Figure 2:
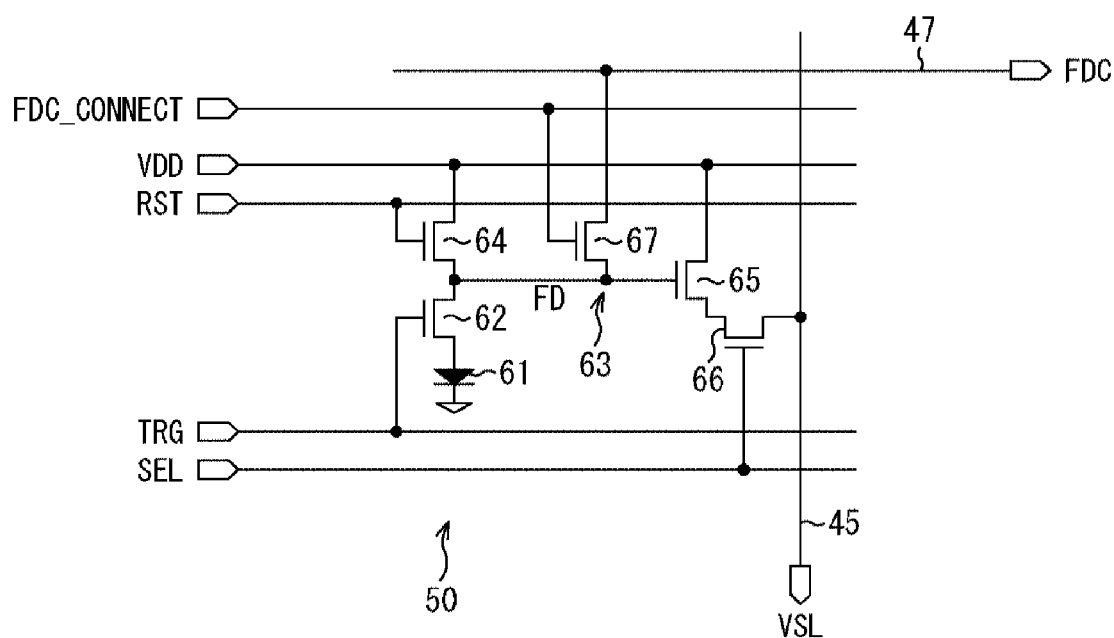
FIG. 2 is a figure which shows a configuration example of a unit pixel.

The unit pixel 50 of FIG. 2 includes a photodiode 61, a transfer transistor 62, floating diffusion (FD) 63, a reset transistor 64, an amplification transistor 65, a selection transistor 66, and an output transistor 67.

The cathode of the photodiode 61 is connected to a standard potential, and the anode of the photodiode 61 is connected to the source of the transfer transistor 62. The drain of the transfer transistor 62 is connected to each of the drain of the reset transistor 64, the gate of the amplification transistor 65, and the source of the output transistor 67, and this connection point constitutes the floating diffusion 63.

The source of the reset transistor 64 is connected to a prescribed power supply VDD, and the source of the amplification transistor 65 is also connected to the prescribed power supply VDD. The drain of the amplification transistor 65 is connected to the source of the selection transistor 66, and the drain of the selection transistor 66 is connected to a vertical signal line 45 (VSL). Further, the vertical signal line 45 is connected to the amplification transistor 65 and a constant current source which constitutes a source follower circuit.

In addition, the drain of the output transistor 67 is connected to the addition node 47 (FDC).

The gates of each of the transfer transistor 62, the reset transistor 64, the selection transistor 66, and the output transistor 67 are connected to the row selection circuit 42 of FIG. 1, via the pixel driving line 44, and are supplied with driving signals TRG, RST, SEL, FDC_CONNECT, respectively.

The photodiode 61 performs photoelectric conversion of incident light, and generates and accumulates a charge corresponding to this amount of light.

The transfer transistor 62 turns the transfer of the charge from the photodiode 61 to the floating diffusion 63 on/off, in accordance with the driving signal TRG supplied from the row selection circuit 42. For example, when an H (High) level driving signal TRG is supplied, the transfer transistor 62 transfers the charge accumulated in the photodiode 61 to the floating diffusion 63, and when an L (Low) level driving signal TRG is supplied, the transfer transistor 62 stops the transfer of the charge. Note that the charge to which the photodiode 61 has performed photoelectric conversion is accumulated in the photodiode 61 while the transfer transistor 62 stops the transfer of the charge to the floating diffusion 63.

The floating diffusion 63 accumulates the charge transferred from the photodiode 61 via the transfer transistor 62, and converts the charge into a voltage.

The reset transistor 64 turns the discharge of the charge accumulated in the floating diffusion 63 on/off, in accordance with the driving signal RST supplied from the row selection circuit 42. For example, when an H level driving signal RST is supplied, the reset transistor 64 clamps the floating diffusion 63 to the power supply VDD voltage, and discharges (resets) the charge accumulated in the floating diffusion 63. Further, when an L level driving signal RST is supplied, the reset transistor 64 electrically floats the floating diffusion 63.

The amplification transistor 65 amplifies the voltage corresponding to the charge accumulated in the floating diffusion 63. The voltage (voltage signal) amplified by the amplification transistor 65 is output to the vertical signal line 45 via the selection transistor 66.

The selection transistor 66 turns the output of the voltage signal from the amplification transistor 65 to the vertical signal line 45 on/off, in accordance with the driving signal SEL supplied from the row selection circuit 42. For example, when an H level driving signal SEL is supplied, the selection transistor 66 outputs the voltage signal to the vertical signal line 45, and when an L level driving signal SEL is supplied, the selection transistor 66 stops the output of the voltage signal.

The output transistor 67 turns the output of the charge accumulated in the floating diffusion 63 on/off, in accordance with the driving signal FDC_CONNECT supplied from the row selection circuit 42. For example, when a H level driving signal FDC_CONNECT is supplied, the floating diffusion 63 and the addition node 47 are electrically connected, and the output transistor 67 outputs the charge accumulated in the floating diffusion 63 to the addition node 47.

In this way, the unit pixel 50 is driven in accordance with the driving signals TRG, RST, SEL, and FDC_CONNECT supplied from the row selection circuit 42.

[Circuit Configuration Example of the Pixel Array]

Next, a circuit configuration example of the pixel array 41, in which the unit pixels 50 of FIG. 2 are arranged in a matrix shape, will be described with reference to FIG. 3. Note that since the configuration of each of the unit pixels 50 has been described with reference to FIG. 2, a description of them will be omitted.

Figure 3:
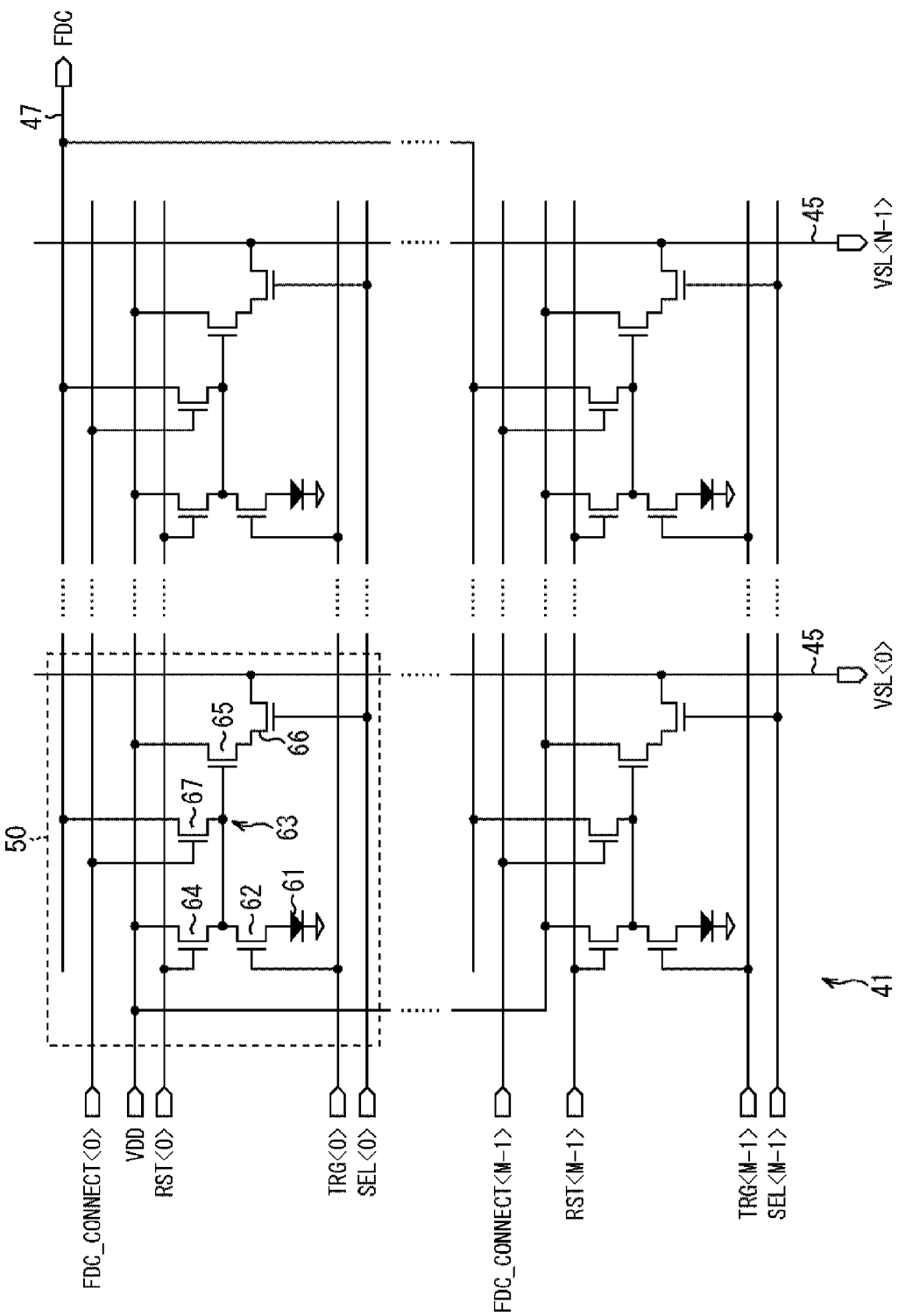
FIG. 3 is a figure which shows a configuration example of a pixel array.

The pixel array 41 of FIG. 3 includes M number of unit pixels 50 arranged in a row direction, and N number of unit pixels 50 arranged in a column direction.

Here, the row numbers of the rows in which the unit pixels 50 are arranged are set as 0, 1, 2, . . . , M−1 in this sequence from the top, and the column numbers of the columns in which the unit pixels 50 are arranged are set as 0, 1, 2, ..., N−1 in this sequence from the top, and this will be followed hereinafter.

Further, the driving signals supplied to each unit pixel 50 of the pixel row with the row number m are each represented as TRG<m>, RST<m>, SEL<m>, FDC_CONNECT<m> and the like, and the vertical signal line 45 which corresponds to the pixel column with the column number n and the signals thereto output are represented as VSL<n> and the like. That is, for example, the driving signals supplied to each unit pixel 50 of the pixel row with the row number 0 are each represented as TRG<0>, RST<0>, SEL<0>, FDC_CONNECT<0> and the like, and the vertical signal line 45 which corresponds to the pixel column with the column number 0 and the signals thereto output are represented as VSL<0> and the like. Further, the addition node 47 and the addition signal thereto output are arbitrary represented as FDC. Note that the power supply VDD voltage is similarly supplied for all the unit pixels 50.

Further, in the pixel array 41 of FIG. 3, the drains of the output transistors 67 of each unit pixel 50 are connected to the addition node 47. That is, the floating diffusions 63 of each unit pixel 50 are all electrically connected via the output transistors 67.

In this way, an addition signal, to which the charges of the floating diffusions 63 of all the unit pixels 50 in the pixel array 41 have been added, is read to the addition signal reading circuit 46 via the addition node 47.

[Reading of the Addition Signals]

Accordingly, an operation example of the unit pixels 50 in the reading of the addition signals will be described with reference to the timing chart of FIG. 4.

Figure 4:
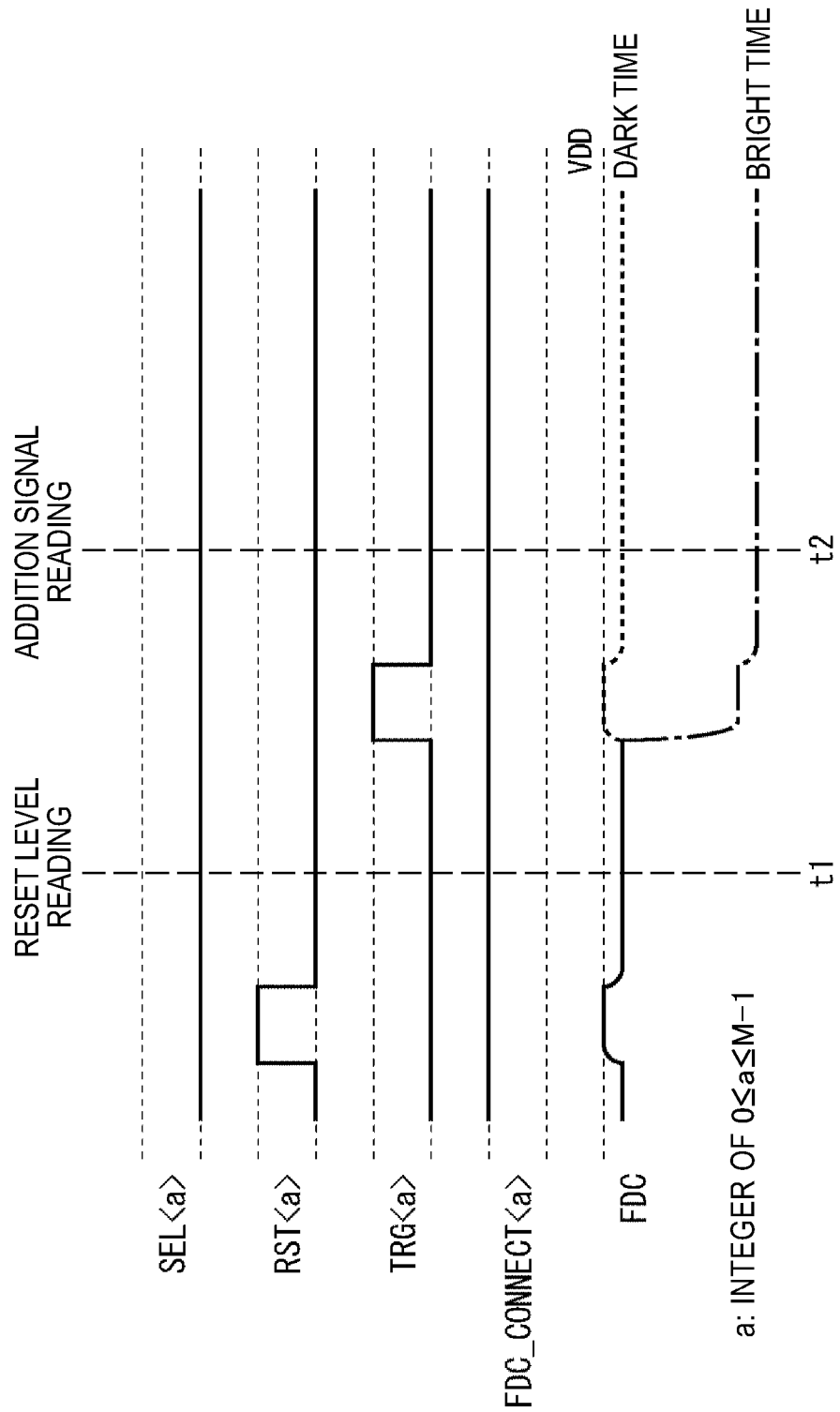
FIG. 4 is a timing chart which describes the reading of addition signals.

Note that FIG. 4 shows the signal levels of the driving signals SEL<a>, RST<a>, TRG<a>, and FDC_CONNECT<a> supplied to each unit pixel 50 of the pixel rows with a row number a (a: an integer of 0 through to M−1), that is, to all the pixel rows; and the signal level of the addition node FDC.

In the reading of the addition signals, the driving signal FDC_CONNECT<a> supplied to each unit pixel 50 of all the pixel rows is ordinarily set to an H level. In this way, an addition signal FDC, to which the charges accumulated in the floating diffusions 63 of all the unit pixels 50 have been added, can be read.

When the driving signal RST<a> is applied in a pulse shape, the charges accumulated in the floating diffusions 63 are discharged (reset). In this way, at a time t1, the reset level of the addition node FDC is read.

When the driving signal TRG<a> is applied, in the period from the time t1 through to a time t2, the charges accumulated in the photodiodes 61 are transferred to the floating diffusions 63 by the transfer transistors 62. In this way, at the time t2, the signal level of the addition node FDC is read.

In the case where a photographing environment in which the CMOS image sensor 30 is placed is dark, the signal level of the addition node FDC (the addition signal FDC) read at the time t2 becomes a level approximately the same as that of the reset level, as shown by the dashed line of FIG. 4, since there are no significant charges accumulated in the photodiodes 61. Further, in the case where a photographing environment is bright, the addition signal FDC becomes a level different from that of the reset level, as shown by the long-dashed/short-dashed line of FIG. 4, since corresponding charges are accumulated in the photodiodes 61.

In this way, an addition signal in which noise is removed is output by performing a CDS process, which removes noise by taking the difference between the read reset level and the addition signal.

According to the above described operation, since it may not be necessary to perform an A/D conversion or a CDS process for each column, when reading an addition signal to which the signals of all unit pixels 50 have been added, it becomes possible to suppress power consumption in the case of performing illuminance detection and movement detection of all the imaging regions.

While the above described operation is applied in the case of performing illuminance detection of all the imaging regions using the CMOS image sensor 30, in the case of performing imaging of a photographic subject using the CMOS image sensor 30, the pixel signals are read for each row.

[Reading of the Pixel Signals for Each Row]

Here, an operation example of the unit pixels 50, with regards to the reading of the pixel signals for each row, of the CMOS image sensor 30 will be described with reference to the timing chart of FIG. 5.

Figure 5:
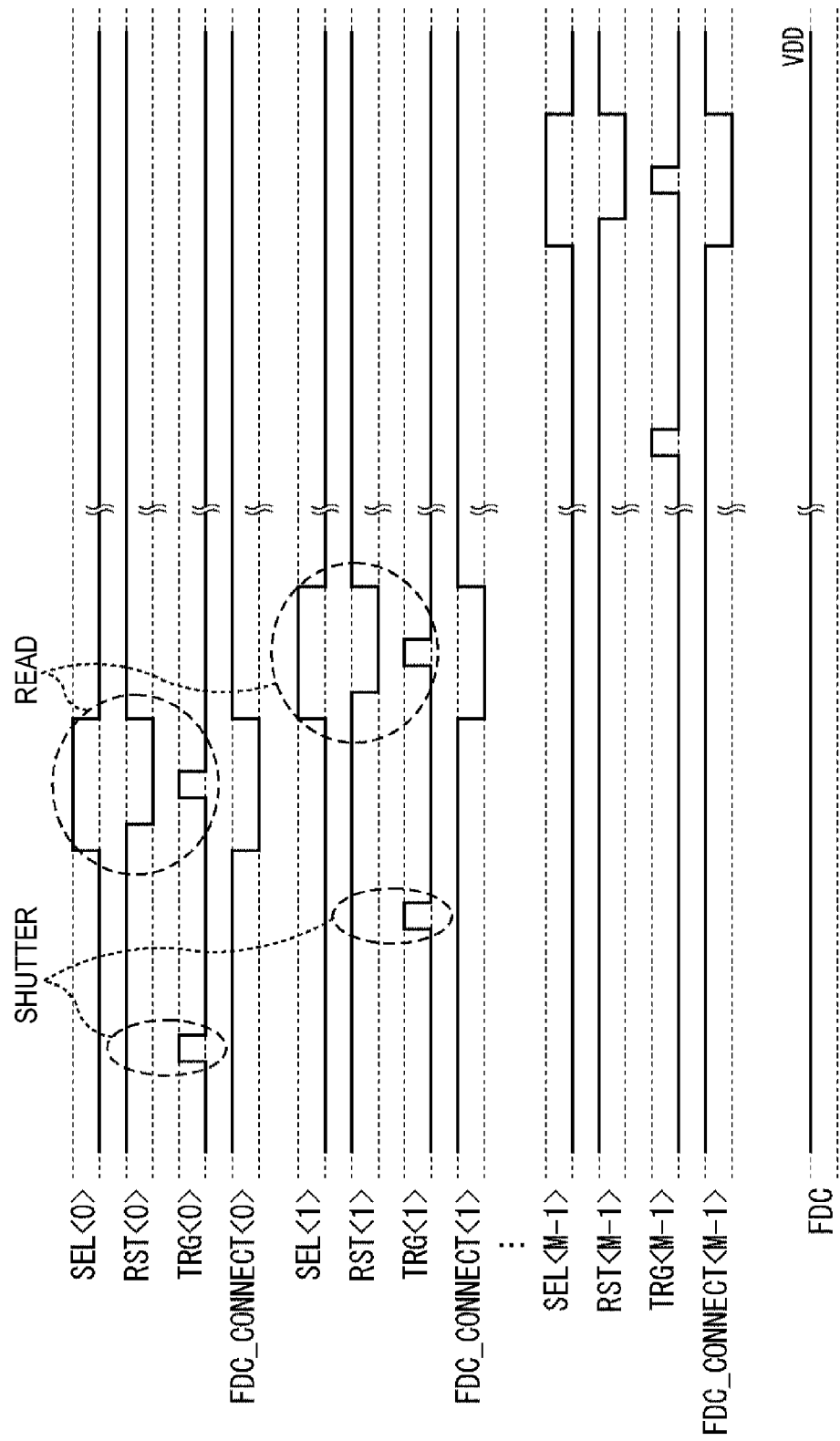
FIG. 5 is a timing chart which describes the reading of pixel signals for each row.

FIG. 5 shows the signal levels of the driving signals SEL<0>, RST<0>, TRG<0>, and FDC_CONNECT<0> supplied to the pixel row with the row number 0; the signal levels of the driving signals SEL<1>, RST<1>, TRG<1>, and FDC_CONNECT<1> supplied to the pixel row with the row number 1; ...; the signal levels of the driving signals SEL<M−1>, RST<M−1>, TRG<M−1>, and FDC_CONNECT<M−1> supplied to the pixel row with the row number M−1; and the signal level of the addition node FDC.

When focusing on each unit pixel 50 of the pixel row with the row number 0, first a shutter operation is performed, with the driving signals RST<0> and FDC_CONNECT<0> in an H level state, by the driving signal TRG<0> being applied in a pulse shape.

Afterwards, the driving signal SEL<0> is set to an H level from an L level, and a read operation (reading) is performed, with the driving signal RST<0> in a state set to an L level from an H level, by the driving signal TRG<0> being applied in a pulse shape. Here, the driving signal SEL<0> is set to an H level from an L level, and the driving signal FDC_CONNECT<0> is set to an L level from an H level. In this way, the reading of the pixel signals for the pixel row with the row number 0 is performed.

Then, the reading of the pixel signals for each of the pixel rows is performed by an operation such as described above being sequentially performed for each of the pixel rows.

Note that, in FIG. 5, when the driving signal FDC_CONNECT of the reading row to which reading is performed, from among the driving signals FDC_CONNECT of each pixel row, is set to an L level, the driving signals FDC_CONNECT of the other rows are set to an H level. Further, the driving signals RST of the rows other than the reading row are set to an L level, and the floating diffusions 63 of the rows other than the reading row are fixed to the power supply VDD voltage.

Here, in the case where the driving signals FDC_CONNECT of the rows other than the reading row are also set to an L level, the addition node FDC becomes a floating state, this signal level is decreased, and there is a possibility that a charge may leak from the floating diffusions 63 of the reading row to the addition node FDC.

Further, in the case where the addition node FDC is in a floating state, the voltage of the addition node FDC will change due to coupling, at the time when the voltages of the floating diffusions 63 are significantly changed by reading the signals from the pixels of regions in which a bright environment is imaged in the pixel array. In this way, the voltages of the floating diffusions 63 of the pixels of regions in which a dark environment is imaged in the pixel array will also change, and there is a possibility that signals will propagate between the floating diffusions 63 of different pixels.

Accordingly, as described above, the addition node FDC is ordinarily fixed to the power supply VDD voltage via the output transistors 67 and reset transistors 64 of the rows other than the reading row, by setting the driving signals FDC_CONNECT and the driving signals RST of the other rows to an H level, and a charge leaking from the floating diffusions 63 of the reading row to the addition node FDC can be prevented.

Further, a reset transistor for fixing this signal level may be included in the addition node FDC. When performing reading for each row, the driving signals FDC_CONNECT of all the rows can be set to an L level, by ordinarily turning this reset transistor to on. Note that when performing reading of an addition signal, this reset transistor can be turned off.

Incidentally, as shown in FIG. 4, in the cases where a photographing environment in which the CMOS image sensor 30 is placed is bright or dark, the voltages of the floating diffusions 63 of each unit pixel 50, that is, the addition signal FDC, will be different. In this case, when the gate capacities of the amplification transistors 65 and the source capacities or drain capacities of the output transistors 67 change, the conversion efficiency also changes, and linearity of the output values will collapse for the signal amount.

For example, if the amplification transistors 65 are depression type transistors, and if there is an operation in a strong inversion region, even in the case where an addition signal is read and the potential of the floating diffusions 63 are lowered, the gate capacities of the amplification transistors 65 will be almost the same. However, if the amplification transistors 65 are operated in the strong inversion region in the case where the reset level is read, and if the amplification transistors 65 are operated in an accumulation region in the case where the addition signals are read in a state where the photographing environment is bright (of a bright time), the gate capacities of the amplification transistors 65 in the respective cases will be different.

Accordingly, in the case where a signal for a range of levels of the addition signal for a bright time is read from the reset level, by a threshold voltage Vth of the amplification transistors 65, the reset level is adjusted, such as by ordinarily operating in the strong inversion region or by ordinarily operating in the accumulation region. In this way, the linearity of the output values can be maintained for the signal amount.

Further, in the case where the amplification transistors 65 are not depression type transistors and operate in the accumulation region, when the selection transistors 66 are turned off, the source of the amplification transistors 65 will become a floating state. In this case, while the potential of the source of the amplification transistors 65 is lowered when the potential of the floating diffusions 63 is lowered by reading an addition signal, this potential gradually changes due to a leaking current as time passes, and this becomes a cause of the change of the conversion efficiency.

Figure 6:
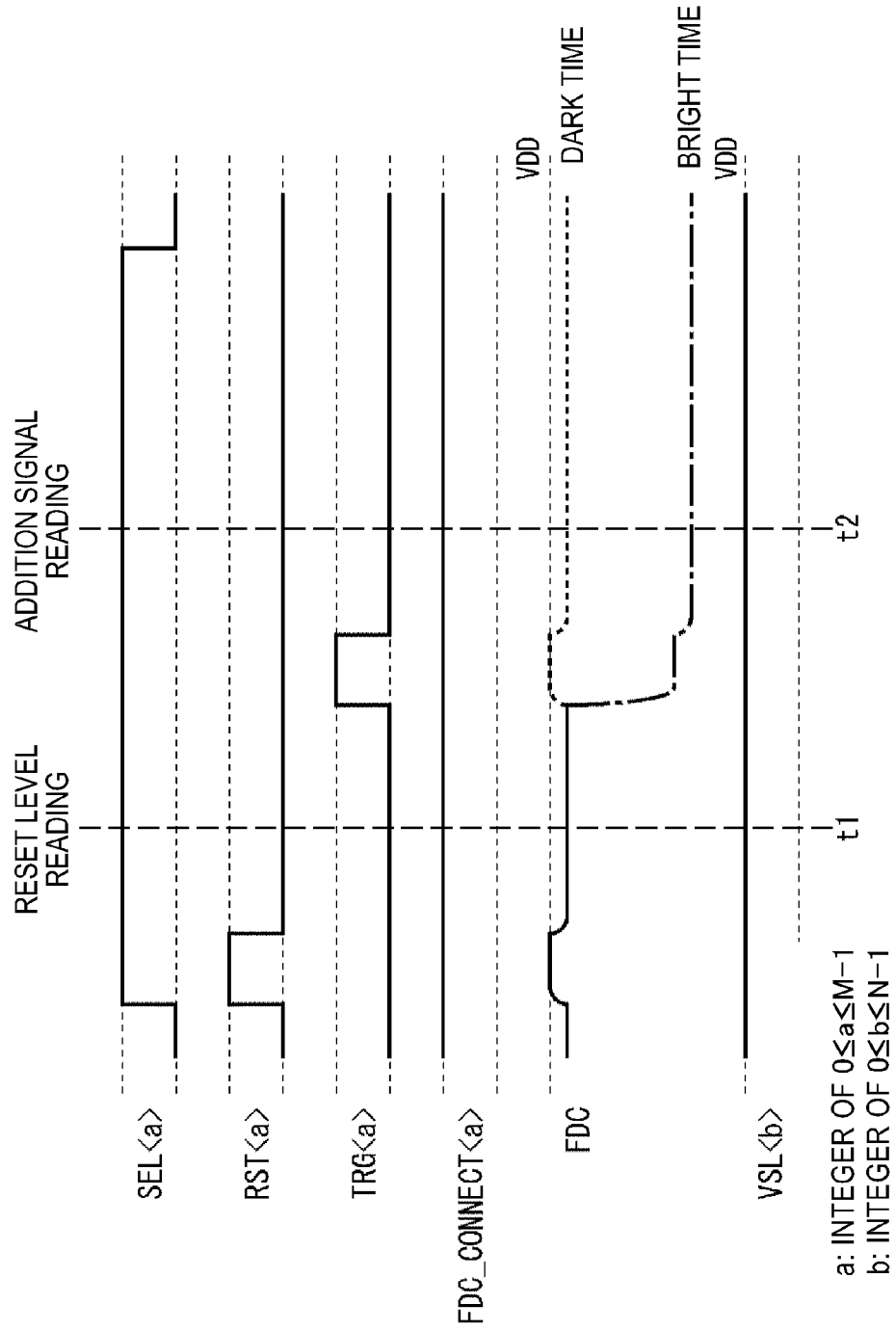
FIG. 6 is a timing chart which describes the reading of addition signals.

Accordingly, as shown in the timing chart of FIG. 6, the potential of the vertical signal line VSL<b> (b: an integer of 0 through to N−1), that is, the vertical signal lines 45 of all the pixel columns, is fixed to the power supply VDD voltage, and the selection transistors 66 are set to a conduction state (the driving signal SEL<a> is set to an H level). In this way, since the potential of the source of the amplification transistors 65 can be prevented from changing due to a leaking current, a change of the conversion efficiency can be suppressed, and consequently, the linearity of the output values can be maintained for the signal amount.

In addition, when operating in a strong inversion region when reading the reset level for the output transistors 67, the capacity values seen from the side of the floating diffusions 63 change due to the signal amount, and this causes a change of the conversion efficiency. On the other hand, an appropriate bias voltage is supplied here by lowering this threshold voltage Vth, or by separating the drains of the reset transistors 64 from the power supply VDD voltage. In this way, when the charges of the floating diffusions 63 of each unit pixel 50 are added, the output transistors 67 operate in the strong inversion region even if the voltages of the floating diffusions 63 (that is, the addition signal FDC) are at a reset level (VDD), and the source capacities or drain capacities of the output transistors 67 do not change, even in the case where the potential of the floating diffusions 63 is lowered by reading an addition signal. In this way, the linearity of the output values can be maintained for the signal amount.

[Second Embodiment of a CMOS Image Sensor Applicable to the Present Disclosure]

Figure 7:
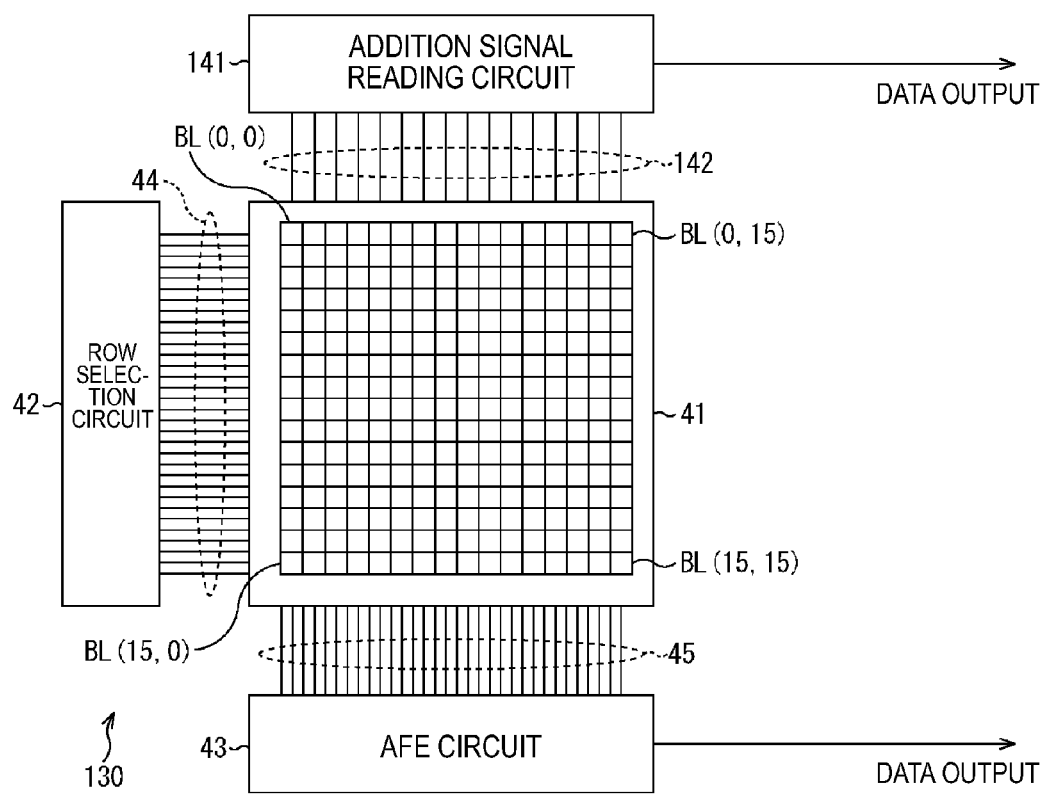
FIG. 7 is a figure which shows a configuration example for a second embodiment of a CMOS image sensor applicable to the present disclosure.

FIG. 7 is a figure which shows a configuration example for a second embodiment of a CMOS image sensor applicable to the present disclosure.

The CMOS image sensor 130 of FIG. 7 includes a pixel array 41, a row selection circuit 42, an AFE circuit 43, pixel driving lines 44, vertical signal lines 45, an addition signal reading circuit 141, and vertical signal lines 142. Note that in FIG. 7 the same reference numerals are attached to parts having functions the same as those of the CMOS image sensor 30 of FIG. 1, and a description of these parts will be arbitrary omitted.

Note that in the CMOS image sensor 130 of FIG. 7, the region of the pixel array 41 in which the pixels are arranged in a matrix shape is divided into regions of 16×16. Hereinafter, a set of the unit pixels 50 in each of the regions will be called a pixel block BL, and will be represented as a pixel block BL (s,t) in accordance with this position. Note that s represents the row of the pixel block, and is set to an integer of 0 through to 15. Further, t represents the column of the pixel block, and is set to an integer of 0 through to 15. In addition, in order for simplicity, the row number M and the column number N are each a multiple of 16.

The addition signal reading circuit 141 performs, for each column of the pixel blocks BL of the pixel array 41, A/D conversion and a CDS process for the pixel signals output via the vertical signal lines 142 from prescribed unit pixels included in the pixel blocks BL.

The vertical signal lines 142 are formed for at least each column of the pixel blocks BL, that is, for at least 16 lines. Note that the vertical signal lines 142 may be formed for each pixel column similar to the vertical signal lines 45, or may be formed by sharing with the vertical signal lines 45.

[Circuit Configuration Example of the Pixel Array, the AFE Circuit, and the Addition Signal Reading Circuit]

Next, a circuit configuration example of the pixel array 41, the AFE circuit 43, and the addition signal reading circuit 141 will be described with reference to FIG. 8.

Figure 8:
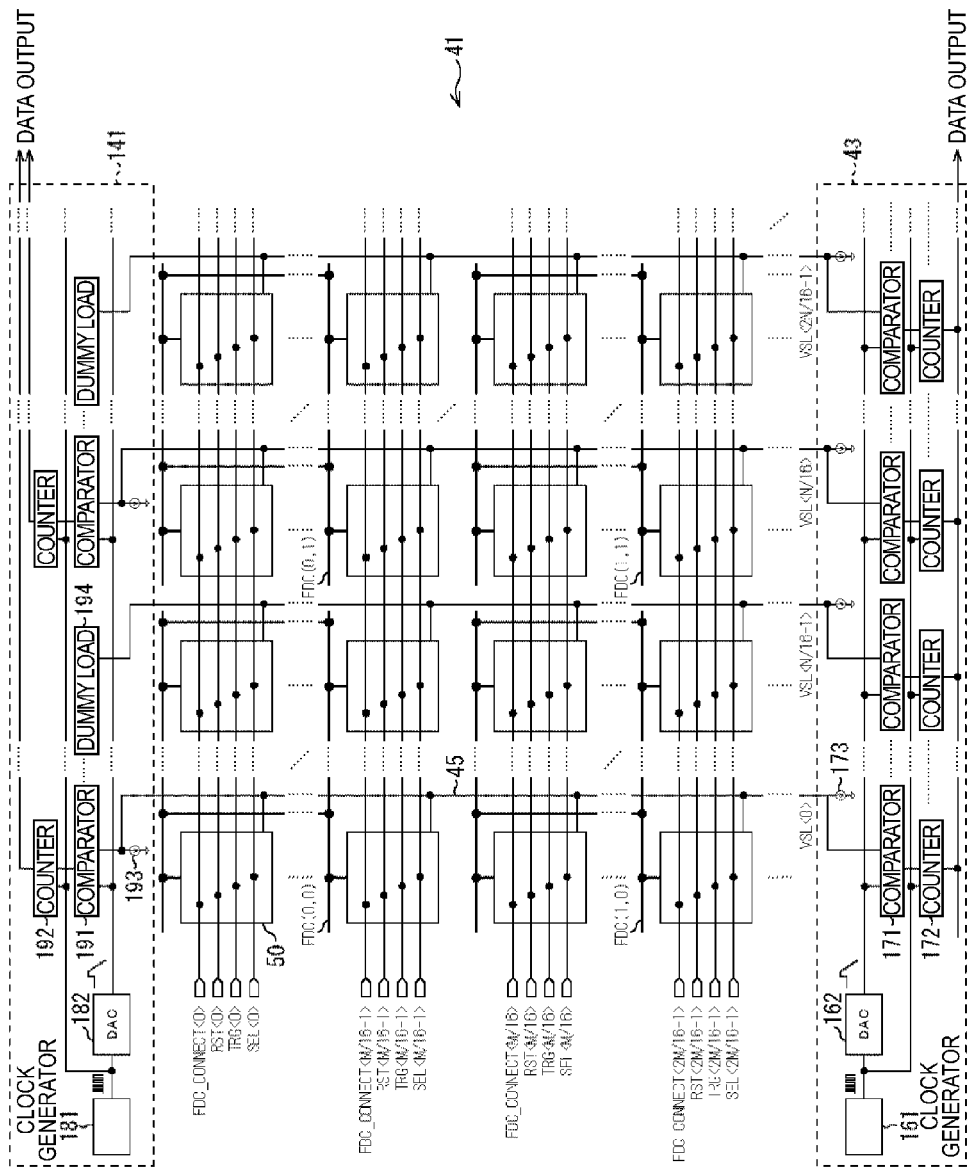
FIG. 8 is a figure which shows a configuration example of a pixel array, an AFE circuit, and an addition signal reading circuit.

While the unit pixels 50 are arbitrarily omitted in the pixel array 41 of FIG. 8, the four top left unit pixels 50 are included in a pixel block BL (0,0), and the four bottom left unit pixels 50 are included in a pixel block BL (1,0). Further, the four top right unit pixels are included in a pixel block BL (0,1), and the four bottom right unit pixels are included in a pixel block BL (1,1).

An addition node FDC is included in each pixel block BL, and is represented as an addition node FDC (s,t) corresponding to the pixel block. That is, an addition node FDC (0,0) is included in the pixel block BL (0,0), an addition node FDC (1,0) is included in the pixel block BL (1,0), an addition node FDC ( 0,1) is included in the pixel block BL (0,1), and an addition node FDC (1,1) is included in the pixel block BL (1,1).

The addition node FDC is connected to the drain of the output transistors 67 of the unit pixels 50 included in each pixel block BL, and adds the charges output from the output transistors 67 of the unit pixels 50 for each pixel block BL. An addition signal, as the added charges, is output to the addition signal reading circuit 141, via the amplification transistor 65 and the vertical signal line 45 of a prescribed unit pixel 50 included in each pixel block BL. More specifically, an addition signal is output to the addition signal reading circuit 141, via the amplification transistor 65 and vertical signal line 45 of a unit pixel 50, from among prescribed unit pixels 50 included in each of the pixel blocks BL, by turning on the selection transistors 66 of the unit pixels 50 of a pixel row selected by the driving signal SEL.

Note that in FIG. 8, the vertical signal lines 142 described in FIG. 7 are formed by sharing with the vertical signal lines 45.

The AFE circuit 43 has a clock generator 161, and a DAC (Digital Analog Convertor) 162, and has a comparator 171, a counter 172, an amplification transistor 65, and a constant current source 173 constituting a source follower circuit included in each column.

The clock generator 161 generates a clock signal, and supplies the clock signal to the DAC 162 and to the counters 172 of each column.

The DAC 162 generates a reference voltage of a lamp waveform which changes with time and voltage value, based on the clock signal from the clock generator 161, and inputs the reference voltage to the comparators 171 of each column.

The comparator 171 compares the reference voltage input from the DAC 162 with the voltages of the analog signals (pixel signals) read via the vertical signal line 45, and supplies a comparison signal, which represents this comparison result, to the counter 172.

The counter 172 counts the clock signal from the clock generator 161, in accordance with the comparison signal supplied from the comparator 171, holds this count value, and outputs data (a pixel signal) corresponding to the count value as necessary.

In this way, the comparator 171 and the counter 172 are included in the AFE circuit 43 as a CDS circuit and A/D convertor for each pixel column.

The addition signal reading circuit 141 has a clock generator 181, a DAC 182, comparators 191, counters 192, constant current sources 193, and dummy loads 194.

Note that since the clock generator 181, the DAC 182, the comparators 191, the counters 192, and the constant current sources 193 in the addition signal reading circuit 141 have functions the same as each of the clock generator 161, the DAC 162, the comparators 171, the counters 172, and the constant current sources 173 in the AFE circuit 43, a description of them will be omitted.

In the addition signal reading circuit 141, a comparator 191, a counter 192, and a constant current source 193 are included in each column of the pixel blocks BL of the pixel array 41, and are connected to the vertical signal lines 45 to which the addition signals of each pixel block BL are output. That is, in the example of FIG. 8, 16 vertical signal lines VSL<0>, VSL<N/16>, . . . , and VSL<15N/16> corresponding to the columns of the left-most pixel columns included in each pixel block are connected to the comparators 191, counters 192, and constant current sources 193.

Further, a dummy loads 194 is connected to the vertical signal lines 45 to which the addition signals of the pixel blocks BL are not output. That is, in the example of FIG. 8, N−16 vertical signal lines other than VSL<0>, VSL<N/16>, . . . , and VSL<15N/16> corresponding to the columns of the left-most pixel column included in each pixel block are connected to the dummy loads 194.

In this way, by including the dummy loads 194, the load can be arranged in the vertical signal lines 45 to which the addition signals of the pixel blocks BL are output, and in the vertical signal lines 45 to which the addition signals of the pixel blocks BL are not output. In this way, dispersion of each column can be reduced for a settling time and a PSRR (Power Supply Rejection Ratio).

Note that it is possible for the addition signal reading circuit 141 to be constituted by using an A/D convertor, such as a flash type, successive comparison type, or a $\Delta\Sigma$ type.

[Reading of the Addition Signals]

Next, an operation example of the unit pixels 50, with regards to the reading of the addition signals, of the CMOS image sensor 130 will be described with reference to the timing chart of FIG. 9.

Figure 9:
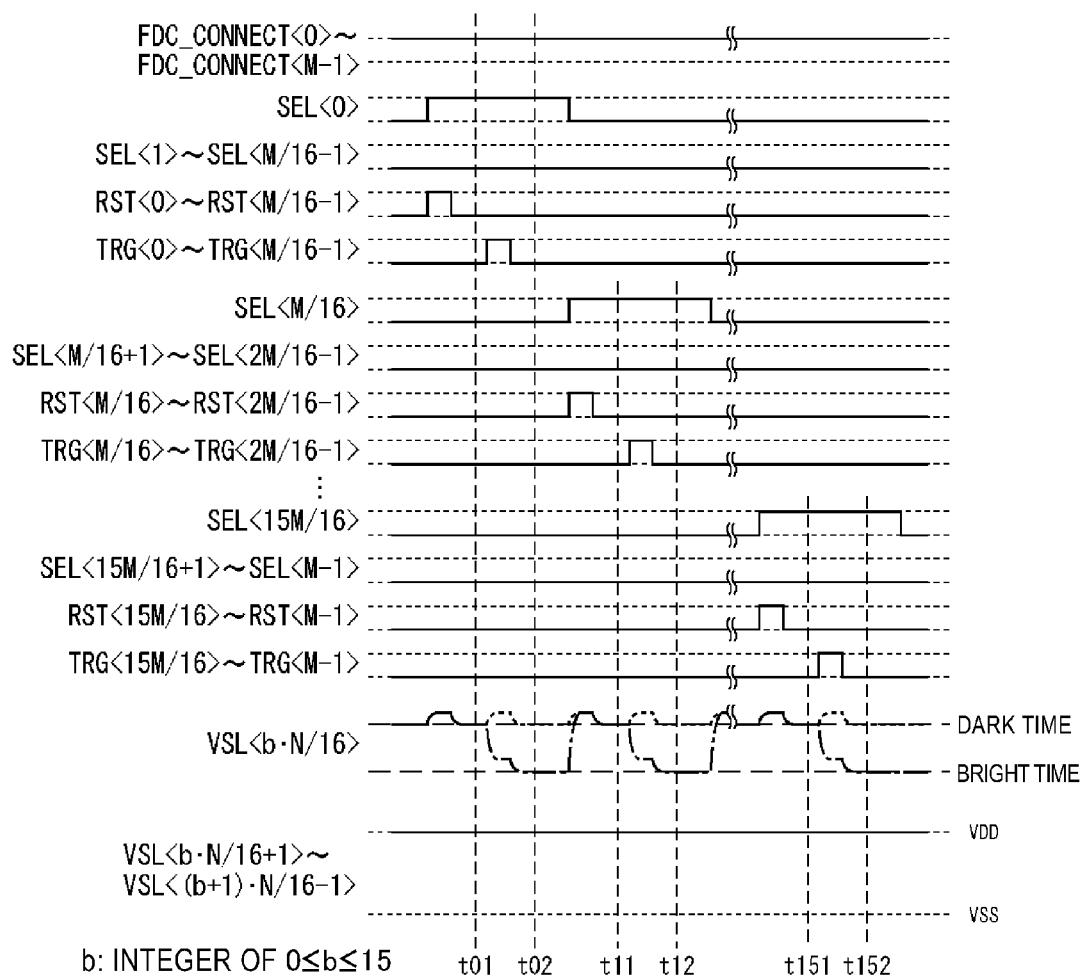
FIG. 9 is a timing chart which describes the reading of addition signals.

Note that FIG. 9 shows the signal levels of the driving signals FDC_CONNECT<0> through to FDC_CONNECT<M−1> supplied to the pixel rows with the row numbers 0 through to M−1, that is, to all the pixel rows; the signal levels of the driving signals SEL<0>, SEL<1> through to SEL<M/16−1>, RST<0> through to RST<M/16−1>, and TRG<0> through to TRG<M/16−1> supplied to the pixel rows included in the $0^{th}$ row of the pixel block BL; the signal levels of the driving signals SEL<M/16>, SEL<M/16+1> through to SEL<2M/16−1>, RST<M/16> through to RST<2M/16−1>, TRG<M/16> through to TRG<2M/16−1> supplied to the pixel rows included in the $1^{st}$ row of the pixel block BL; . . . ; the signal levels of the driving signals SEL<15M/16>, SEL<15M/16+1> through to SEL<M−1>, RST<15M/16> through to RST<M−1>, and TRG<15M/16> through to TRG<M−1> supplied to the pixel rows included in the $15^{th}$ row of the pixel block BL; and the signal levels of the vertical signal lines VSL<b*N/16>, and VSL<b*N/16+1> through to VSL<(b+1)*N/16−1> of the pixel columns with the column numbers b*N/16(0≤b≤15), and b*N/16+1 through to (b+1)*N/16−1.

Also here, in the reading of the addition signals, the driving signals FDC_CONNECT<0> through to FDC_CONNECT<M−1> supplied to each unit pixel 50 of all the pixel rows are ordinarily set to an H level.

When the driving signals RST<0> through to RST<M/16−1> are applied in a pulse shape and the charges accumulated in the floating diffusions 63 are discharged (reset), with the driving signal SEL<0> set to an H level, at a time t01, the reset levels of the addition nodes FDC (0,0) through to FDC (0,15) of the unit pixels 50 of each of the $0^{th}$ row pixel blocks BL (0,0) through to BL (0,15) are read via the vertical signal line VSL<b*N/16>.

When the driving signals TRG<0> through to TRG<M/16−1> are applied in a pulse shape, in the period from the time t01 through to a time t02, the charges accumulated in the photodiodes 61 are transferred to the floating diffusions 63 by the transfer transistors 62. Afterwards, at the time t02, the signal levels of the addition nodes FDC (0,0) of each of the $0^{th}$ row pixel blocks BL (0,0) through to BL (0,15) are read via the vertical signal line VSL<b*N/16>. In this way, the reading of the addition signals for each of the $0^{th}$ row pixel blocks BL (0,0) through to BL (0,15) is performed.

Then, the reading of the addition signals for each of the pixel block rows is performed by an operation such as described above being sequentially performed for each of the pixel block rows.

According to the above described operation, since an addition signal, to which the signals of the unit pixels 50 included in each pixel block BL are added, can be read for each pixel block BL, in the case where illuminance and movement are detected in a photography environment biased towards brightness, values can be provided for each imaging region, and more accurate illuminance detection and movement detection can be performed.

Further, in the reading of the addition signals, since performing A/D conversion or a CDS process for each column may not be necessary for the vertical signal lines VSL<b*N/16+1> through to VSL<(b+1)*N/16−1> to which an addition signal is not output, it becomes possible to further suppress the power consumption.

Note that, as shown in the timing chart of FIG. 9, the potentials of the vertical signal lines VSL<b*N/16+1> through to VSL<(b+1)*N/16−1> to which an addition signal is not output are fixed to the power supply VDD voltage. In this way, the potential of the source of the amplification transistors 65 can be prevented from changing due to a leaking current, a change of the conversion efficiency can be suppressed, and consequently, the linearity of the output values can be maintained for the signal amount.

Note that in the case of performing imaging of a photographic subject by using the CMOS image sensor 130, the pixel signals for each row are output by the operation explained above with reference to the timing chart of FIG. 5.

[Third Embodiment of a CMOS Image Sensor Applicable to the Present Disclosure]

Figure 10:
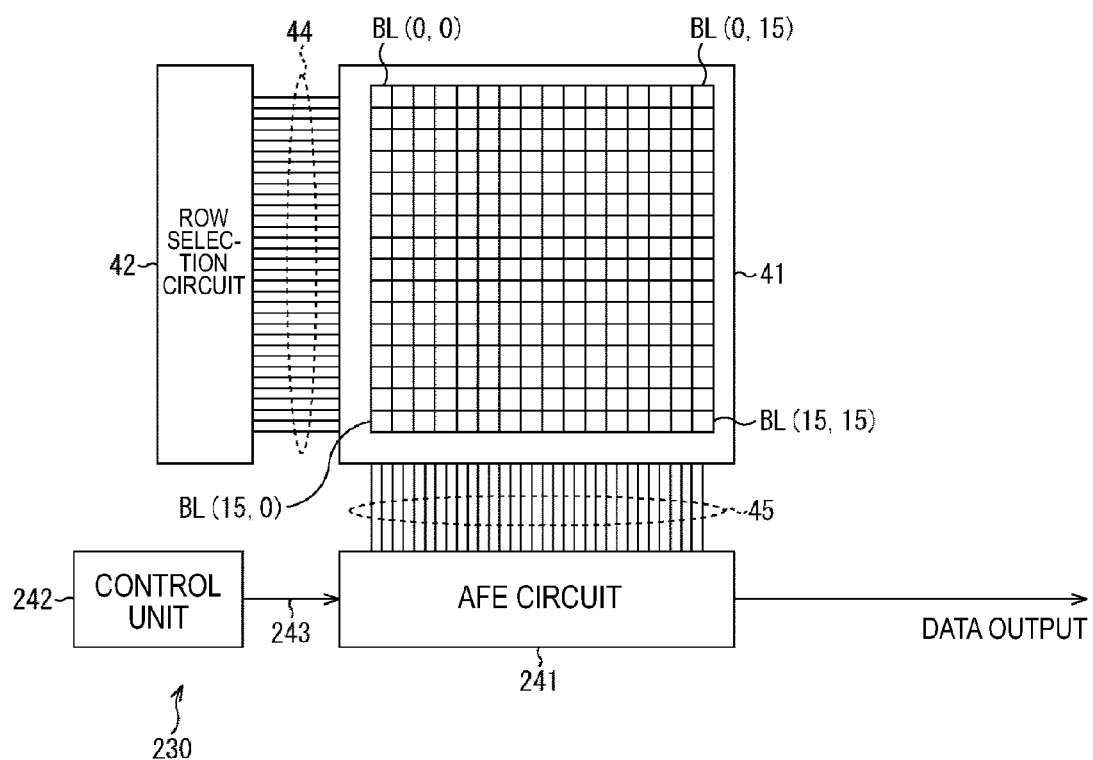
FIG. 10 is a figure which shows a configuration example for a third embodiment of a CMOS image sensor applicable to the present disclosure.

FIG. 10 is a figure which shows a configuration example for a third embodiment of the CMOS image sensor applicable to the present disclosure.

The CMOS image sensor 230 of FIG. 10 includes a pixel array 41, a row selection circuit 42, pixel driving lines 44, vertical signal lines 45, an AFE circuit 241, a control unit 242, and column selection signal lines 243. Note that in FIG. 10, the same reference numerals are attached to parts having functions the same as those of the CMOS image sensor 130 of FIG. 7, and a description of these parts will be arbitrary omitted.

Further, also in the CMOS image sensor 230 of FIG. 10, the region in the pixel array 41 in which the pixels are arranged in a matrix shape is divided into regions of 16×16. In addition, in order for simplicity, the row number M and the column number N are each a multiple of 16.

The AFE circuit 241 performs A/D conversion and a CDS process for each pixel column of the pixel array 41, and as necessary, performs A/D conversion and a CDS process for each column of the pixel blocks BL of the pixel array 41.

The control unit 242 controls the A/D conversion and CDS process operations performed by the AFE circuit 241, for each pixel column of the pixel array 41. Specifically, the control unit 242 supplies a column selection signal, which selects the pixel columns to which an A/D conversion and CDS process are performed, to the AFE circuit 241, via the column selection signal lines 243 formed in each pixel column of the pixel array 41. In the AFE circuit 241, an A/D conversion and a CDS process are performed for the pixel columns selected by the column selection signal.

[Circuit Configuration Example of the Pixel Array and the AFE Circuit]

Figure 11:
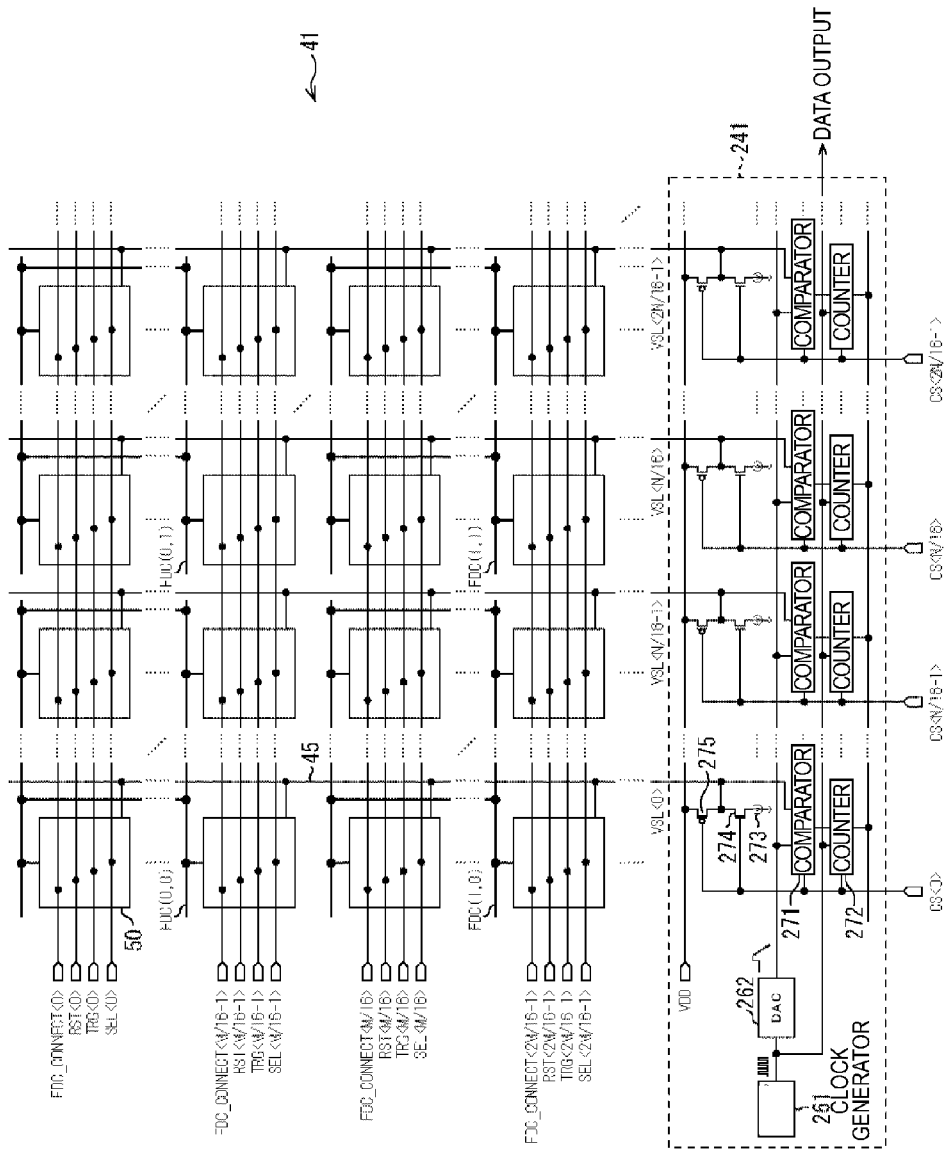
FIG. 11 is a figure which shows a configuration example of a pixel array and an AFE circuit.

Next, a circuit configuration example of the pixel array 41 and the AFE circuit 241 in the CMOS image sensor 230 will be described with reference to FIG. 11.

Note that since the configuration of the pixel array 41 is the same as that described with reference to FIG. 8, a description of it will be omitted.

The AFE circuit 241 has a clock generator 261, and a DAC 262, and has a comparator 271, a counter 272, a constant current source 273, and switches 274 and 275 included in each of the columns.

Note that since the clock generator 261, the DAC 262, and the comparators 271, counters 272, and constant current sources 273 included in each column in the AFE circuit 241 have functions the same as each of the clock generator 161, the DAC 162, the comparators 171, the counters 172, and the constant current sources 173 in the AFE circuit 43 of FIG. 8, a description of them will be omitted.

The switches 274, 275 are turned on/off in accordance with the column selection signal supplied to each column via the column selection lines 243 from the control unit 242. Note that hereinafter, the column selection signal which corresponds to the pixel column with the row number n will be represented as CS<n> and the like. That is, for example, the column selection signal which corresponds to the pixel column with the column number 0 will be represented as CS<0>.

Further, the column selection signal CS<n> is also supplied to the comparator 271 and counter 272 included in each pixel column with the column number n, and the operations of the comparators 271 and counters 272 of the corresponding columns are turned on/off.

For example, when an H level column selection signal CS<n> is supplied, the switch 274 is turned on, current flows to the comparator 271 and the constant current source 273, and the counter 272 performs a count of the clock signal from the clock generator 161.

On the other hand, when an L level column selection signal CS<n> is supplied, the switch 275 is turned on, the vertical signal line VSL<n> is fixed to the power supply VDD voltage, and current does not flow to the constant current source 273. The counter 272 does not perform a count operation even if the clock signal is input from the clock generator 161.

That is, an addition signal for each pixel block BL is output to the A/D converters (comparators 271 and counters 272) connected to the vertical signal line VSL<n> of the column selected by the column selection signal CS<n>.

[Reading of the Addition Signals]

Next, an operation example of the unit pixels 50, with regards to the reading of the addition signals, of the CMOS image sensor 230 will be described with reference to the timing chart of FIG. 12.

Figure 12:
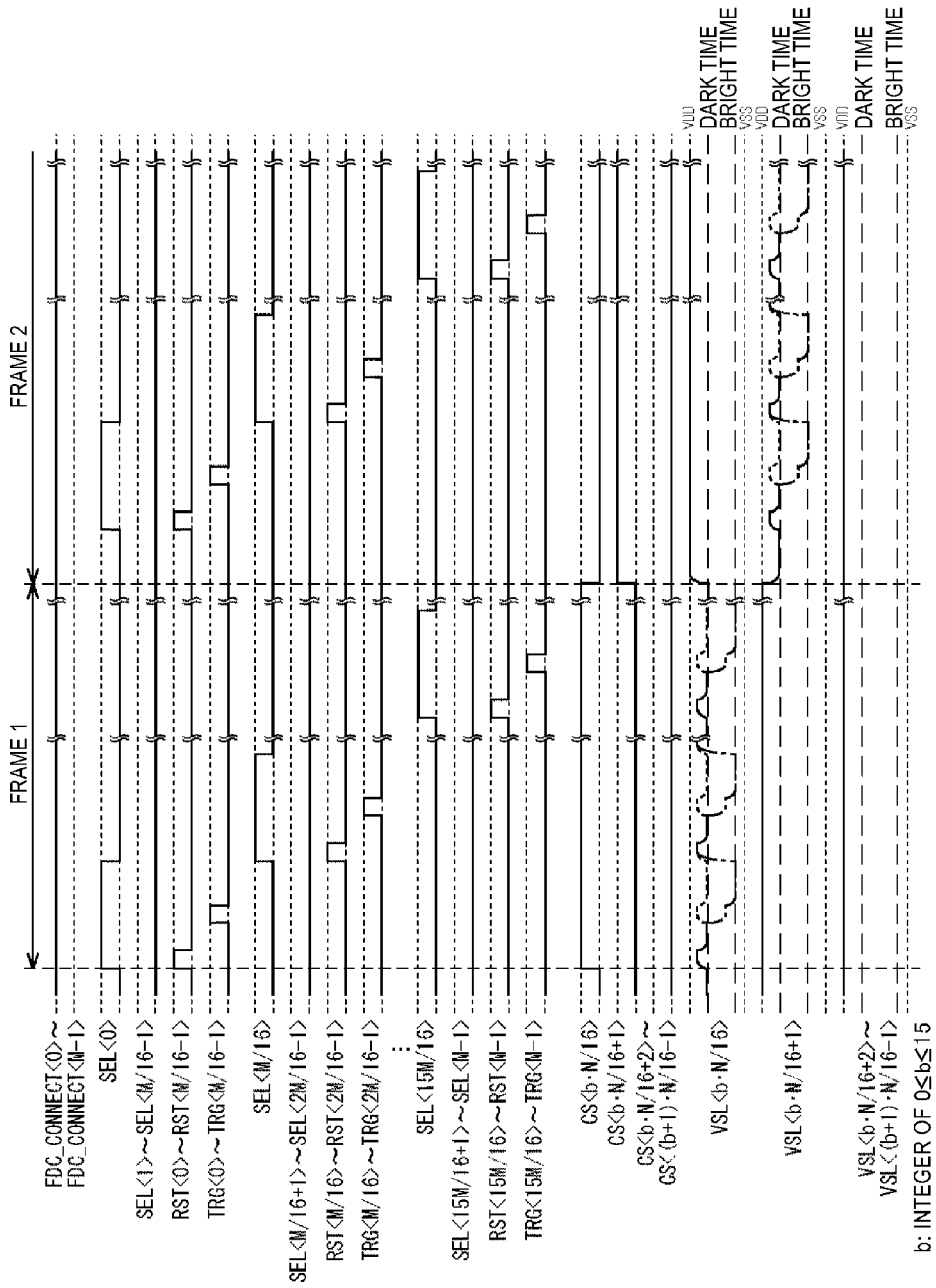
FIG. 12 is a timing chart which describes the reading of addition signals.

Note that FIG. 12 shows the signal levels of the driving signals FDC_CONNECT<0> through to FDC_CONNECT<M−1> supplied to the pixel rows with the row numbers 0 through to M−1, that is, to all the pixel rows; the signal levels of the driving signals SEL<0>, SEL<1> through to SEL<M/16−1>, RST<0> through to RST<M/16−1>, and TRG<0> through to TRG<M/16−1> supplied to the pixel rows included in the $1^{st}$ row of the pixel block BL; the signal levels of the driving signals SEL<M/16>, SEL<M/16+1> through to SEL<2M/16−1>, RST<M/16> through to RST<2M/16−1>, TRG<M/16> through to TRG<2M/16−1> supplied to the pixel rows included in the 2$^{nd}$ row of the pixel block BL; . . . ; the signal levels of the driving signals SEL<15M/16>, SEL<15M/16+1> through to SEL<M−1>, RST<15M/16> through to RST<M−1>, and TRG<15M/16> through to TRG<M−1> supplied to the pixel rows included in the 16$^{th}$ row of the pixel block BL; the signal levels of column selection signals CS<b*N/16>, CS<b*N/16+1>, and CS<b*N/16+2> through to CS<(b+1)*N/16−1> which select the pixel columns of the column numbers b*N/16 (0≤b≤15), b*N/16+1, and b*N/16+2 through to (b+1)*N/16−1; and the signal levels of the vertical signal lines VSL<b*N/16>, VSL<b*N/16+1>, and VSL<b*N/16+2> through to VSL<(b+1)*N/16−1> of the pixel columns with the column numbers b*N/16, b*N/16+1, and b*N/16+2 through to (b+1)*N/16−1.

Also here, in the reading of addition signals, the driving signals FDC_CONNECT<0> through to FDC_CONNECT<M−1> supplied to each unit pixel 50 of all the pixel rows are ordinarily set to an H level.

Note that while the operations of each frame (specifically, frame 1 and frame 2) are shown in the timing chart of FIG. 12, since the driving signals SEL, RST, and TRG in each frame are similar to the operations described above in the timing chart of FIG. 9, a description of them will be omitted.

Further, as shown in the timing chart of FIG. 12, the column selection signal CS<b*N/16> is set to an H level at the time of performing reading of the addition signals for frame 1, and the column selection signal CS<b*N/16+1> is set to an H level at the time of performing reading of the addition signals for frame 2. That is, the pixel column selected by the column selection signal CS changes so as to shift for each frame. As a result, the vertical signal lines to which the addition signal for each pixel block BL is output changes for each frame.

According to the above described operation, since an addition signal, to which the signals of the unit pixels 50 included in each pixel block BL are added, can be read for each pixel block BL, in the case where illuminance and movement are detected in a photography environment biased towards brightness, values can be provided for each imaging region, and more accurate illuminance detection and movement detection can be performed.

Further, in the reading of the addition signals, since performing A/D conversion or a CDS process for each column may not be necessary for the vertical signal lines 45 to which an addition signal is not output, that is, the pixel columns not selected by the column selection signal CS, it becomes possible to further suppress the power consumption.

Note that in the case where the reading of addition signals from only specific pixel columns is performed, the amplification transistors 65 of the unit pixels 50 included in these pixel columns, or the A/D amplifiers (comparators 271 and counters 272) of the AFE circuit 241 which correspond to these pixel columns, will quickly deteriorate compared to the devices of the other columns, and a difference in characteristics may occur for each column.

Accordingly, in the present embodiment, since the pixel column selected by the column selection signal CS changes for each frame, the deterioration of the devices for each column is reduced, and it is possible to prevent an occurrence of a deviation of characteristics for each column.

Note that, as shown in the timing chart of FIG. 12, the potentials of the vertical signal lines 45 to which an addition signal is not output are fixed to the power supply VDD voltage. In this way, the potential of the source of the amplification transistors 65 can be prevented from changing due to a leaking current, a change of the conversion efficiency can also be suppressed, and consequently, the linearity of the output values can be maintained for the signal amount.

Further, in the case of performing imaging of a photographic subject by using the CMOS image sensor 230, in addition to the operation described with reference to the timing chart of FIG. 5, the signals are read for each row by ordinarily setting the column selection signal CS of all the columns to an H level.

While heretofore an operation example has been described which reduces the bias of the deterioration of the devices for each column, the bias of the deterioration for each row can also be reduced.

Figure 13:
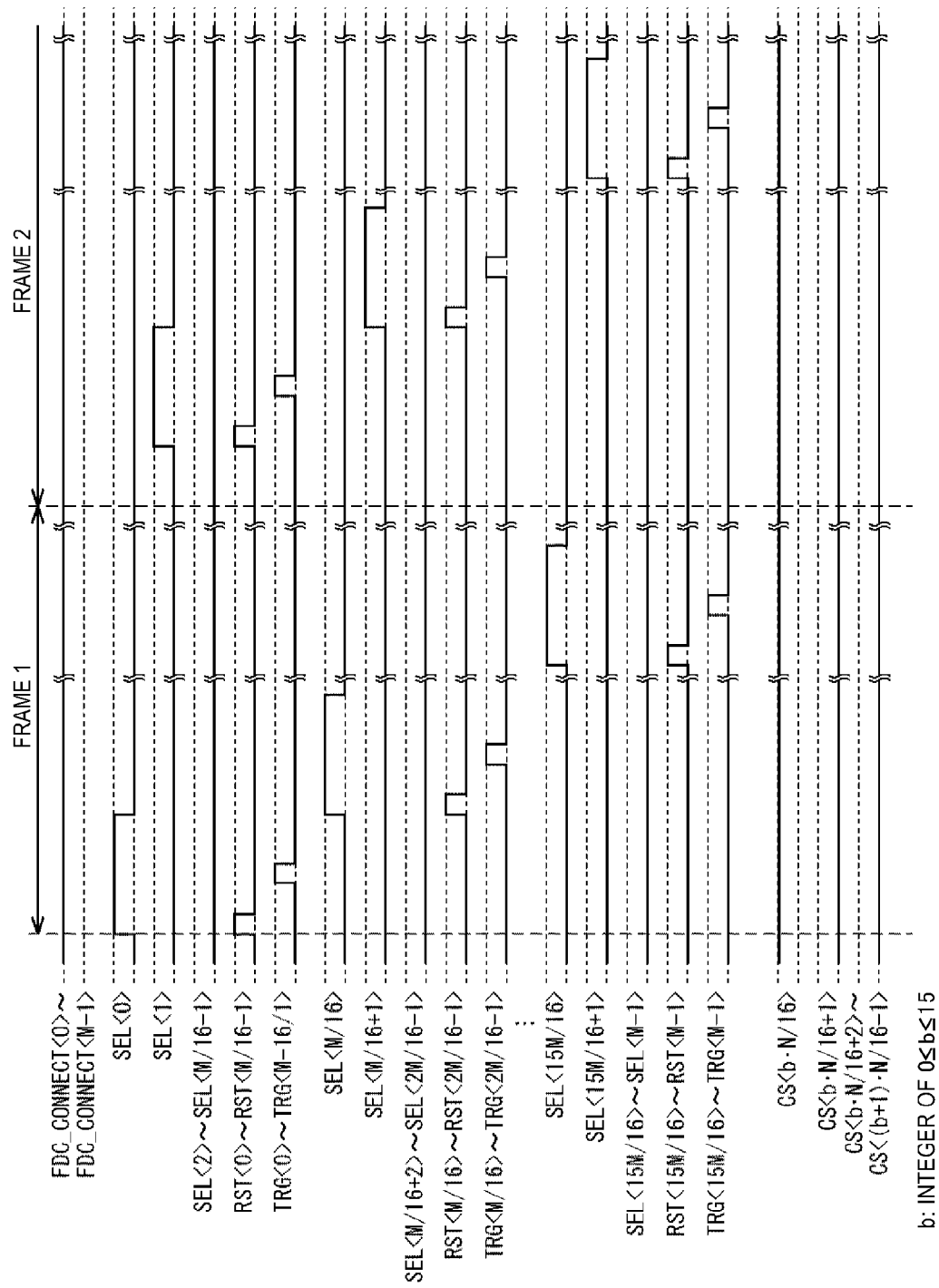
FIG. 13 is a timing chart which describes the reading of addition signals.

The timing chart of FIG. 13 shows an operation example of the unit pixels 50 in the reading of the addition signals, in which the bias of the deterioration of the devices for each row is reduced.

In the timing chart of FIG. 13, different from the timing chart of FIG. 12, the pixel row to which the driving signal SEL<m> is provided changes so as to shift for each frame.

Specifically, for example, in the reading of the 0$^{th}$ pixel block row, in frame 1, the driving signal SEL<0> of the row number 0 is set to an H level, and in frame 2, the driving signal SEL<1> of the row number 1 is set to an H level. Further, in the reading of the 1$^{st}$ pixel block row, in frame 1, the driving signal SEL<M/16> of the row number M/16 is set to an H level, and in frame 2, the driving signal SEL<M/16+1> of the row number M/16+1 is set to an H level.

Note that in the timing chart of FIG. 13, since the column selection signal CS<b*N/16> is ordinarily set to an H level, while not shown in the figure, the addition signal of each pixel block is output to the vertical signal line VSL<b*N/16>.

In this way, since the pixel row to which the driving signal SEL is provided changes for each frame, the bias of deterioration of the devices for each row is reduced, and it becomes possible to prevent an occurrence of a deviation of characteristics for each row.

Further, in the operation shown in the timing chart of FIG. 12, while the pixel column selected by the column selection signal CS and the pixel row to which the driving signal SEL is provided are both one column and row in each pixel block BL, they may be a plurality of columns and rows.

Figure 14:
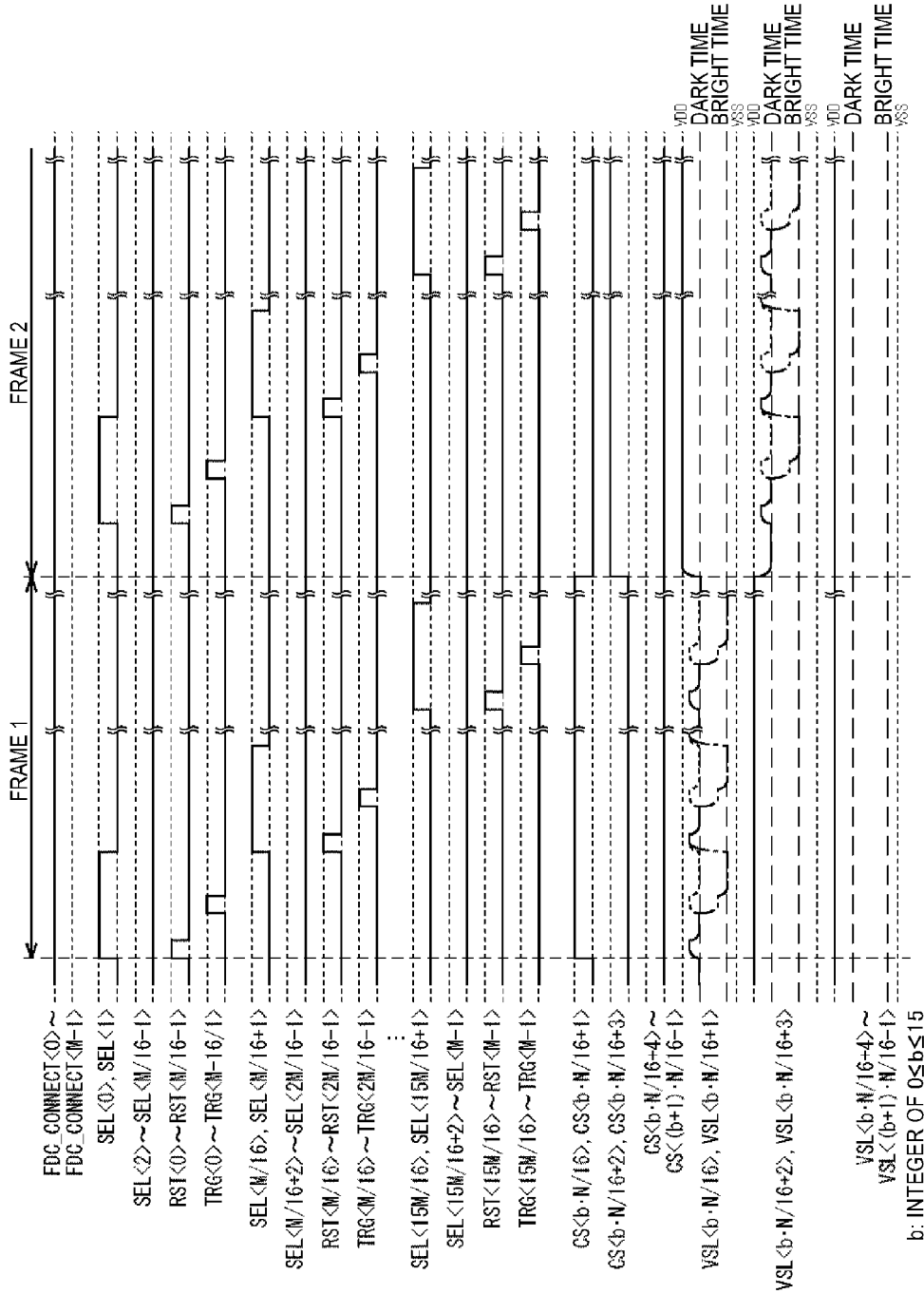
FIG. 14 is a timing chart which describes the reading of addition signals.

The timing chart of FIG. 14 shows an operation example of the unit pixels 50 in the reading of addition signals in which the pixel column selected by the column selection signal CS and the pixel row to which the driving signal SEL is provided are set to a plurality of columns and rows.

In the timing chart of FIG. 14, different from the timing chart of FIG. 12, the driving signal SEL is simultaneously provided for two rows, from among the pixel rows included in each pixel block row, and two columns, from among the pixel columns included in each pixel block column, are selected by the column selection signal CS.

Specifically, for each frame, the driving signals SEL<0> and SEL<1> of the row numbers 0 and 1 are set to an H level in the reading of the 0$^{th}$ pixel block rows; the driving signals SEL<M/16> and SEL<M/16+1> of the row numbers M/16 and M/16+1 are set to an H level in the reading of the 1$^{st}$ pixel block rows; and the driving signals SEL<15M/16> and SEL<15M/16+1> of the row numbers 15M/16 and 15M/16+1 are set to an H level in the reading of the 15$^{th}$ pixel block rows. Further, in frame 1, the column selection signals CS<b*N/16> and CS<b*N/16+1> of the column numbers b*N/16 and b*N/16+1 are set to an H level; and in frame 2, the column selection signals CS<b*N/16+2> and CS<b*N/16+3> of the column numbers b*N/16+2 and b*N/16+3 are set to an H level.

In this case, the addition signal FDC for one pixel block BL is output to two vertical signal lines 45, via the amplification transistors 65 of each of 2×2 unit pixels 50. A CDS process and A/D conversion are performed for each addition signal FDC output to the two vertical signal lines 45, and afterwards the addition signals FDC are added.

In this way, since an addition signal for one pixel block is read and added by selecting a plurality of pixel rows and a plurality of pixel columns, random noise originating in the amplification transistors 65 and the A/D converters for each column can be reduced.

Note that in the CMOS image sensor 130 of FIG. 7, it is possible to implement the operation described above with reference to the timing chart of FIG. 14, by including a plurality of A/D converters (comparators 191 and counters 192) of the addition signal reading circuit 141 (FIG. 8) for each column of the pixel block BL of the pixel array 41.

[Fourth Embodiment of a CMOS Image Sensor Applicable to the Present Disclosure]

Figure 15:
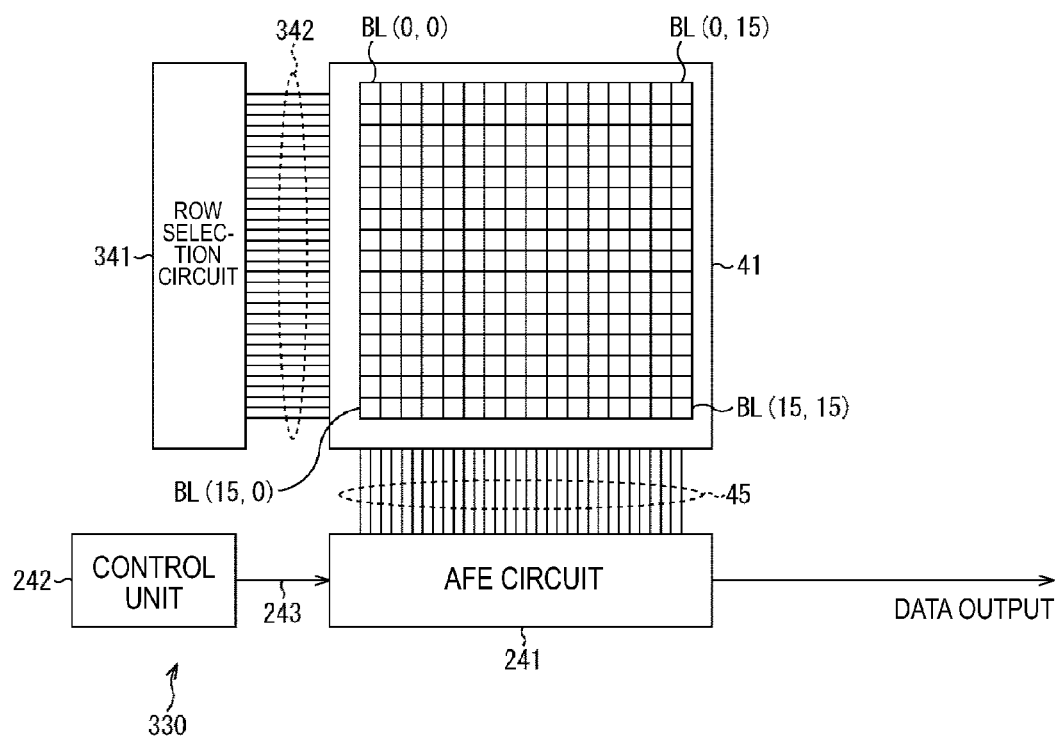
FIG. 15 is a figure which shows a configuration example for a fourth embodiment of a CMOS image sensor applicable to the present disclosure.

FIG. 15 is a figure which shows a configuration example for a fourth embodiment of the CMOS image sensor applicable to the present disclosure.

The CMOS image sensor 330 of FIG. 15 includes a pixel array 41, vertical signal lines 45, an AFE circuit 241, a control unit 242, column selection signal lines 243, a row selection circuit 341, and pixel driving lines 342. Note that in FIG. 15, the same reference numerals are attached to parts having functions the same as those of the CMOS image sensor 230 of FIG. 10, and a description of these parts will be arbitrary omitted.

Further, also in the CMOS image sensor 330 of FIG. 15, the region in the pixel array 41 in which the pixels are arranged in a matrix shape is divided into regions of 16×16. In addition, in order for simplicity, the row number M and column number N are each a multiple of 16.

The row selection circuit 341 simultaneously drives all the pixels, or drives the corner pixels by row units or the like, and drives the pixels for reading the addition signal of each pixel block, by supplying a driving signal to each pixel of the pixel array 41.

The pixel driving lines 342 supply necessary signals for the driving of each unit pixel 50 of the pixel array 41. In particular, from among the pixel driving lines 342, pixel selection signal lines supplying a pixel selection signal, which selects the pixels for reading the addition signal for each pixel block, are formed for at least each row of the pixel blocks BL, that is, for at least 16 lines.

Note that the pixel selection signal may be formed for each pixel row of the pixel array 41, that is, for M lines. In this way, symmetry of the layout of each unit pixel 50 in the pixel array 41 can be enhanced, and the characteristics of each unit pixel 50 can be made uniform.

[Circuit Configuration Example of the Pixel Array and the AFE Circuit]

Next, a circuit configuration example of the pixel array 41 and the AFE circuit 241 in the CMOS image sensor 330 will be described with reference to FIG. 16.

Note that since the configuration of the pixel array 41 is the same as that described with reference to FIG. 8, a description of it will be omitted. Further, since the configuration of the AFE circuit 241 is the same as that described with reference to FIG. 11, a description of it will be omitted.

Figure 16:
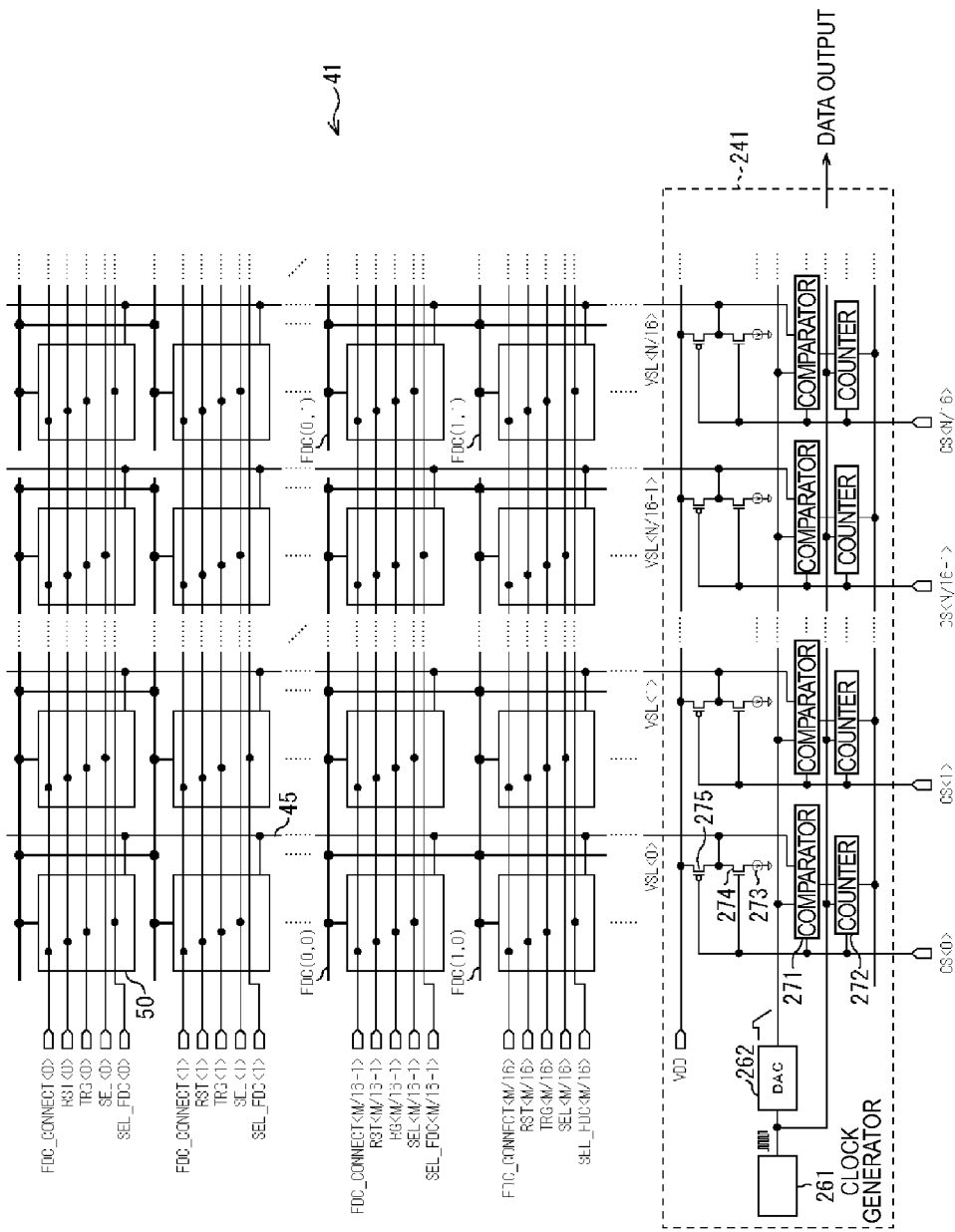
FIG. 16 is a figure which shows a configuration example of a pixel array and an AFE circuit.

In the pixel array 41 of FIG. 16, a pixel selection signal SEL_FDC is supplied via the pixel selection signal lines formed for each of these pixel rows.

Specifically, in the pixel array 41 of FIG. 16, the pixel selection signal SEL_FDC of the A*N/16+B row is supplied to the pixels of the C*N/16+B column. Here, A, B, and C are arbitrary integers of 0≤A≤15, 0≤B≤15, and 0≤C≤15, respectively.

[Reading of the Addition Signals]

Here, an operation example of the unit pixels 50, with regards to the reading of the addition signals, of the CMOS image sensor 330 will be described with reference to the timing chart of FIG. 17.

Figure 17:
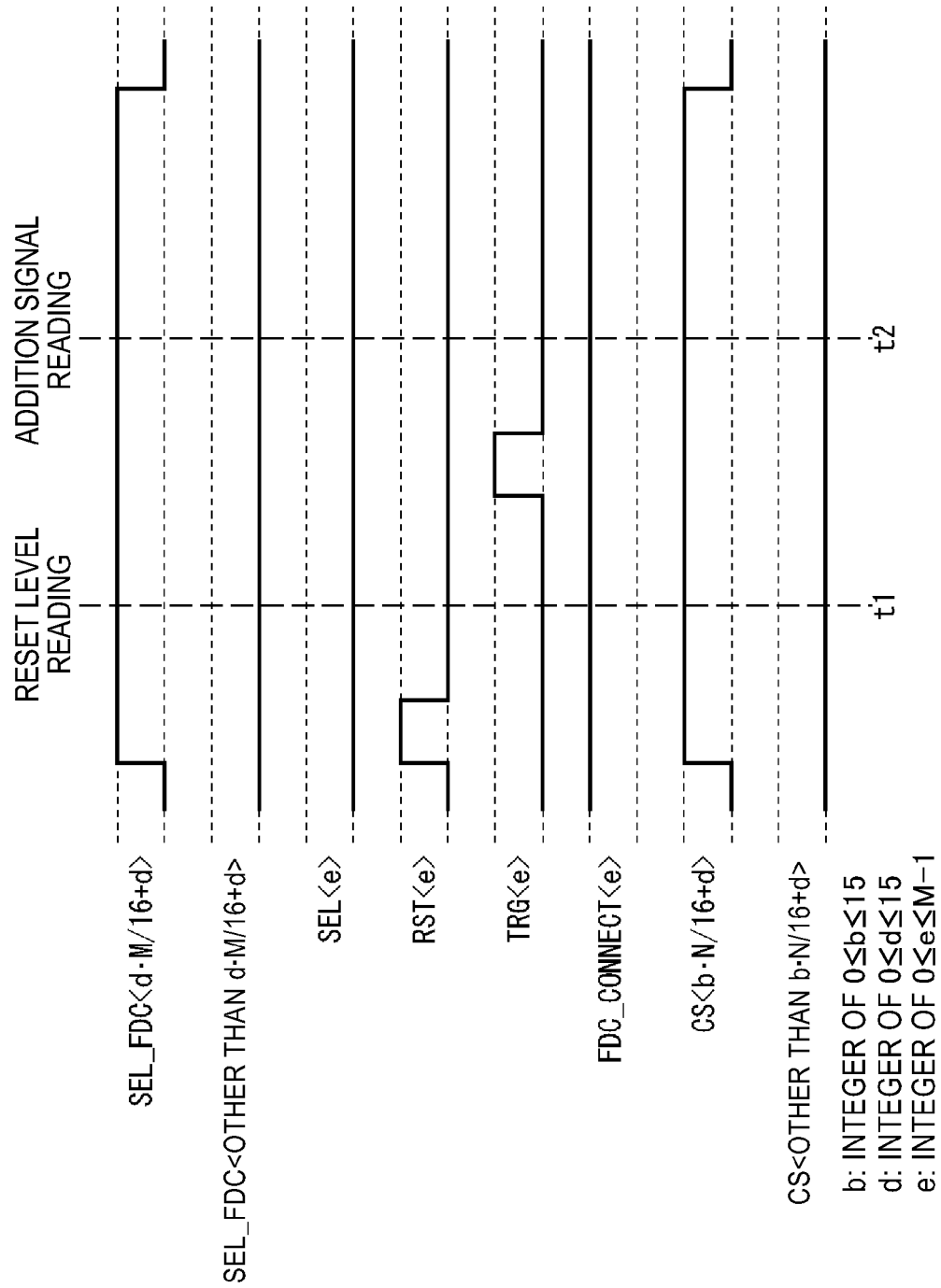
FIG. 17 is a timing chart which describes the reading of addition signals.

Note that FIG. 17 shows the pixel selection signal SEL_FDC<d*M/16+d> supplied to the pixel row with the row number d*M/16+d (d: an integer of 0≤d≤15); the pixel selection signals SEL_FDC<other than d*M/16+d> supplied to the pixel rows with row numbers other than d*M/16+d; the driving signals SEL<e>, RST<e>, TRG<e>, and FDC_CONNECT<e> supplied to the pixel rows with the row number e (e: an integer of 0 through to M−1), that is, to all pixel rows; the column selection signal CS<b*N/16+d> which selects the pixel columns of the column number b*N/16+d (b: an integer of 0≤b≤15); and the signal levels of the column selection signals CS<other than b*N/16+d> which select the pixel columns with column numbers other than b*N/16+d.

In the timing chart of FIG. 17, for each pixel block having a same column, the addition signal is output via the vertical signal line 45 of a respectively different column of the unit pixels 50 included in this pixel block.

For example, from among the pixel blocks BL (0,0) and BL (1,0) which have the same column, the addition signal FDC (0,0) of the pixel block BL (0,0) is output via the vertical signal line VSL<0> with the column number 0 from the amplification transistors 65 of the unit pixels 50 included in the pixel column with the column number 0; and the addition signal FDC (1,0) of the pixel block BL (1,0) is output via the vertical signal line VSL<1> with the column number 1 from the amplification transistors 65 of the unit pixels 50 included in the pixel column with the column number 1. Further, from among the pixel blocks BL (0,1) and BL (1,1) which have the same column, the addition signal FDC ( 0,1) of the pixel block BL (0,1) is output via the vertical signal line VSL<N/16> with the column number N/16 from the amplification transistors 65 of the unit pixels 50 included in the pixel column with the column number 0, and the addition signal FDC (1,1) of the pixel block BL (1,1) is output via the vertical signal line VSL<N/16+1> with the column number N/16+1 from the amplification transistors 65 of the unit pixels 50 included in the pixel column with the column number 1.

According to the above described operation, since the addition signal of each pixel block with a same column is output via the vertical signal line of a different column, the addition signals of a plurality of pixel blocks, and consequently, the addition signals of all the pixel blocks, can be simultaneously read. In this way, the time which may be necessary for performing reading of the addition signals is shortened, and it becomes possible to improve the frame rate, and to implement a reduction of the power consumption by shortening the time which may be necessary to perform A/D conversion in the AFE circuit 241.

[Reading of the Pixel Signals for Each Row]

Figure 18:
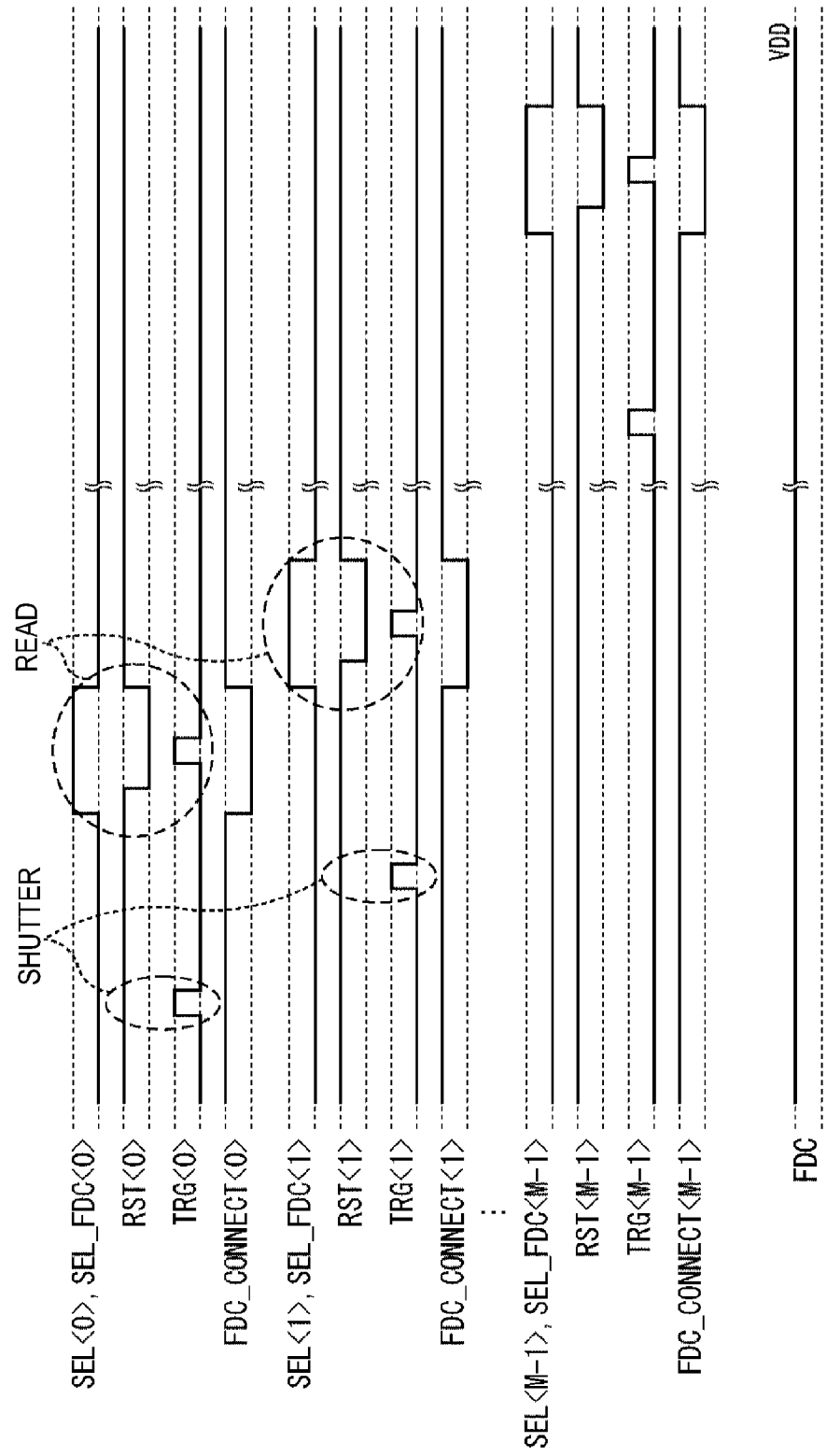
FIG. 18 is a timing chart which describes the reading of pixel signals for each row.

The timing chart of FIG. 18 shows an operation example of the unit pixels 50 in the reading of the pixel signals for each row, in the CMOS image sensor 330.

FIG. 18 shows the signal levels of the driving signal SEL<0>, the pixel selection signal SEL_FDC<0>, and the driving signals RST<0>, TRG<0>, and FDC_CONNECT<0> supplied to the pixel row with the row number 0; the signal levels of the driving signal SEL<1>, the pixel selection signal SEL_FDC<1>, and the driving signals RST<1>, TRG<1>, FDC_CONNECT<1> supplied to the pixel row with the row number 1; . . . ; the signal levels of the driving signal SEL<M−1>, the pixel selection signal SEL_FDC<M−1>, and the driving signals RST<M−1>, TRG<M−1>, FDC_CONNECT<M−1> supplied to the pixel row with the row number M−1; and the signal level of the addition node FDC.

While the timing chart of FIG. 18 basically shows an operation the same as that of the timing chart of FIG. 5, the reading of the pixel signals for each row is performed by performing the same operation for the driving signal SEL and the pixel selection signal SEL_FDC of respective pixel rows.

Incidentally, in a general CMOS image sensor, technology is known which increases a saturation signal amount of the photodiodes and restrains dark current and white spots by applying a negative potential to the substrate, as a gate potential of the transfer transistors, in an accumulation period of the charges of the photodiodes.

However, since a certain amount of power may be necessary in order to generate a negative voltage, in the case where dark current and white spots are restrained in the above described CMOS image sensor, it will not be easy to implement ultra-low power consumption which may be required when performing illuminance detection.

[Fifth Embodiment of a CMOS Image Sensor Applicable to the Present Disclosure]

Figure 19:
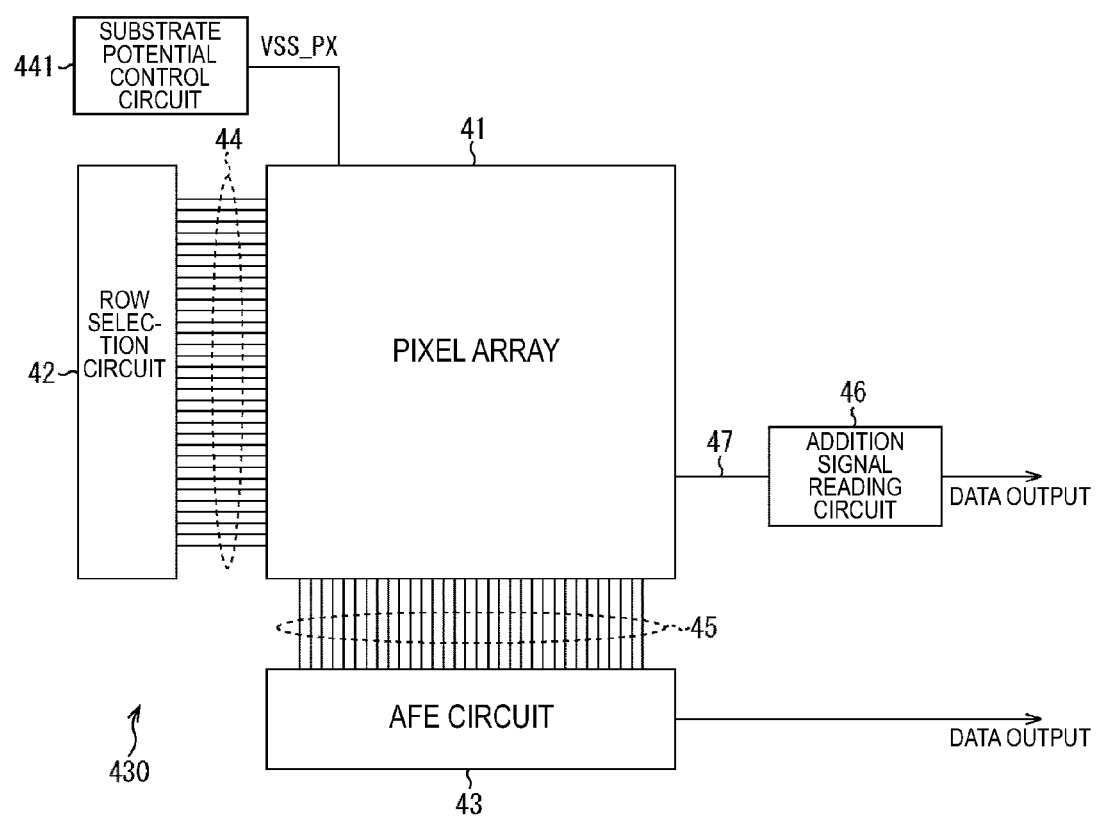
FIG. 19 is a figure which shows a configuration example of a fifth embodiment of a CMOS image sensor applicable to the present disclosure.

FIG. 19 is a figure which shows a configuration example for a fifth embodiment of the CMOS image sensor applicable to the present disclosure.

The CMOS image sensor 430 of FIG. 19 includes a pixel array 41, a row selection circuit 42, an AFE circuit 43, pixel driving lines 44, vertical signal lines 45, an addition signal reading circuit 46, an addition node 47, and a substrate potential control circuit 441. Note that in FIG. 19, the same reference numerals are attached to parts having functions the same as those of the CMOS image sensor 30 of FIG. 1, and a description of these parts will be omitted.

The substrate potential control circuit 441 applies a prescribed substrate potential VSS_PX at a prescribed timing to a semiconductor substrate (chip), which is not shown in the figure, on which the pixel array 41 is formed. The cathodes of the photodiodes 61 and the bodies of the transfer transistors 62 in at least the unit pixels 50 which constitute the pixel array 41 are connected to this substrate.

[Reading of the Addition Signals]

Next, an operation example of the unit pixels 50, with regards to the reading of the addition signals, of the CMOS image sensor 430 will be described with reference to the timing chart of FIG. 20.

Figure 20:
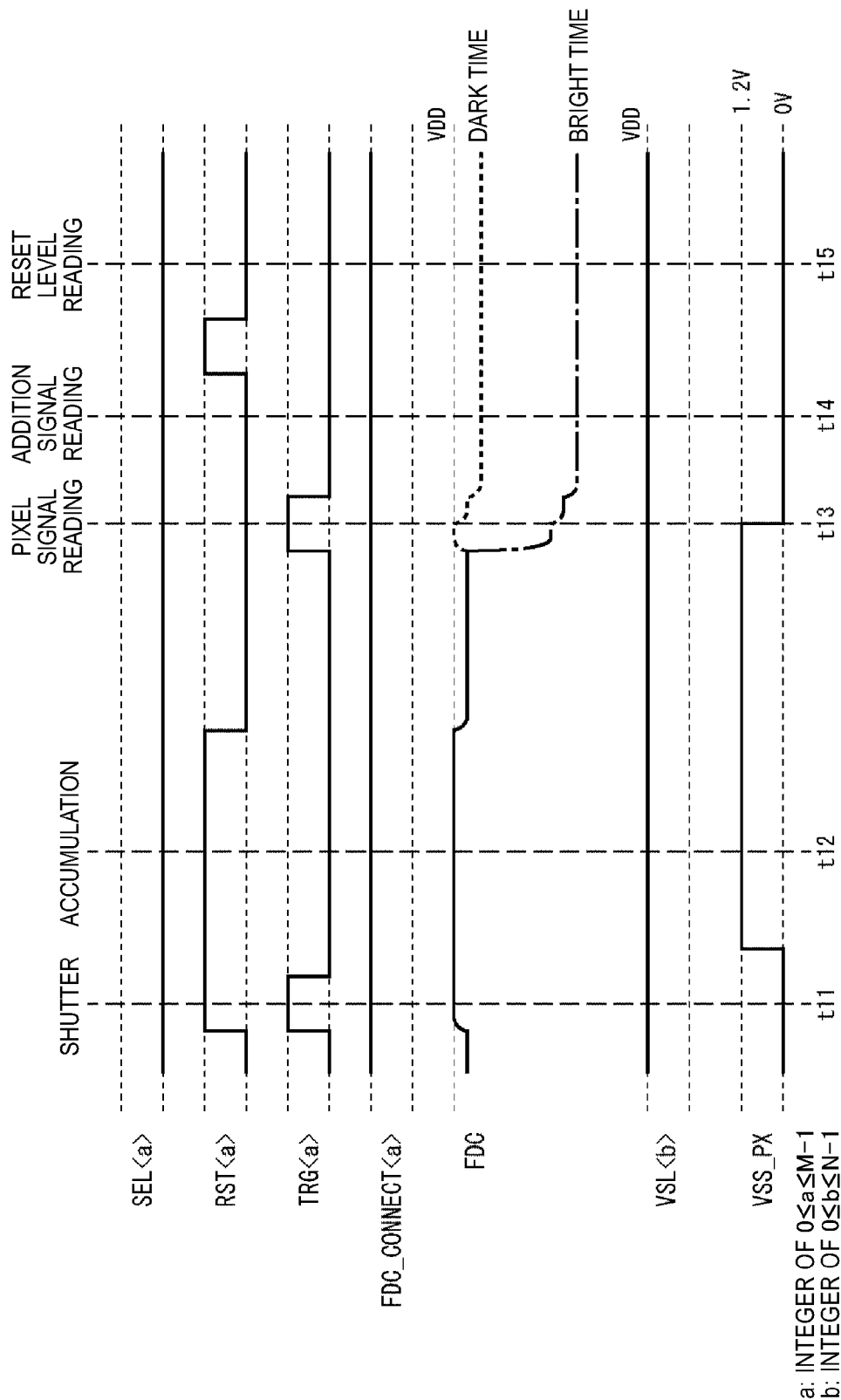
FIG. 20 is a timing chart which describes the reading of addition signals.

Note that FIG. 20 shows the signal levels of the driving signals SEL<a>, RST<a>, TRG<a>, and FDC_CONNECT<a> supplied to each unit pixel 50 of the pixel rows with a row number a (a: an integer of 0≤a≤M−1), that is, to all the pixel rows; the signal level of the addition node FDC; the signal level of the vertical signal line VSL<b> of the pixel columns with a column number b (b: an integer of 0≤b≤N−1), that is, to all the pixel columns; and the substrate potential VSS_PX.

Also here, in the reading of the addition signals, the driving signal FDC_CONNECT<a> supplied to each unit pixel 50 of all the pixel rows is ordinarily set to an H level.

When the driving signal TRG<a> is applied in a pulse shape, with the driving signal RST<a> set to an H level, the charges accumulated in the photodiodes 61 are discharged. In this way, at a time t11, a shutter operation is performed. In this case, the substrate potential VSS_PX is set to a ground potential (0V).

When the driving signal TRG<a> becomes an L level, after the shutter operation, accumulation of the charges of the photodiodes 61 begins. That is, at a time t12, an accumulation operation is performed. In this case, the substrate potential VSS_PX is set to a positive potential (1.2V).

When the driving signal TRG<a> is applied in a pulse shape, at a time t13, the charges accumulated in the photodiodes 61 are transferred to the floating diffusions 63 by the transfer transistors 62. That is, reading of the pixel signals of each unit pixel 50 is performed. In this way, at a time t14, the signal level of the addition node FDC is read.

Note that, the substrate potential VSS_PX is set to a ground potential (0V) in the period when the driving signal TRG<a> is applied in a pulse shape, specifically, at the time t13.

In the case where a photographing environment in which the CMOS image sensor 430 is placed is dark, the signal level of the addition node FDC (the addition signal FDC) read at the time t14 becomes a level approximately the same as that of the reset level, as shown by the dashed line of FIG. 20, since there are no significant charges accumulated in the photodiodes 61. Further, in the case where a photographing environment is bright, the addition signal FDC becomes a level different from that of the reset level, as shown by the long-dashed/short-dashed line of FIG. 20, since corresponding charges are accumulated in the photodiodes 61.

Afterwards, when the driving signal RST<a> is applied in a pulse shape, the charges accumulated in the floating diffusions 63 are discharged (reset). In this way, at a time t15, the reset level of the addition node FDC is read.

In this way, an addition signal in which noise is removed is read by performing a CDS process, which removes noise by taking the difference between the read addition signal and reset level.

According to the above described operation, an effect similar to that of the operation described with reference to the timing chart of FIG. 4 can be accomplished. Further, in the above described operation, at the time when performing a shutter operation, a ground potential is applied to the substrate, and at the time when performing an accumulation operation, a prescribed positive potential is applied to the substrate.

In this way, at the time when performing a shutter operation, sufficient voltage is applied, between the gates of the transfer transistors 62 and the substrate, for the transfer transistors 62 to operate in a strong inversion region, and sufficient voltage is applied, between the anodes and cathodes of the photodiodes 61, for the photodiodes 61 to be completely depleted.

Further, at the time when performing an accumulation operation, a positive potential is applied to the substrate, and the potential of the substrate becomes greater than the gate potential of the transfer transistors 62, by a ground potential (an L level driving signal TRG) being applied to the gates of the transfer transistors 62. The voltage of the cathodes of the photodiodes 61 also increases due to coupling, by the potential of the substrate increasing, and as a result, a saturation electron number (saturation signal amount) of the photodiodes 61 increases, and the dark current can be reduced.

Therefore, it becomes possible to restrain dark current and white spots without generating a negative voltage, that is, while implementing ultra-low power consumption which may be required when performing illuminance detection.

Note that, in the above described operation, the substrate potential VSS_PX is set to a ground potential, in the period when reading of the pixel signals is performed, that is, in the period when the driving signal TRG<a> is applied in a pulse shape. For example, when the substrate potential VSS_PX is set to a ground potential prior to when reading of the pixel signals is performed, the saturation electron number of the photodiodes 61 will decrease. Further, when the substrate potential VSS_PX is not set to a ground potential in the period when reading of the pixel signals is performed, a sufficient voltage will not be applied between the gates of the transfer transistors 62 and the substrate. Therefore, the substrate potential VSS_PX is set to a ground potential in the period when reading of the pixel signals is performed.

Incidentally, in order to cancel a kT/C noise (a reset noise), generally the reset levels are read after performing a reset of the floating diffusions, then the signal levels are read after performing pixel signal reading, and a difference between these is taken.

However, since the substrate of the floating diffusions is usually connected to the substrates of the photodiodes and the transfer transistors, the potential of the floating diffusions will also decrease, when changing the substrate potential from a positive potential to a ground potential.

Accordingly, in the above described operation, a reset of the floating diffusions is performed after performing reading of the addition signals, and a difference with the addition signals is taken by reading the reset level. Here, in the case where the floating diffusions of many unit pixels are connected to the addition node FDC, the kT/C noise will become sufficiently small in the reading of the addition signals, and a sufficient S/N ratio can be obtained.

Note that when the potential of the floating diffusions 63 decreases by changing the substrate potential from a positive potential to a ground potential, at the time when performing reading of the pixel signals, there is the possibility that a sufficient voltage is not applied between the anodes and cathodes of the photodiodes 61, the photodiodes 61 are not completely discharged, and all the signal charges are not read.

Accordingly, in the above described operation, the driving signal SEL<a> may be set to an H level for a plurality of the unit pixels 50, and at the time when performing reading of the pixel signals, the potential of the vertical signal lines VSL<b> of each pixel column may be set to be greater than the potential at the time when performing a reset of the floating diffusions 63. In this way, the potential of the floating diffusions 63 can be boosted, via the gate capacities of the amplification transistors 65, and the reading of the charges of the photodiodes 61 can be surely performed.

Further, the above described effect can be accomplished, at the time when performing reading of the pixel signals, even if the power supply VDD voltage of the unit pixels 50 is set to be greater than the potential at the time when performing a reset of the floating diffusions 63.

Figure 21:
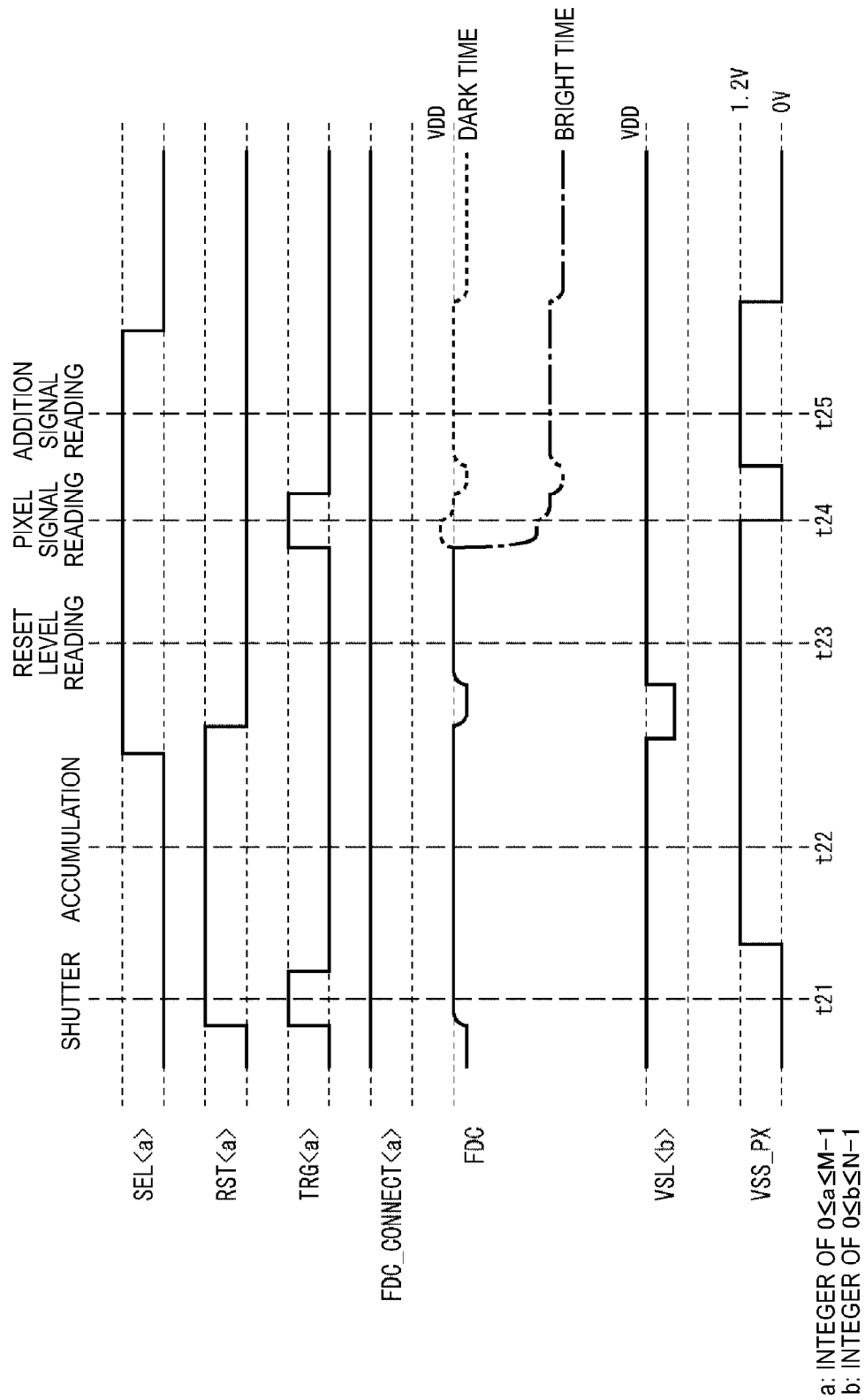
FIG. 21 is a timing chart which describes the reading of addition signals.

Note that, as shown in FIG. 21, the reset level may be read at a time t23 prior to reading the pixel signals at a time t24, and the addition signals may be read at a time t25 after reading the pixel signals at the time t24. In this case, the substrate potential VSS_PX, which has been set to a ground potential at the time when performing reading of the pixel signals (time t24), is again set to a positive potential (1.2V) at the time when performing reading of the addition signals (time t25).

In this way, a CDS process can be performed, with the charges not being accumulated in the photodiodes 61, by setting the potential at the time when performing a reset of the floating diffusions 63 to be equal to the potential of the floating diffusions 63 and the addition node FDC after performing pixel signal reading.

Further, in FIG. 21, the potential of the floating diffusions 63 (addition node FDC) is boosted, after performing a reset of the floating diffusions 63 (after the driving signal RST<a> is set to an L level), by setting the potential of the vertical signal lines VSL<b> of each pixel column to be greater than the potential at the time when performing the reset of the floating diffusions 63.

[Sixth Embodiment of a CMOS Image Sensor Applicable to the Present Disclosure]

Figure 22:
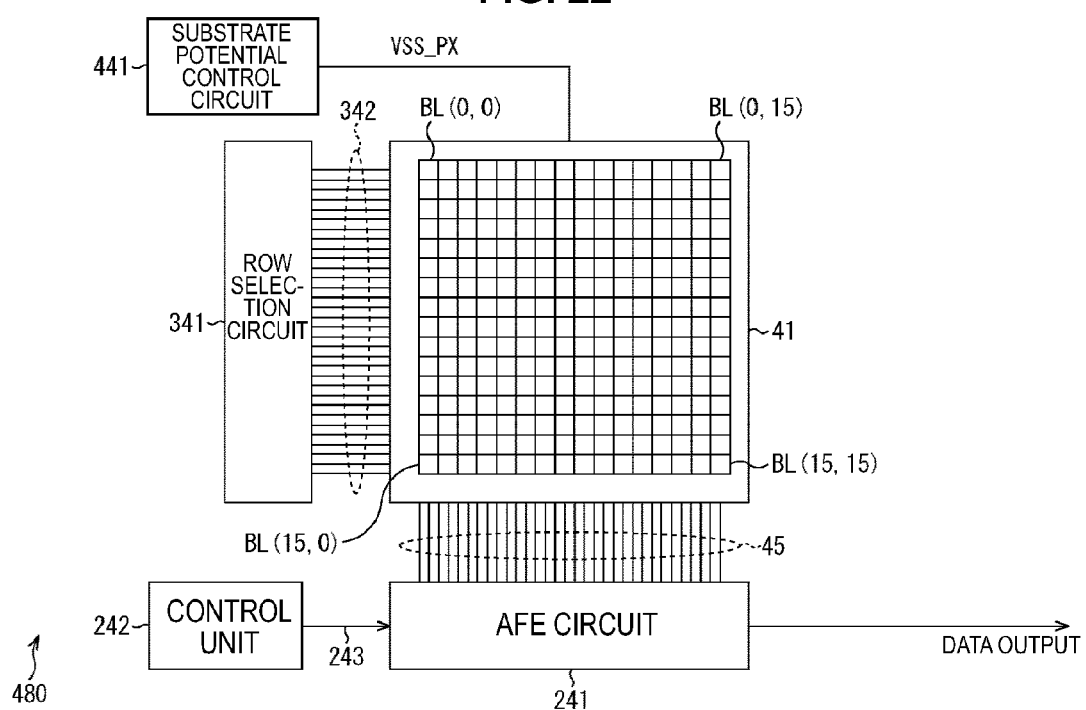
FIG. 22 is a figure which shows a configuration example of a sixth embodiment of a CMOS image sensor applicable to the present disclosure.

FIG. 22 is a figure which shows a configuration example for a sixth embodiment of the CMOS image sensor applicable to the present disclosure.

The CMOS image sensor 480 of FIG. 22 includes a pixel array 41, vertical signal lines 45, an AFE circuit 241, a control unit 242, column selection signal lines 243, a row selection circuit 341, pixel driving lines 342, and a substrate potential control circuit 441. Note that in FIG. 22, the same reference numerals are attached to parts having functions the same as those of the CMOS image sensor 330 of FIG. 15, and a description of these parts will be arbitrary omitted. Further, since the substrate potential control circuit 441 is the same as that included in the CMOS image sensor 430 of FIG. 19, a description of it will also be omitted.

Further, also in the CMOS image sensor 480 of FIG. 22, similar to that of FIG. 15, the region in the pixel array 41 in which the pixels are arranged in a matrix shape is divided into regions of 16×16. In addition, in order for simplicity, the row number M and column number N are each a multiple of 16.

[Reading of the Addition Signals]

Next, an operation example of the unit pixels 50, with regards to the reading of the addition signals, of the CMOS image sensor 480 will be described with reference to the timing chart of FIG. 23.

Figure 23:
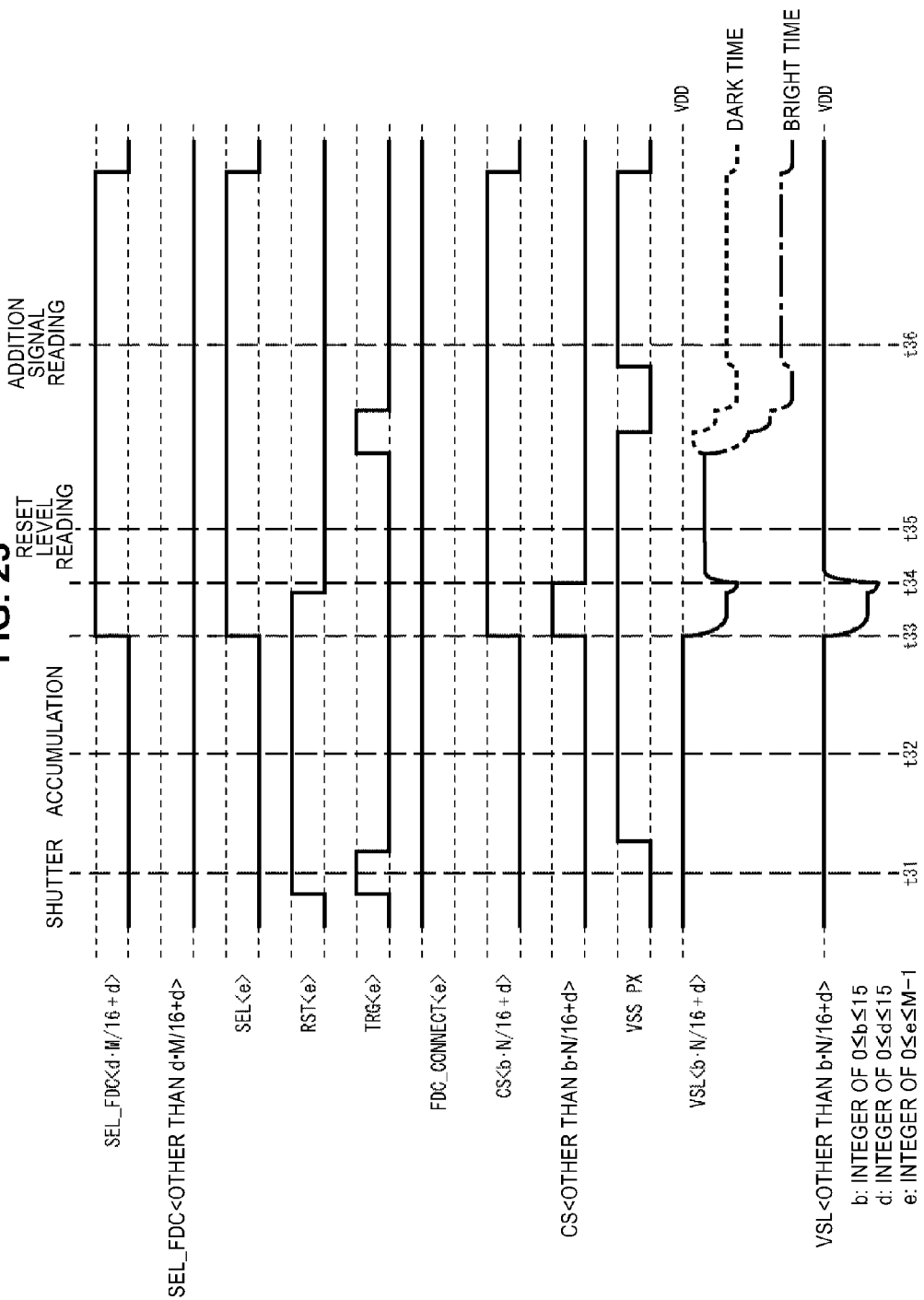
FIG. 23 is a timing chart which describes the reading of addition signals.

FIG. 23 shows the signal level of the pixel selection signal SEL_FDC<d/16+d> supplied to the pixel row with the row number d*M/16+d (d: an integer of 0≤d≤15); the signal levels of the pixel selection signals SEL_FDC<other than d*M/16+d> supplied to the pixel rows with row numbers other than d*M/16+d; the signal levels of the driving signals SEL<e>, RST<e>, TRG<e>, and FDC_CONNECT<e> supplied to the pixel rows with the row number e (e: an integer of 0 through to M−1), that is, to all pixel rows; the signal level of the column selection signal CS<b*N/16+d> which selects the pixel columns of the column number b*N/16+d (b: an integer of 0≤b≤15); and the signal levels of the column selection signals CS<other than b*N/16+d> which select the pixel columns with column numbers other than b*N/16+d.

In addition, FIG. 23 shows the signal level of the substrate potential VSS_PX; the signal level of the vertical signal lines VSL<b*N/16+d> of the pixel columns with the column number b*N/16+d; and the signal levels of the vertical signal lines VSL<other than b*N/16+d> of the pixel columns with pixel numbers other than b*N/16+d.

In the timing chart of FIG. 23, the operations of each unit pixel 50 are basically the same as the operations described with reference to the timing chart of FIG. 21. Further, in the timing chart of FIG. 23, similar to that of the timing chart of FIG. 17, for each pixel block having a same column, the addition signal is output via the vertical signal line 45 of a respectively different column of the unit pixels 50 included in this pixel block.

Here, in the present embodiment, such as shown in the timing chart of FIG. 23, the floating diffusions 63 and the addition node FDC of each pixel block are boosted after performing a rest of the floating diffusions 63, by changing the potential of the vertical signal lines VSL<other than b*N/16+d> of the pixel columns (unselected columns) other than b*N/16+d.

Specifically, the driving signal SEL<e> is set to an H level, during the reading operation from the reset period of the floating diffusions 63 up to the reading of the addition signals, specifically, from a time t33 onwards.

Further, the column selection signals CS<other than b*N/16+d> which select the unselected columns are set to an H level during the reset operation of the floating diffusions 63, specifically, at the time t33, and the column selection signals CS<other than b*N/16+d> which select the unselected columns are set to an L level after the reset operation of the floating diffusions 63, specifically, at a time t34. In this way, the potential of the vertical signal lines VSL<other than b*N/16+d> of the unselected columns not used for the output of the addition signals can be changed, and the floating diffusions 63 and the addition node FDC of each pixel block can be boosted via the gate capacities of the amplification transistors 65. As a result, the reading of the charges of the photodiodes 61 can be surely performed.

[Another Configuration Example of a Unit Pixel]

The unit pixels which constitute an image sensor performing the above described operations can adopt a configuration other than that of the unit pixel shown in FIG. 2.

Figure 24:
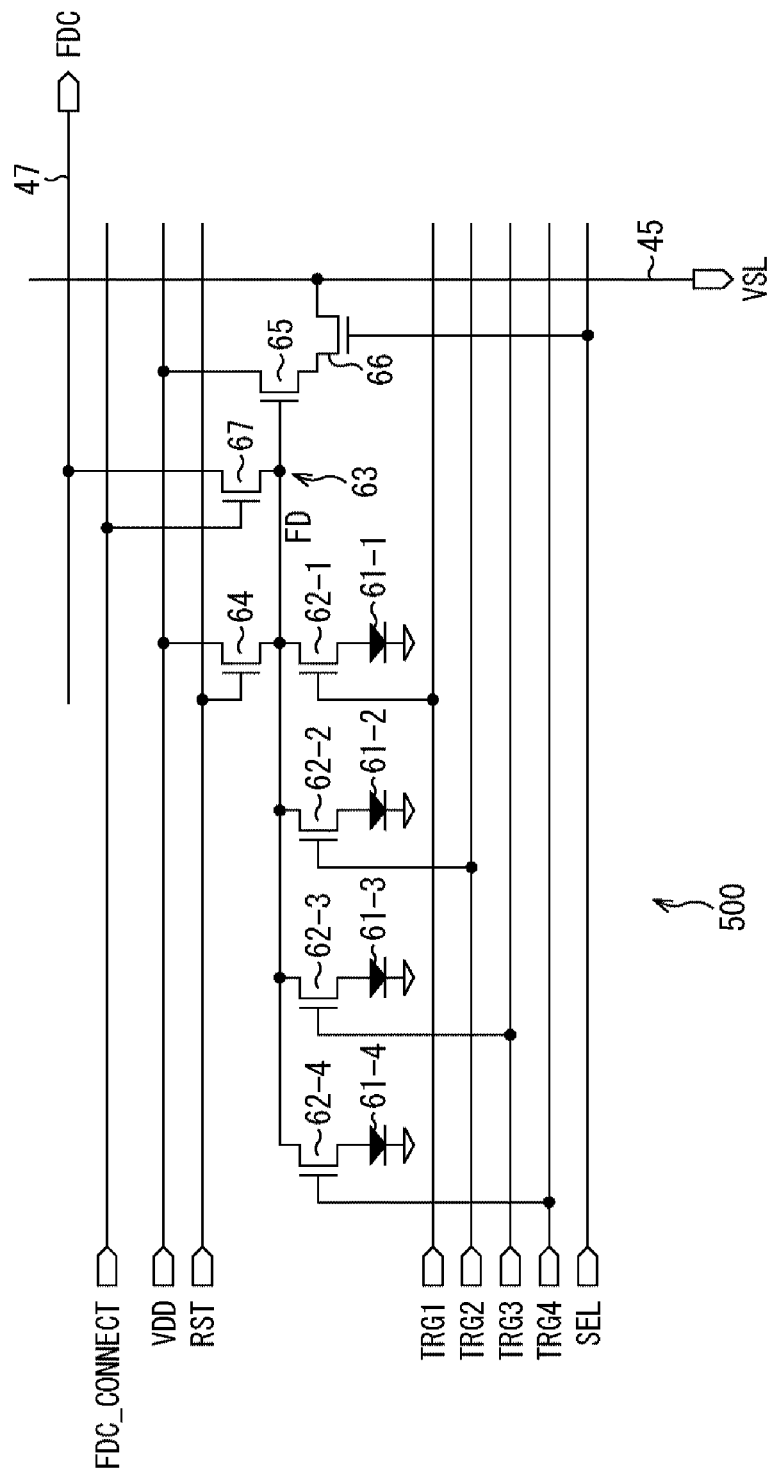
FIG. 24 is a figure which shows another configuration example of a unit pixel.

Specifically, the pixels which constitute the pixel array 41 may be constituted by having a plurality of photodiodes and a plurality of transfer transistors sharing a single floating diffusion. For example, as shown in FIG. 24, pixels 400, in which four photodiodes 61-1 through to 61-4 and four transfer transistors 62-1 through to 62-4 share one floating diffusion 63, may constitute the pixel array 41. Note that the number of the photodiodes 61 and the transfer transistors 62 are not limited to four, and may be another number.

Note that heretofore, while the regions of the pixel array 41 in which the pixels are placed in a matrix shape are divided into regions of 16×16, the way of dividing is not limited to this, and the regions can be divided into arbitrary partial regions.

[Seventh Embodiment of a CMOS Image Sensor Applicable to the Present Disclosure]

Figure 25:
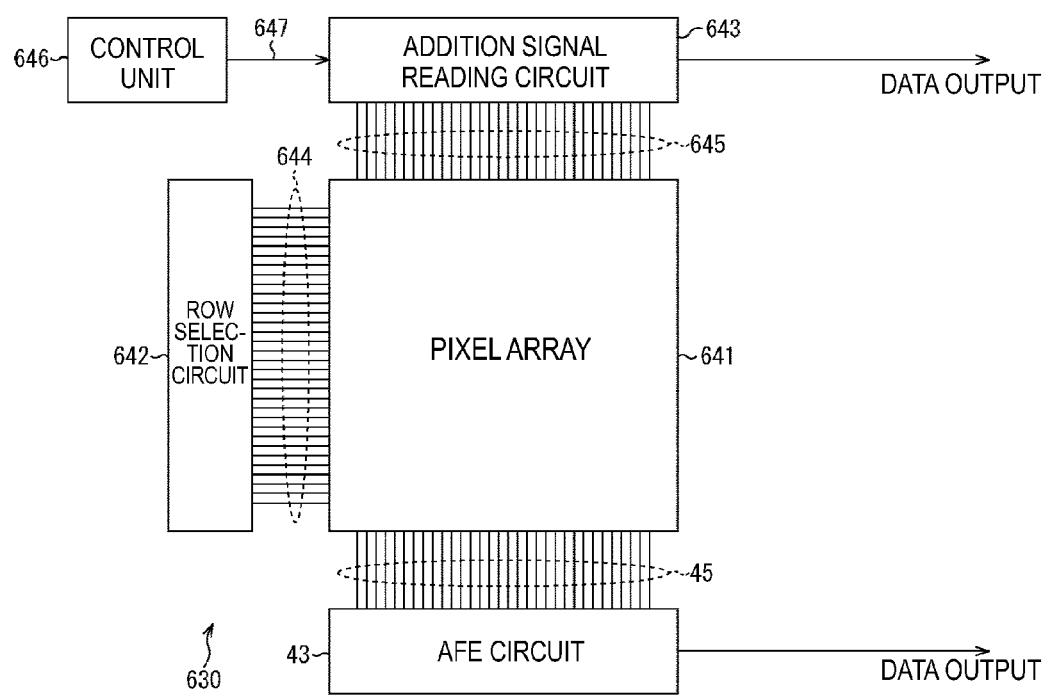
FIG. 25 is a figure which shows a configuration example of a seventh embodiment of a CMOS image sensor applicable to the present disclosure.

FIG. 25 is a figure which shows a configuration example for a seventh embodiment of the CMOS image sensor applicable to the present disclosure.

The CMOS image sensor 630 of FIG. 25 includes an AFE circuit 43, vertical signal lines 45, a pixel array 641, a row selection circuit 642, an addition signal reading circuit 643, pixel driving lines 644, vertical signal lines 645, a control unit 646, and control signal lines 647. Note that in FIG. 25, the same reference numerals are attached to parts having functions the same as those of the CMOS image sensor 30 of FIG. 1, and a description of these parts will be arbitrary omitted.

Unit pixels (the unit pixel 650 of FIG. 26) having a photoelectric conversion element, which generates an optical charge of a charge amount corresponding to an amount of incident light and accumulates the optical charge internally, are arranged two-dimensionally in a matrix shape in the pixel array 641.

The pixel driving lines 644 are formed in the pixel array 641 along a left-right direction of the figure for each row (an array direction of pixels for the pixel rows), and the vertical signal lines 645 are formed in the pixel array 641 along an up-down direction of the figure for each column (an array direction of pixels for the pixel columns), in accordance with a matrix shaped pixel array. One end of the pixel driving lines 644 are connected to the output ends corresponding to each row of the row selection circuit 642.

The row selection circuit 642 simultaneously drives all the pixels, or drives each pixel by row units or the like, by supplying a driving signal for each pixel of the pixel array 641.

The pixel signals output from each unit pixel of the pixel rows selected by the driving signal supplied from the row selection circuit 642 are supplied to the AFE circuit 43 via the respective vertical signal lines 645.

Further, the pixel signals output from each unit pixel selected by the driving signal supplied from the row selection circuit 642 are also supplied to the addition signal reading circuit 643 via the respective vertical signal lines 645.

The addition signal reading circuit 643 adds, for each pixel column of the pixel array 641, the pixel signals output via the vertical signal lines 645 from the unit pixels, and performs a CDS process and A/D conversion for the obtained addition signals.

The vertical signal lines 645 are formed for each pixel column. Note that the vertical signal lines 645 may be formed by sharing with the vertical signal lines 45.

The control unit 646 controls the addition of the pixel signals performed by the addition signal reading circuit 643, for each pixel column of the pixel array 641. Specifically, the control unit 646 supplies a control signal, which controls the addition of the pixel signals for each pixel column, to the addition signal reading circuit 643, via the control signal lines 647. In the addition signal reading circuit 643, the addition of the pixel signals is performed in accordance with the control signal.

[Circuit Configuration Example of the Unit Pixels]

Next, a circuit configuration example of one of the unit pixels 650 arranged in a matrix shape in the pixel array 641 of FIG. 25 will be described with reference to FIG. 26.

Figure 26:
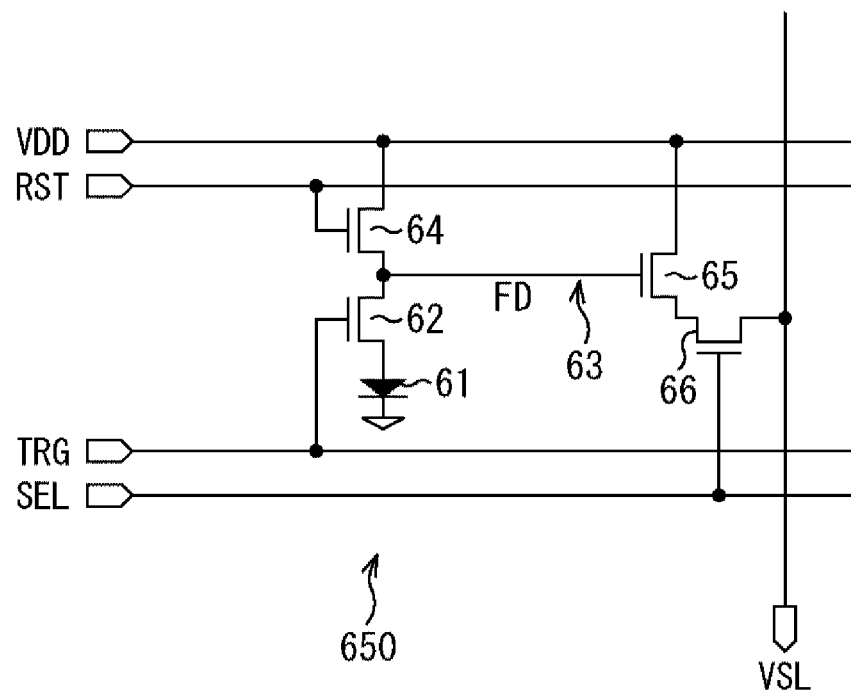
FIG. 26 is a figure which shows a configuration example of a unit pixel.

The unit pixel 650 of FIG. 26 includes a photodiode 61, a transfer transistor 62, floating diffusion (FD) 63, a reset transistor 64, an amplification transistor 65, and a selection transistor 66. Note that in FIG. 25, the same reference numerals are attached to parts having functions the same as those of the unit pixel 50 of FIG. 2, and a description of these parts will be arbitrary omitted.

That is, in the unit pixel 650 of FIG. 26, different from the unit pixel 50 of FIG. 2, an output transistor 67 is not included.

[Circuit Configuration Example of the Pixel Array, the AFE Circuit, and the Addition Signal Reading Circuit]

Next, a circuit configuration example of the pixel array 641, the AFE circuit 43, and the addition signal reading circuit 643 will be described with reference to FIG. 27.

Note that since the configuration of the AFE circuit 43 is the same as that described with reference to FIG. 8, a description of it will be omitted.

Figure 27:
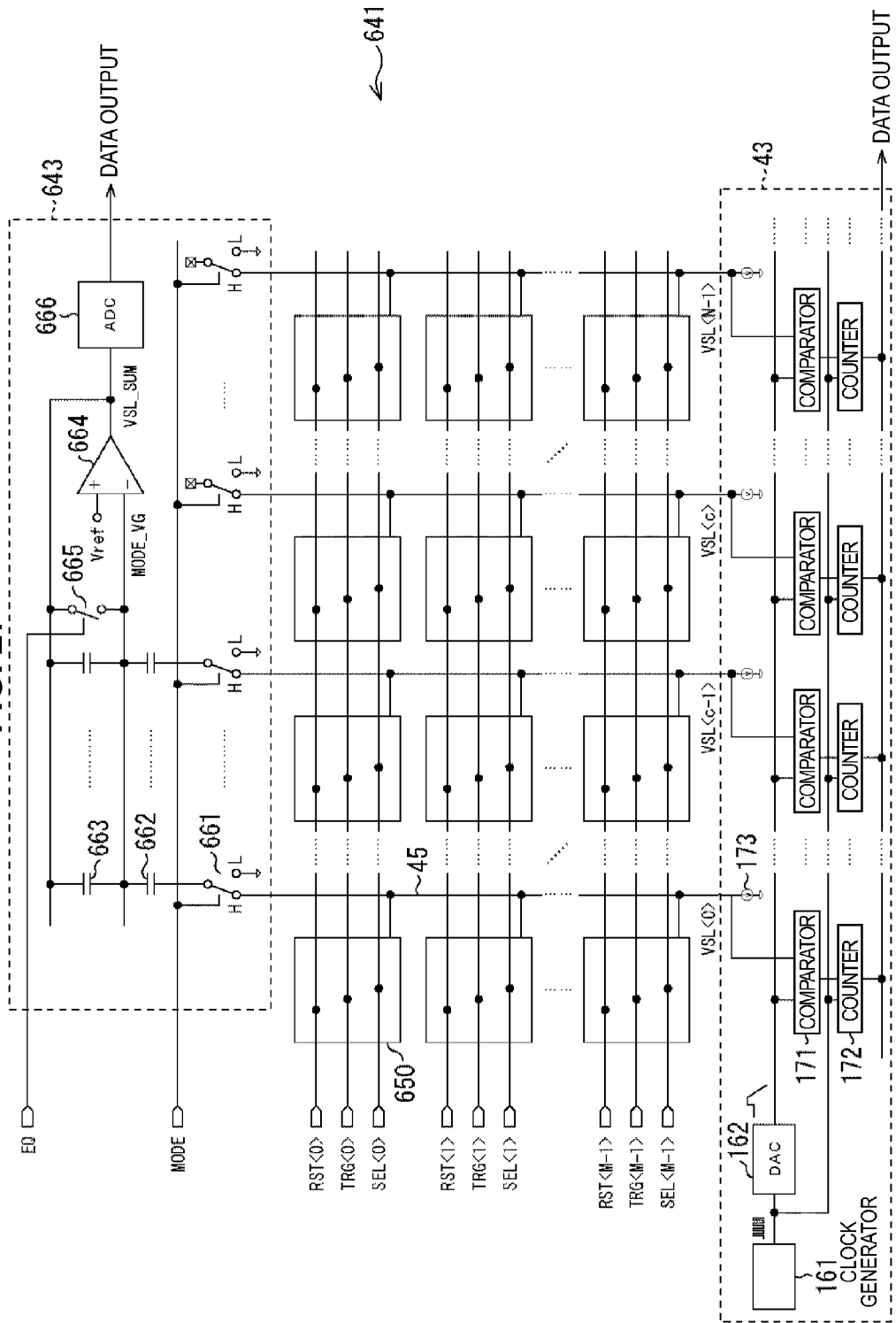
FIG. 27 is a figure which shows a configuration example of a pixel array, an AFE circuit, and an addition signal reading circuit.

While the pixel array 641 of FIG. 27 is arbitrary omitted, it includes M number of the unit pixels 650 arranged in a row direction, and N number of the unit pixels 650 arranged in a column direction.

Here, the row numbers of the rows in which the unit pixels 650 are arranged are set as 0, 1, 2, ..., M−1 in this sequence from the top, and the column numbers of the columns in which the unit pixels 650 are arranged are set as 0, 1, 2, ..., N−1 in this sequence from the top, and this will be followed hereinafter.

The pixel signals of each unit pixel 650 are output to the AFE circuit 43 and the addition signal reading circuit 643, via the amplification transistors 65 and vertical signal lines 45. More specifically, the pixel signals are output to the AFE circuit 43 and the addition signal reading circuit 643, via the amplification transistors 65 and vertical signal lines 45 of the unit pixels 650, by turning on the selection transistors 66 of the unit pixels 650 of a pixel row selected by the driving signal SEL.

Note that in FIG. 27, the vertical signal lines 645 described in FIG. 25 are formed by sharing with the vertical signal lines 45.

The addition signal reading circuit 643 has switches 661, capacitive elements 662 and 663, an amplifier 664, a switch 665, and an ADC (Audio Digital Convertor) 666.

The switches 661 electrically connect the vertical signal lines 45 with one end the capacitive elements 662, by turning on/off in accordance with a control signal MODE from among the control signals supplied from the control unit 646.

The other end of the capacitive elements 662 are connected to one end of the capacitive elements 663 and to a negative-side input terminal of the amplifier 664.

The other end of the capacitive elements 663 are connected to an output terminal of the amplifier 664.

A reference voltage Vref is supplied to a positive-side input terminal of the amplifier 664, and the output terminal of the amplifier 664 is connected to the ADC 666. The amplifier 664 is included as an output circuit which amplifies a potential difference between the positive-side input terminal and the negative-side input terminal, and outputs the amplified potential difference to the output terminal.

The switch 665 electrically connects the output terminal and the negative-side input terminal of the amplifier 664, by turning on/off in accordance with a control signal EQ from among the control signals supplied from the control unit 646.

The ADC 666 performs A/D conversion and a CDS process for the output of the amplifier 664.

Note that in FIG. 27, the vertical signal lines 45, to which one end of the capacitive elements 662 are electrically connected via the switches 661, are set to vertical signal lines VSL<0> through to VSL<c−1> (c: 1≤c≤N−1). That is, switches 661 and capacitive elements 662 and 663 are included corresponding to the vertical signal lines VSL<0> through to VSL<c−1>.

That is, the addition signal reading circuit 643 reads the addition signals, by adding the signals output to the vertical signal lines VSL<0> through to VSL<c−1> of the pixel columns 0 through to c−1, from among the pixel columns of the unit pixels 650. In the addition signal reading circuit 643, the added addition signals output to the vertical signal lines VSL<0> through to VSL<c−1> are inversely amplified and output, by the amplifier 664, in accordance with a capacitive ratio of the capacitive elements 662 and 663.

[Reading of the Addition Signals]

Next, an operation example of the unit pixels 650, with regards to the reading of the addition signals, of the CMOS image sensor 630 will be described with reference to the timing chart of FIG. 28.

Figure 28:
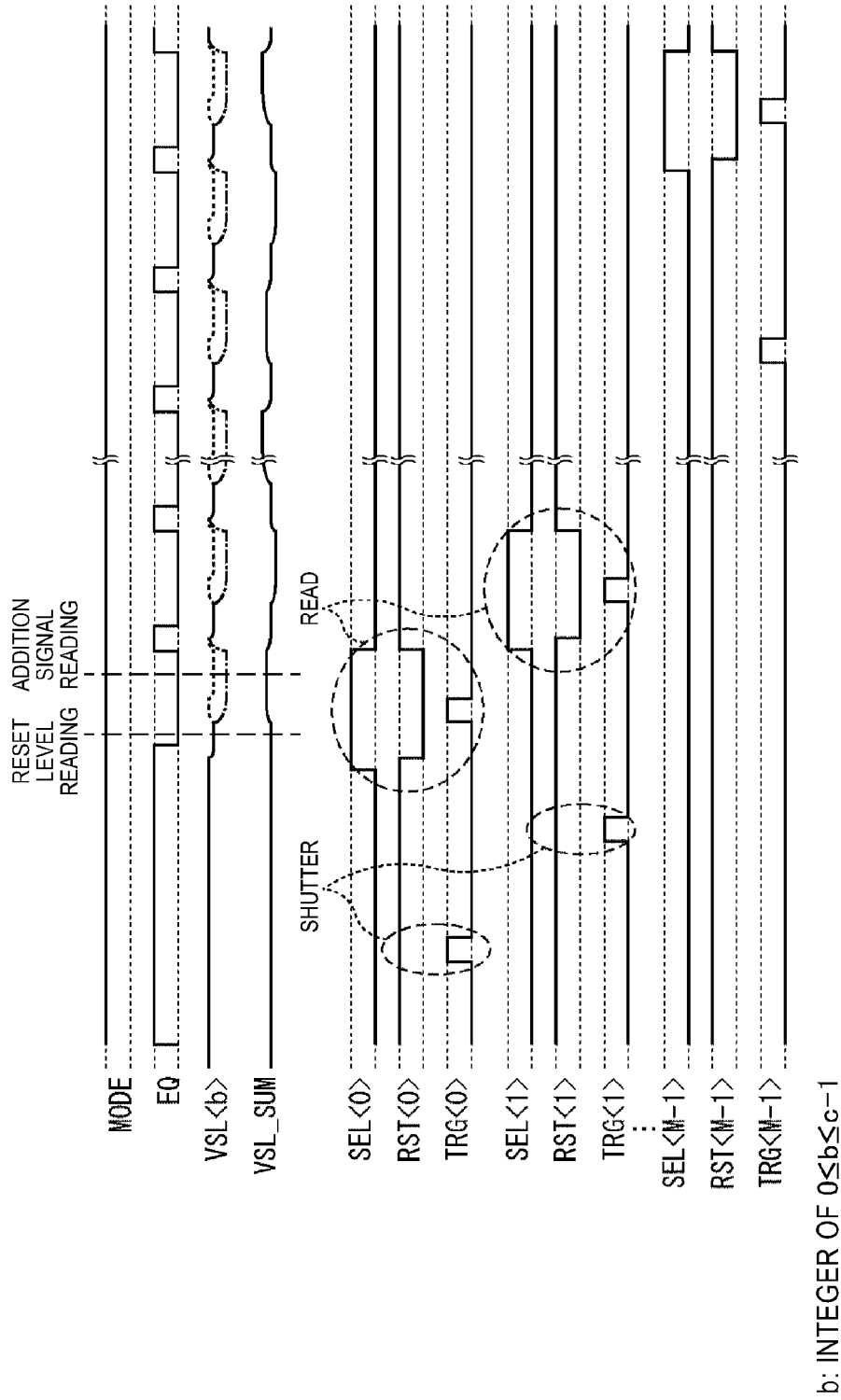
FIG. 28 is a timing chart which describes the reading of addition signals.

FIG. 28 shows the control signals MODE and EQ; the signal levels of the vertical signal line VSL<b> of the pixel columns with a column number b (b: an integer of 0≤b≤c−1); and the negative-side input potential VSL_SUM of the amplifier 664.

In addition, FIG. 28 shows the signal levels of the driving signals SEL<0>, RST<0>, and TRG<0> supplied to the pixel row with the row number 0; the signal levels of the driving signals SEL<1>, RST<1>, and TRG<1> supplied to the pixel row with the row number 1; ... ; and the signal levels of the driving signals SEL<M−1>, RST<M−1>, and TRG<M−1> supplied to the pixel row with the row number M−1.

In the reading of the addition signals, the control signal MODE, for turning on the switches 661 electrically connecting the vertical signal lines 45 and the capacitive elements 662, is ordinarily set to an H level.

When focusing on each unit pixel 650 of the pixel row with the row number 0, first a shutter operation is performed, with the driving signal RST<0> in an H level state, by the driving signal TRG<0> being applied in a pulse shape. In this case, the control signal EQ is set to an H level.

Afterwards, the driving signal SEL<0> is set to an H level from an L level, and a read operation (reading) is performed, with the driving signal RST<0> in a state set to an L level from an H level, by the driving signal TRG<0> being applied in a pulse shape.

In the read operation, the output of the amplifier 664 is reset to the reference voltage Vref, and reading of the reset level Vref is performed, with the floating diffusions 63 being reset, by having the control signal EQ set to an L level before the driving signal TRG<0> is applied in a pulse shape (after the driving signal SEL<0> is set to an H level, and the driving signal RST<0> is set to an L level).

Further, the pixel signals from each unit pixel 650 of each pixel column are read, by the driving signal TRG<0> being applied in a pulse shape, are added via the vertical signal lines 45 and the capacitive elements 662 and input to the negative-side input terminal of the amplifier 664, and reading of the addition signals is performed.

Here, from the time when performing reading of the reset levels up to the time when performing reading of the pixel signals, increments of the voltages of each of the vertical signal lines VSL<0> through to VSL<c−1> are set as $\Delta VSL<0>, \Delta VSL<1>, ..., \Delta VSL<c-1>$, and if the capacitive values of each of the capacitive elements 662 and 663 are set to C_SUM and C_FB, a voltage of $\{(\Delta VSL<0>+\Delta VSL<1>+ ... +\Delta VSL<c-1>)/c\} \times (C\_FB/C\_SUM)+Vref$ will be output to the output terminal of the amplifier 664 as an addition signal.

Also, an addition signal in which noise is removed is output, by the ADC 666 performing a CDS process, which removes noise by taking the difference between the reset level Vref and the addition signal $\{(\Delta VSL<0>+\Delta VSL<1>+ ... +\Delta VSL<c-1>)/c\} \times (C\_FB/C\_SUM)+Vref$.

According to the above described operation, since it may not be necessary to perform an A/D conversion or a CDS process for each column, when reading an addition signal to which the signals of the unit pixels 650 have been added, it becomes possible to suppress power consumption in the case of performing illuminance detection and movement detection of all the imaging regions.

Further, since the vertical signal lines 45 and the capacitive elements 662 are formed so as to be electrically connected by the switches 661, the operation of the addition signal reading circuit 643 is capable of not having an influence on the reading operation of the ordinary pixel signals, by turning off the switches 661, at the time of performing reading of the ordinary pixel signals.

Note that in the above description, while the pixel columns to be added are described as the pixel columns 0 though to c−1, the pixel columns to be added can be set as arbitrary pixel columns, and may be, for example, all the pixel columns or the even numbered pixel columns (or the odd numbered columns).

In addition, the addition signal reading circuit 643 may be included for each pixel column to be added. For example, the addition signal reading circuit 643 may be included for 100 columns such as, for example, the $0^{th}$ through to $99^{th}$ pixel columns, the $100^{th}$ through to $199^{th}$ pixel columns or the like, or the addition signal reading circuit 643 may be included independently in the even numbered columns or the odd numbered columns.

[Eighth Embodiment of a CMOS Image Sensor Applicable to the Present Disclosure]

Figure 29:
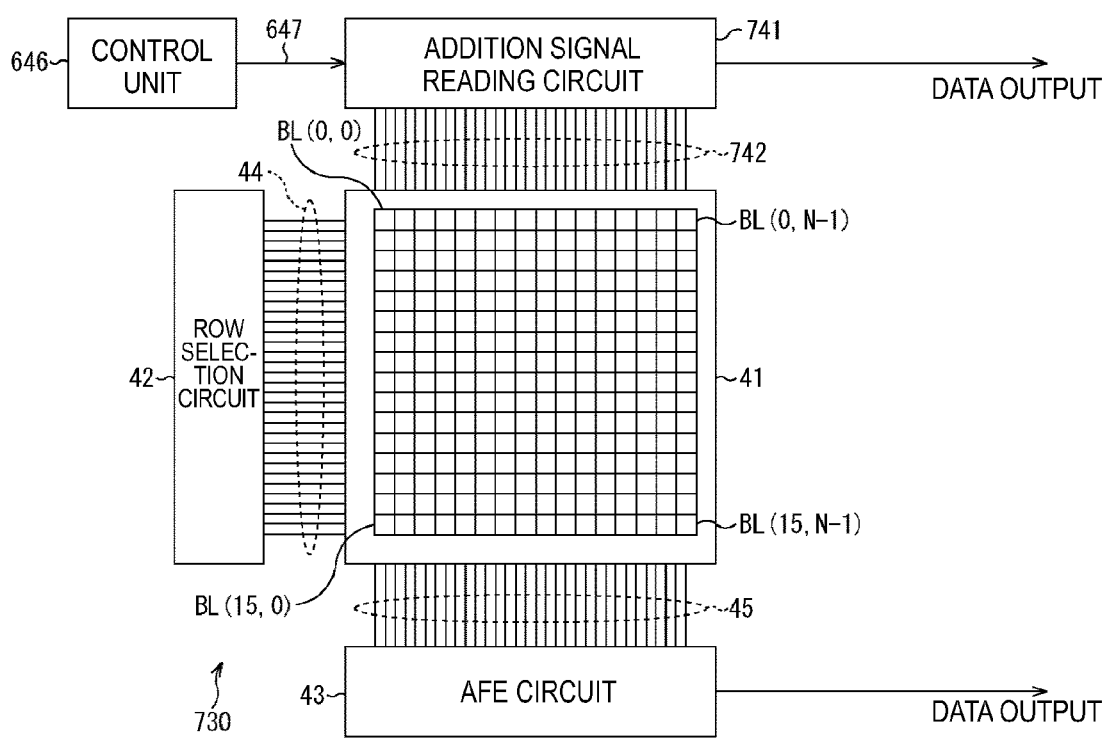
FIG. 29 is a figure which shows a configuration example of an eighth embodiment of a CMOS image sensor applicable to the present disclosure.

FIG. 29 is a figure which shows a configuration example for an eighth embodiment of the CMOS image sensor applicable to the present disclosure.

The CMOS image sensor 730 of FIG. 29 includes a pixel array 41, a row selection circuit 42, an AFE circuit 43, pixel driving lines 44, vertical signal lines 45, a control unit 646, control signal lines 647, an addition signal reading circuit 741, and vertical signal lines 742. Note that in FIG. 29, the same reference numerals are attached to parts having functions the same as those of the CMOS image sensor 130 of FIG. 7 and the CMOS image sensor 630 of FIG. 25, and a description of these parts will be arbitrary omitted.

Note that in the CMOS image sensor 730 of FIG. 29, the region of the pixel array 41 in which the pixels are arranged in a matrix shape is divided into regions of 16×N. Hereinafter, a set of the unit pixels 50 in each of the regions will be called a pixel block BL, and will be represented as a pixel block BL (s,t) in accordance with this position. Note that s represents the row of the pixel block, and is set to an integer of 0 through to 15. Further, t represents the column of the pixel block, and is set to an integer of 0 through to N−1. In addition, in order for simplicity, the row number M is a multiple of 16.

The addition signal reading circuit 741 adds, for each pixel column of the pixel array 41, pixel signals (addition signals) output via the vertical signal lines 742 from prescribed unit pixels included in the pixel blocks BL, and performs A/D conversion and a CDS process for the obtained pixel signals.

The vertical signal lines 742 are formed for each pixel column. Note that the vertical signal lines 742 may be formed by sharing with the vertical signal lines 45.

[Circuit Configuration Example of the Pixel Array, the AFE Circuit, and the Addition Signal Reading Circuit]

Next, a circuit configuration example of the pixel array 41, the AFE circuit 43, and the addition signal reading circuit 741 will be described with reference to FIG. 30.

Note that since the configuration of the AFE circuit 43 is the same as that described with reference to FIG. 8, a description of it will be omitted.

Figure 30:
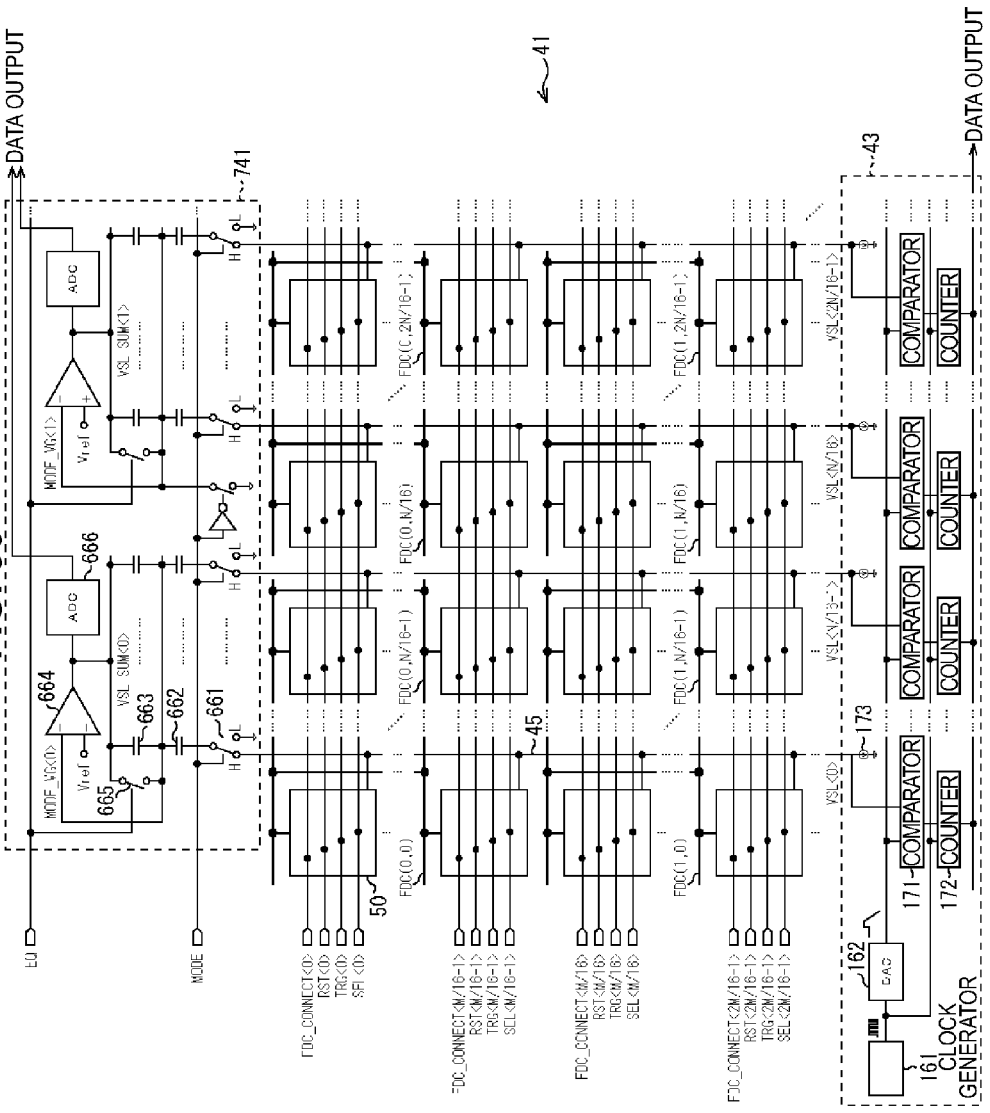
FIG. 30 is a figure which shows a configuration example of a pixel array, an AFE circuit, and an addition signal reading circuit.

While the unit pixels 50 are arbitrary omitted in the pixel array 41 of FIG. 30, the two upper unit pixels 50 of the left-most column ($0^{th}$ column) are included in a pixel block BL (0,0), and the two lower unit pixels 50 of the left-most column are included in a pixel block BL (1,0). Further, the two upper unit pixels 50 of the right-most column (2N/16−$1^{th}$ column) are included in a pixel block BL (0,2N/16−1), and the two lower unit pixels 50 of the right-most column are included in the pixel block BL (1,2N/16−1).

An addition node FDC is included in each pixel block BL, and is represented as an addition node FDC (s,t) corresponding to the pixel block. That is, an addition node FDC (0,0) is included in the pixel block BL (0,0), an addition node FDC (1,0) is included in the pixel block BL (1,0), and an addition node FDC (0,2N/16−1) is included in the pixel block BL (0,2N/16−1).

The addition node FDC is connected to the drains of the output transistors 67 of the unit pixels 50 included in each pixel block BL, and adds the charges output from the output transistors 67 of the unit pixels 50 for each pixel block BL. An addition signal, as the added charges, is output to the addition signal reading circuit 741, via the amplification transistor 65 and vertical signal line 45 of a prescribed unit pixel 50 included in each pixel block BL. More specifically, an addition signal is output to the addition signal reading circuit 741, via the amplification transistor 65 and vertical signal line 45 of a unit pixel 50, from among prescribed unit pixels 50 included in each of the pixel blocks BL, by turning on the selection transistors 66 of the unit pixels 50 of a pixel row selected by the driving signal SEL.

Note that in FIG. 30, the vertical signal lines 742 described in FIG. 29 are formed by sharing with the vertical signal lines 45.

The addition signal reading circuit 741 has switches 661, capacitive elements 662 and 663, amplifiers 664, switches 665, and ADCs 666. Note that in FIG. 30, the same reference numerals are attached to parts having functions the same as those of the addition signal reading circuit 643 of FIG. 27, and a description of these parts will be arbitrary omitted.

In the addition signal reading circuit 741 of FIG. 30, different from the addition signal reading circuit 643 of FIG. 27, the switches 661 and the capacitive elements 662 and 663 are included for all the pixel columns, and one amplifier 664, switch 665, and ADC 666 is included for each N/16 column. Specifically, in the addition signal reading circuit 741, 15 of the amplifiers 664, the switches 665, and the ADCs 666 are included in the column direction.

That is, the addition signal reading circuit 741 adds and outputs the addition signals from the addition node FDC for each pixel block BL, which are output to the vertical signal lines 45 for each N/16 column.

Note that the number of the amplifiers 664, the switches 665, and the ADCs 666 included in the column direction is not limited to 15.

[Reading of the Addition Signals]

Next, an operation example of the unit pixels 50, with regards to the reading of the addition signals, of the CMOS image sensor 730 will be described with reference to the timing chart of FIG. 31.

Figure 31:
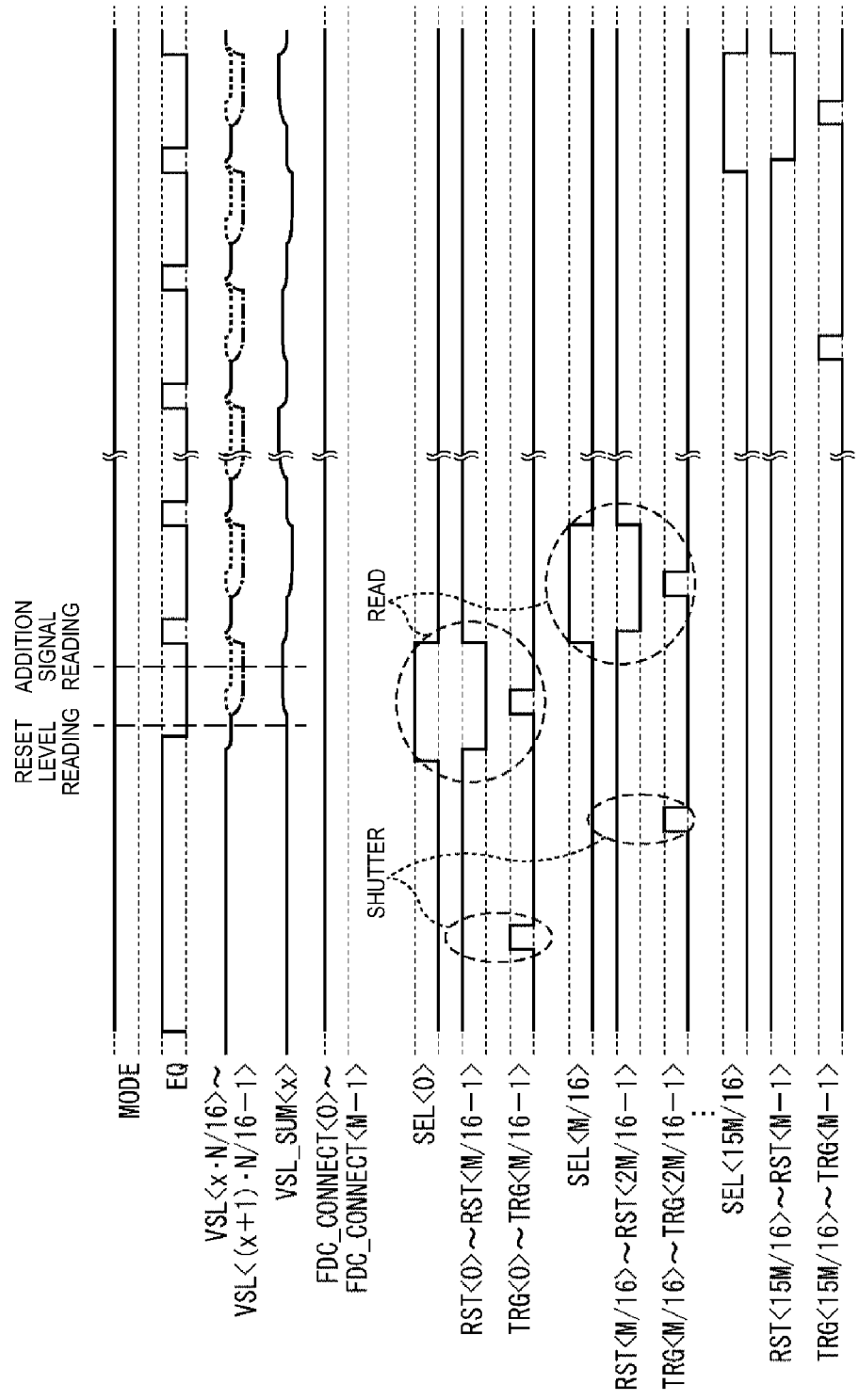
FIG. 31 is a timing chart which describes the reading of addition signals.

FIG. 31 shows the control signals MODE and EQ; the signal levels of the vertical signal lines VSL<x*N/16> through to VSL<(x+1)*N/16−1> of the pixel columns with the column numbers x*N/16 through to (x+1)*N/16−1 (0≤x≤15); and the negative-side input potential VSL_SUM<x> of the $X^{th}$ column direction amplifier 664.

Further, FIG. 31 shows the signal levels of the driving signals FDC_CONNECT<0> through to FDC_CONNECT<M−1> supplied to the pixel rows with the row numbers 0 through to M−1, that is, to all the pixel rows; the signal levels of the driving signals SEL<0>, RST<0> through to RST<M/16−1>, and TRG<0> through to TRG<M/16−1> supplied to the pixel rows included in the 0th row of the pixel block BL; the signal levels of the driving signals SEL<M/16>, RST<M/16> through to RST<2M/16−1>, and TRG<M/16> through to TRG<2M/16−1> supplied to the pixel rows included in the 1st row of the pixel block BL; . . . ; and the signal levels of the driving signals SEL<15M/16>, RST<15M/16> through to RST<M−1>, and TRG<15M/16> through to TRG<M−1> supplied to the pixel rows included in the 15th row of the pixel block BL.

Also here, in the reading of the addition signals, the control signal MODE, for turning on the switches 661 electrically connecting the vertical signal lines 45 and the capacitive elements 662, is ordinarily set to an H level. Further, the driving signals FDC_CONNECT<0> through to FDC_CONNECT<M−1> supplied to each unit pixel 50 of all the pixel rows are ordinarily set to an H level.

When focusing on the pixel blocks BL (0,0) through to BL (0,N−1) of the 0th row, first a shutter operation is performed, with the driving signals RST<0> through to RST<M/16−1> in an H level state, by the driving signals TRG<0> through to TRG<M/16−1> being applied in a pulse shape. In this case, the control signal EQ is set to an H level.

Afterwards, the driving signal SEL<0> is set to an H level from an L level, and a read operation (reading) is performed, with the driving signals RST<0> through to RST<M/16−1> in a state set to an L level from an H level, by the driving signals TRG<0> through to TRG<M/16−1> being applied in a pulse shape.

In the read operation, the reset levels of the addition nodes FDC (0,0) through to FDC (0,N−1) of the unit pixels 50 for each of the 0th row pixel blocks BL (0,0) through to BL (0,N−1), are read via the vertical signal lines VSL<0> through to VSL<N−1>, by having the control signal EQ set to an L level before the driving signals TRG<0> through to TRG<M/16−1> are applied in a pulse shape (after the driving signal SEL<0> is set to an H level, and the driving signals RST<0> through to RST<M/16−1> are set to an L level).

The signal levels of the addition nodes FDC (0,0) through to FDC (0,N−1) for each of the 0th row pixel blocks BL (0,0) through to BL (0,N−1) are read via the vertical signal lines VSL<0> through to VSL<N−1>, by the driving signals TRG<0> through to TRG<M/16−1> being applied in a pulse shape. In this way, the reading of the addition signals for each of the 0th row pixel blocks BL (0,0) through to BL (0,N−1) is performed.

Among these, each of the addition signals of the pixel blocks BL (0,0) through to BL (0,N/16−1) are set to an added signal VSL_SUM<0>, and are input to the negative-side input terminal of the 0th column direction amplifier 664 in the addition signal reading circuit 741 of FIG. 30. Further, each of the addition signals of the pixel blocks BL (0,N/16) through to BL (0,2N/16−1) are set to an added signal VSL_SUM<1>, and are input to the negative-side input terminal of the 1st column direction amplifier 664 in the addition signal reading circuit 741 of FIG. 30. Also, each of the addition signals of the pixel blocks BL (0,15N/16) through to BL (0,N−1) are set to an added signal VSL_SUM<N−1>, and are input to the negative-side input terminal of the 15th column direction amplifier 664 (not shown in the figure) in the addition signal reading circuit 741 of FIG. 30.

In this way, the addition signals, which are added by the addition node FDC with respect to the row direction (vertical direction), are added by the addition signal reading circuit 741 for each of a plurality of columns with respect to the column direction (horizontal direction).

Also in the above described operation, since it may not be necessary to perform an A/D conversion or a CDS process for each column, when reading an addition signal to which the signals of the unit pixels 50 have been added, it becomes possible to suppress power consumption in the case of performing illuminance detection and movement detection of all the imaging regions.

Further, since the vertical signal lines 45 and the capacitive elements 662 are formed so as to be electrically connected by the switches 661, the operation of the addition signal reading circuit 643 is capable of not having an influence on the reading operation of the ordinary pixel signals, by turning off the switches 661, at the time of performing reading of the ordinary pixel signals.

Note that in the present embodiment, while the pixel blocks BL are included in the unit pixels 50 of N/16×1, they may be included in a pixel number of the column direction as a plurality of two or more. In this case, the addition signals output from the addition node FDC (s,t) for each pixel block BL (s,t) are output to the addition signal reading circuit 741, via prescribed columns of the vertical signal lines 45 selected, for example, by the column selection signals in the third embodiment.

[Ninth Embodiment of a CMOS Image Sensor Applicable to the Present Disclosure]

Figure 32:
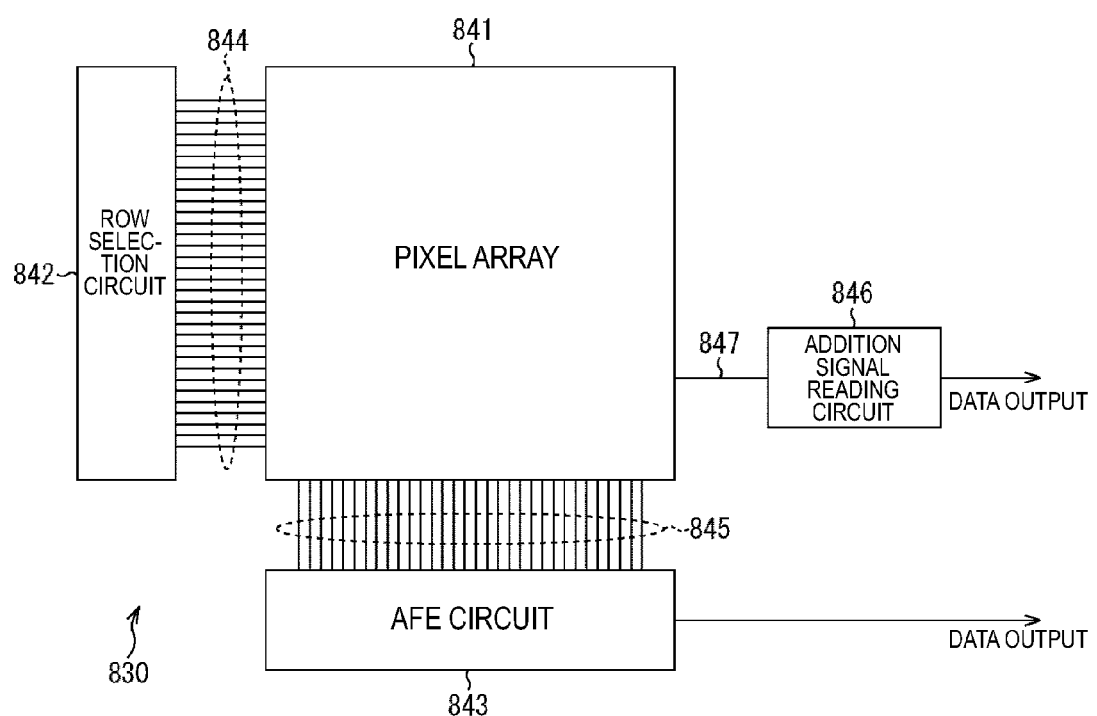
FIG. 32 is a figure which shows a configuration example of a ninth embodiment of a CMOS image sensor applicable to the present disclosure.

FIG. 32 is a figure which shows a configuration example for a ninth embodiment of the CMOS image sensor applicable to the present disclosure.

The CMOS image sensor 830 of FIG. 32 includes a pixel array 841, a row selection circuit 842, an AFE circuit 843, pixel driving lines 844, vertical signal lines 845, an addition signal reading circuit 846, and an addition node 847.

Unit pixels (the unit pixel 850 of FIG. 33) having a photoelectric conversion element, which generates an optical charge of a charge amount corresponding to an amount of incident light and accumulates the optical charge internally, are arranged two-dimensionally in a matrix shape in the pixel array 841.

The pixel driving lines 844 are formed in the pixel array 841 along a left-right direction of the figure for each row (an array direction of pixels for the pixel rows), and the vertical signal lines 845 are formed in the pixel array 841 along an up-down direction of the figure for each column (an array direction of pixels for the pixel columns), in accordance with a matrix shaped pixel array. One end of the pixel driving lines 844 are connected to the output ends corresponding to each row of the row selection circuit 842.

The row selection circuit 842 simultaneously drives all the pixels, or drives each pixel by row units or the like, by supplying a driving signal for each pixel of the pixel array 841.

The pixel signals output from each unit pixel of the pixel rows selected by the driving signal supplied from the row selection circuit 842 are supplied to the AFE circuit 843 via the respective vertical signal lines 845.

The AFE circuit 843 performs, for each pixel column of the pixel array 841, a prescribed signal process for the pixel signals output via the vertical signal lines 845 from each unit pixel of the selected rows, and temporarily holds the pixel signals after signal processing. Specifically, the AFE circuit 843 performs a CDS process and A/D conversion for the pixel signals output via the vertical signal lines 845.

Further, the pixel signals output from each unit pixel selected by the driving signal supplied from the row selection circuit 842 are also supplied to the addition signal reading circuit 846 via the addition node 847.

The addition signal reading circuit 846 performs a CDS process and A/D conversion for the pixel signals from each unit pixel added in the addition node 847.

The addition node 847 adds the pixel signals output from each unit pixel, and supplies the added pixel signals to the addition signal reading circuit 846 as an addition signal.

[Circuit Configuration Example of the Pixel Array]

Next, a circuit configuration example of the pixel array 841 of FIG. 32 will be described with reference to FIG. 33.

Figure 33:
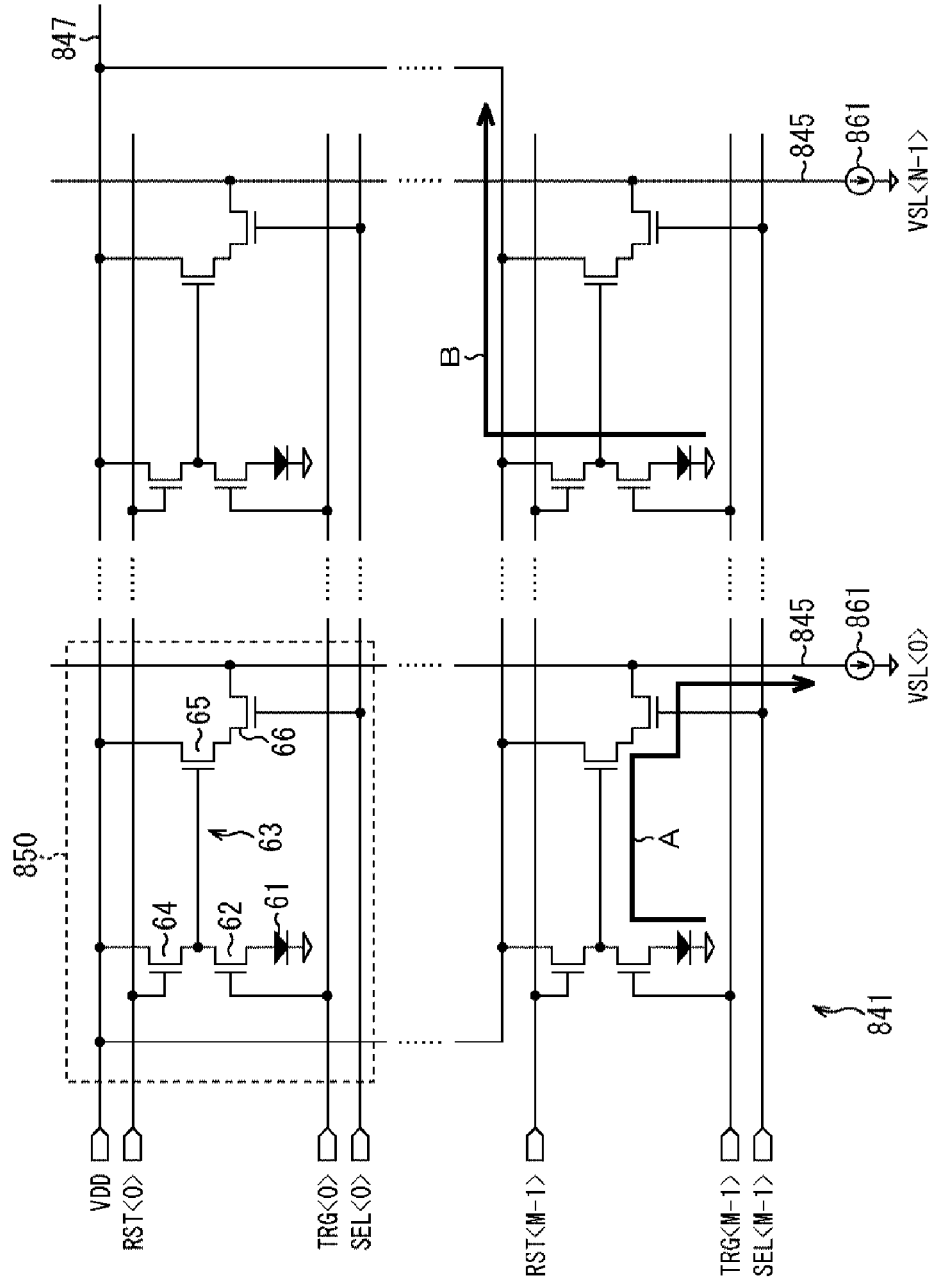
FIG. 33 is a figure which shows a configuration example of a pixel array.

The pixel array 841 of FIG. 33 includes M number of unit pixels 850 arranged in a row direction, and N number of unit pixels 850 arranged in a column direction.

Here, the row numbers of the rows in which the unit pixels 850 are arranged are set as 0, 1, 2, . . . , M−1 in this sequence from the top, and the column numbers of the columns in which the unit pixels 850 are arranged are set as 0, 1, 2, . . . , N−1 in this sequence from the top, and this will be followed hereinafter.

Further, the driving signals supplied to each unit pixel 850 of the pixel row with the row number m are each represented as TRG<m>, RST<m>, SEL<m> and the like, and the vertical signal line 845 which corresponds to the pixel column with the column number n and the signals thereto output are represented as VSL<n> and the like. That is, for example, the driving signals supplied to each unit pixel 850 of the pixel row with the row number 0 are each represented as TRG<0>, RST<0>, SEL<0> and the like, and the vertical signal line 845 which corresponds to the pixel column with the column number 0 and the signals thereto output are represented as VSL<0> and the like. Further, note that the power supply VDD voltage is similarly supplied for all the unit pixels 850 via power supply wiring.

The unit pixel 850 of FIG. 33 includes a photodiode 61, a transfer transistor 62, floating diffusion (FD) 63, a reset transistor 64, an amplification transistor 65, and a selection transistor 66. Note that in FIG. 33, the same reference numerals are attached to parts having functions the same as those of the unit pixel 50 of FIG. 2, and a description of these parts will be arbitrary omitted.

That is, in the unit pixel 850 of FIG. 33, different from the unit pixel 50 of FIG. 2, an output transistor 67 is not included. Further, in the pixel array 841 of FIG. 33, the drains of the reset transistors 64 of each unit pixel 850 are connected to the addition node 847, via power supply wiring. That is, all the floating diffusions 63 of each unit pixel 850 are all electrically connected via the reset transistors 64.

In this way, an addition signal, to which the charges of the floating diffusions 63 of all the unit pixels 850 in the pixel array 841 have been added, is read to the addition signal reading circuit 846 via the power supply wiring and the addition node 847.

Further, in the pixel array 841, a load MOS 861 is connected to each of the vertical signal lines 845 (VSL<0> through to VSL<N−1>) of each pixel column. The load MOS 861 constitutes the amplification transistor 65 and a source follower circuit of each unit pixel 850, by being connected to the vertical signal lines 845.

In the case where an electronic apparatus on which the CMOS image sensor 830 is mounted functions as a camera, and reading of the pixel signals for each row is performed, the charges accumulated in the photodiodes 61 of each unit pixel 850 in the pixel array 841 are output to the vertical signal lines 845, via the transfer transistors 62, the floating diffusions 63, the amplification transistors 65 and the selection transistors 66, such as shown by the arrow A in FIG. 33. In this case, the load MOSs 861 of each pixel column are turned on.

On the other hand, in the case where an electronic apparatus on which the CMOS image sensor 830 is mounted functions as, for example, an illuminometer, and reading of the addition signals is performed, the charges accumulated in the photodiodes 61 of each unit pixel 850 in the pixel array 841 are output to the power supply wiring, via the transfer transistors 62 and the reset transistors 64, such as shown by the arrow B in FIG. 33. In this case, the load MOSs 861 of each pixel column are turned off.

In this way, in the CMOS image sensor 830, since the load MOSs 861 of each pixel column are all turned off at the time when performing reading of the addition signals, it becomes possible to implement ultra-low power consumption which may be required when performing illuminance detection and movement detection.

[Pixel Array of the Related Art]

Figure 34:
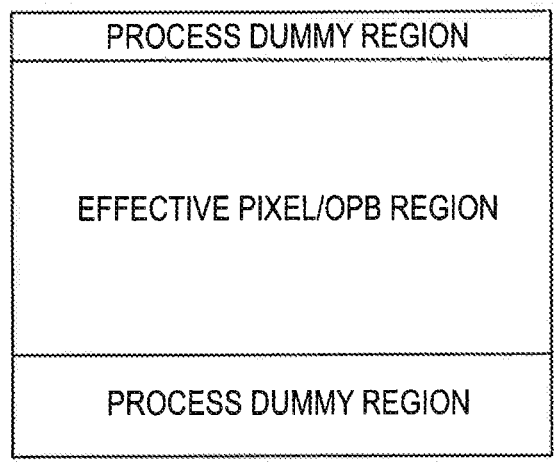
FIG. 34 is a figure which describes a pixel array of the related art.

Incidentally, a pixel array of the related art, as shown in FIG. 34, is mainly divided into an effective pixel/OPB region and process dummy regions. Effective pixels, which output the pixel signals as video signals, and optical black pixels (hereinafter, called OPB pixels), which output pixel signals serving as a standard for black in the video signals, are arranged in the effective pixel/OPB region. Further, dummy pixels, for restraining the variations in the processes and deterioration of the pixels close to the boundary of the effective pixel/OPB region, are arranged in the process dummy regions.

However, in the case of a pixel array such as that shown in FIG. 34, the pixel signals of the effective pixels and the pixel signals of the OPB pixels are mixed together when performing reading of the addition signals, and there is the possibility that this will interfere with the implementation of a high S/N.

Accordingly, hereinafter a pixel array of the present embodiment will be described.

[Example of a Pixel Array of the Present Embodiment]

Figure 35:
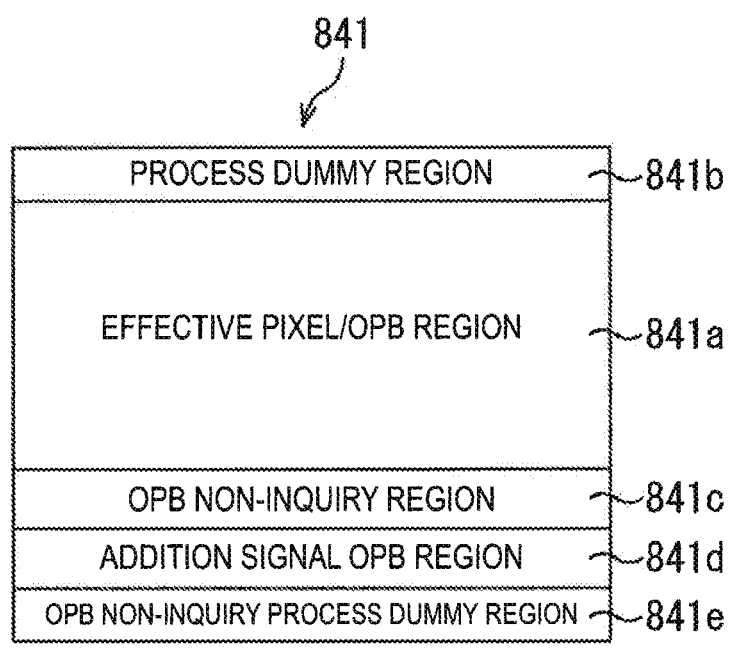
FIG. 35 is a figure which described an example of a pixel array of the present embodiment.

FIG. 35 shows an example of a pixel array of the present embodiment.

As shown in FIG. 35, the pixel array 841 is divided into an effective pixel/OPB region 841*a*, a process dummy region 841*b*, an OPB non-inquiry region 841*c*, an addition signal OPB region 841*d*, and an OPB non-inquiry process dummy region 841*e*.

Unit pixels 850 are arranged as effective pixels and OPB pixels in the effective pixel/OPB region 841*a*, and dummy pixels are arranged in the process dummy region 841*b*.

Unit pixels 850, in which the opening sections are shielded by a shielding metal, are arranged in each of the OPB non-inquiry region 841*c*, the addition signal OPB region 841*d*, and the OPB non-inquiry process dummy region 841*e*.

Among these, the pixels arranged in the addition signal OPB region 841*d* are OPB pixels (hereinafter, called addition signal OPB pixels) which output pixel signals (hereinafter, called standard signals) serving as a standard for black in the addition signals.

Further, the pixels arranged in the OPB non-inquiry region 841*c* and the OPB non-inquiry process dummy region 841*e* are pixels for restraining noise or the like due to a break in regularity of pixel signals of the pixels close to the boundary of the effective pixel/OPB region 841*a* and the addition signal OPB region 841*d*. While it is possible for these pixels to output pixel signals, the output pixel signals are not used in the subsequent stages.

Note that in the pixel array 841 shown in FIG. 35, power supply wiring connected to each pixel is formed so as to be electrically separable by the effective pixel/OPB region 841a and the addition signal OPB region 841d, as well as by the OPB non-inquiry region 841c, the addition signal OPB region 841d and the OPB non-inquiry process dummy region 841e.

[Regarding the Power Supply Wiring]

Here, a configuration of the power supply wiring in the pixel array 841 will be described with reference to FIG. 36.

Figure 36:
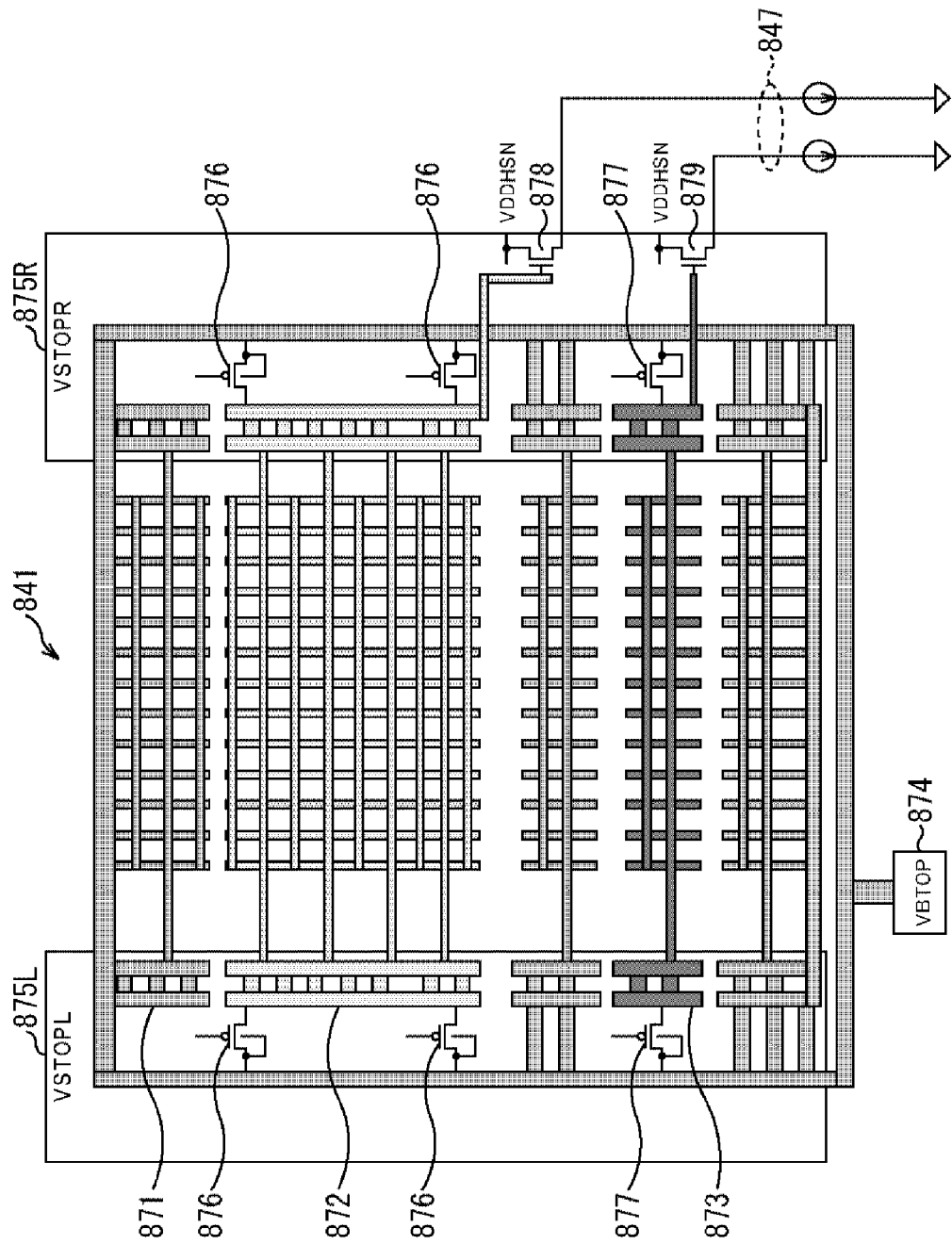
FIG. 36 is a figure which describes power supply wiring.

The pixel array 841 shown in FIG. 36 has power supply wiring 871, 872 and 873, a power supply PAD 874, row selection circuits 875L and 875R, switching transistors 876 and 877, and amplification transistors 878 and 879.

The power supply wiring 871 is power supply wiring which supplies a power supply VDD voltage to the pixels arranged in the OPB non-inquiry region 841c, the addition signal OPB region 841d, and the OPB non-inquiry process dummy region 841e.

The power supply wiring 872 is power supply wiring which supplies a power supply VDD voltage to the pixels arranged in the effective pixel/OPB region 841a.

The power supply wiring 873 is power supply wiring which supplies a power supply VDD voltage to the pixels arranged in the addition signal OPB region 841d.

The power supply PAD 874 is connected to a power supply, which is not shown in the figure, and supplies a power supply VDD voltage to the power supply wiring 871.

The row selection circuits 875L and 875R, which correspond to the row selection circuit 842 of FIG. 32, supply driving signals to each pixel of the pixel array 841.

The switching transistor 876 electrically connects the power supply wiring 871 and the power supply wiring 872 by being turned on, and electrically separates the power supply wiring 871 and the power supply wiring 872 by being turned off.

The switching transistor 877 electrically connects the power supply wiring 871 and the power supply wiring 873 by being turned on, and electrically separates the power supply wiring 871 and the power supply wiring 873 by being turned off.

The amplification transistor 878 amplifies the voltage of the power supply wiring 872. The voltage (voltage signal) amplified by the amplification transistor 878 is output to the addition node 847.

The amplification transistor 879 amplifies the voltage of the power supply wiring 873. The voltage (voltage signal) amplified by the amplification transistor 879 is output to the addition node 847.

In a configuration such as described above, in the case where an electronic apparatus on which the CMOS image sensor 830 is mounted functions as a camera, and reading of the pixel signals for each row is performed, the switching transistors 876 and 877 are turned on, and the power supply VDD voltage supplied to the power supply wiring 871 is also supplied to the power supply wiring 872 and 873, via the switching transistors 876 and 877.

In this way, in the case where an electronic apparatus on which the CMOS image sensor 830 is mounted functions as a camera, since the power supply of all the pixels in the pixel array 841 is the same, characteristic deterioration due to an IR drop or periodic breaks can be avoided.

On the other hand, in the case where an electronic apparatus on which the CMOS image sensor 830 is mounted functions as, for example, an illuminometer, and reading of the addition signals is performed, the switching transistor 876 is turned off, and the addition signals output to the power supply wiring 872 are read in the addition signal reading circuit 846 (FIG. 32), via the amplification transistor 878 and the addition node 847. Further, the switching transistor 877 is similarly turned off, and standard signals output to the power supply wiring 873 are read in the addition signal reading circuit 846, via the amplification transistor 879 and the addition node 847.

In the addition signal reading circuit 846, a CDS process is performed, based on the addition signals output to the power supply wiring 872 and the standard signals output to the power supply wiring 873, and an addition signal in which noise is removed is read.

In this way, in the case where an electronic apparatus on which the CMOS image sensor 830 is mounted functions as, for example, an illuminometer, since the power supply is separated by the effective pixel/OPB region 841a and the addition signal OPB region 841d in the pixel array 841, it becomes possible to implement the reading of addition signals of a high S/N without the pixel signals of the effective pixels and the pixel signals of the addition signal OPB pixels being mixed together.

[Regarding Countermeasures for the Wiring Capacity]

As described above, in the case where the CMOS image sensor 830 functions as, for example, an illuminator, the addition signals output to the power supply wiring 872 and the standard signals output to the power supply wiring 873 are read. In this case, there is the possibility that a difference of the wiring capacity between the power supply wiring 872 and the power supply wiring 873 will appear as a difference between the output addition signals and the standard signals.

Here, the CMOS image sensor 830 is set to be a surface irradiation type CMOS image sensor.

In the effective pixel/OPB region 841a, if a capacity of the unit pixels 850 is set as W, the row number is set as Xa, the column number is set as Y, a wiring capacity of the boundary portion between the power supply wiring 871 and the power supply wiring 872 is set as Ba, a junction capacity of the switching transistor 876 is set as Ja, and a gate capacity of the amplification transistor 878 is set as Ga, the wiring capacity of the power supply wiring 872 will be represented as $\{W \times (Xa \times Y) + Ba + Ja + Ga\}/(Xa \times Y)$.

Further, in the addition signal OPB region 841d, if the capacity of the unit pixels 850 is set as W, the row number is set as Xb, the column number is set as Y, a wiring capacity of the boundary portion between the power supply wiring 871 and the power supply wiring 873 is set as Bb, a junction capacity of the switching transistor 877 is set as Jb, and a gate capacity of the amplification transistor 879 is set as Gb, the wiring capacity of the power supply wiring 873 will be represented as $\{W \times (Xb \times Y) + Bb + Jb + Gb\}/(Xb \times Y)$.

In this case, the wiring capacity of the power supply wiring 873 (the addition signal OPB region 841d) will become greater than the wiring capacity of the power supply wiring 872 (the effective pixel/OPB region 841a).

Accordingly, in the addition signal OPB region 841d in the present embodiment, the junction capacity Jb of the switching transistor 876 will be made smaller, by the size of the switching transistor 877 being made larger than that of the switching transistor 876.

Further, the pixel row number Xb in the addition signal OPB region 841d is set to be a prescribed row number (for example, five rows) or more.

By countermeasures such as those described above, it becomes possible to reduce the difference of the wiring capacity between the power supply wiring 872 and the power supply wiring 873.

Note that while the above described countermeasures are effective in the case where the wiring capacity of the power supply wiring 873 becomes greater than that of the power supply wiring 872, in a rear surface irradiation type CMOS image sensor, in which the wiring layer is formed on the opposite side to that of a light receiving surface, the wiring capacity of the power supply wiring 873 will become smaller than the wiring capacity of the power supply wiring 872, due to a shielding metal included in the addition signal OPB region 841*d*.

Here, countermeasures which reduce the difference of the wiring capacity between the power supply wiring 872 and the power supply wiring 873, in a rear surface irradiation type CMOS image sensor 830, will be described.

[Wiring Layout of the Effective Pixel Region]

First, a wiring layout of each wiring layer in the effective pixel/OPB region 841*a*, in the case where the CMOS image sensor 830 is a rear surface irradiation type CMOS image sensor, will be described with reference to FIG. 37.

Figure 37:
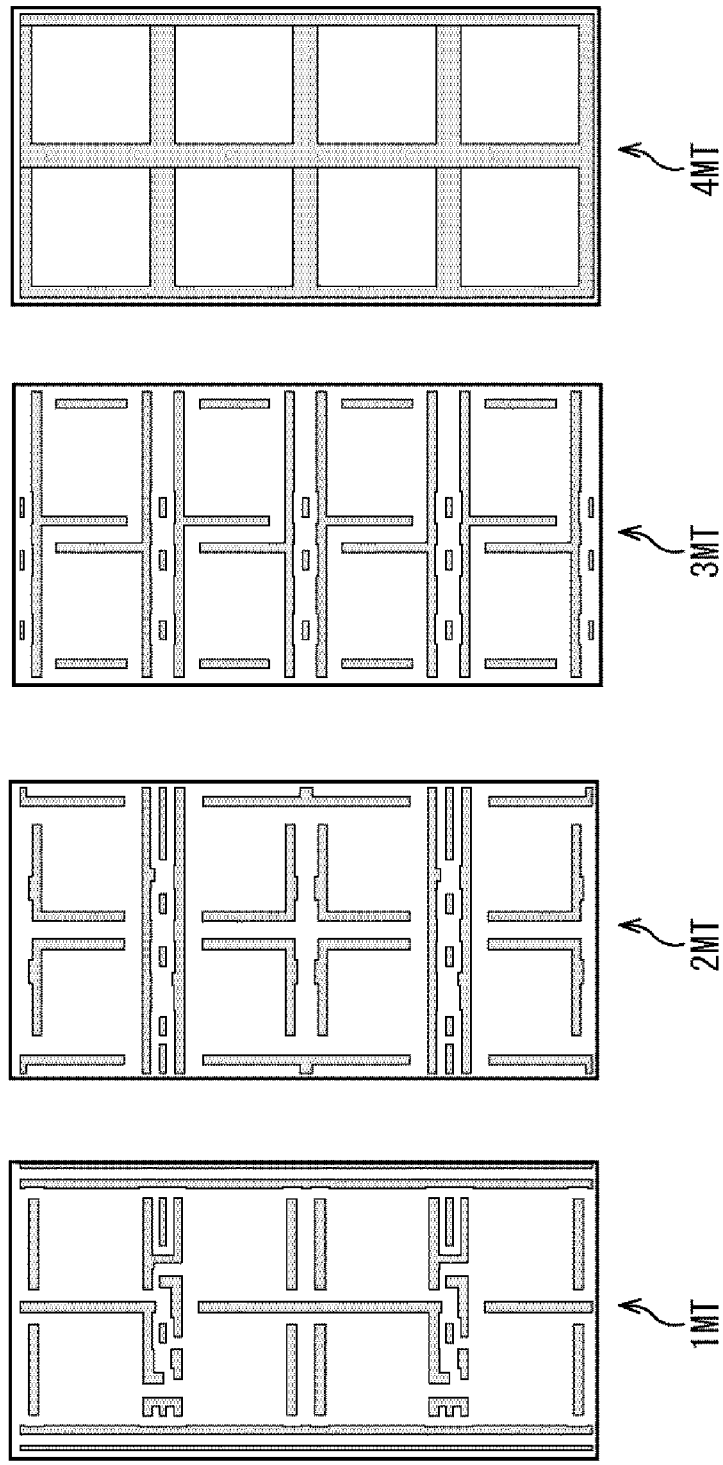
FIG. 37 is a figure which shows a wiring layout of an effective pixel region.

FIG. 37 shows a wiring layout of a first wiring layer 1MT, a second wiring layer 2MT, a third wiring layer 3MT, and a fourth wiring layer 4MT, from the bottom layer of each wiring layer in the effective pixel/OPB region 841*a*.

A wiring layout of an 8 pixel portion in the effective pixel/OPB region 841*a* is shown for each of the first wiring layer 1MT through to the fourth wiring layer 4MT shown in FIG. 37.

A horizontal straight line type pattern in the first wiring layer 1MT and an L shaped type pattern in the second wiring layer 2MT show the leader lines for the gate electrodes of the transfer transistors 62 of each pixel.

Further, a T shaped type pattern in the third wiring layer 3MT shows the signal wires for supplying the driving signal TRG to the gate electrodes of the transfer transistors 62 of each pixel.

Also, a latticed pattern in the fourth wiring layer 4MT shows the power supply wiring 872.

[Wiring Layout of the OPB Region]

Next, a wiring layout of each wiring layer in the addition signal OPB region 841*d*, in the case where the CMOS image sensor 830 is a rear surface irradiation type CMOS image sensor, will be described with reference to FIG. 38.

Figure 38:
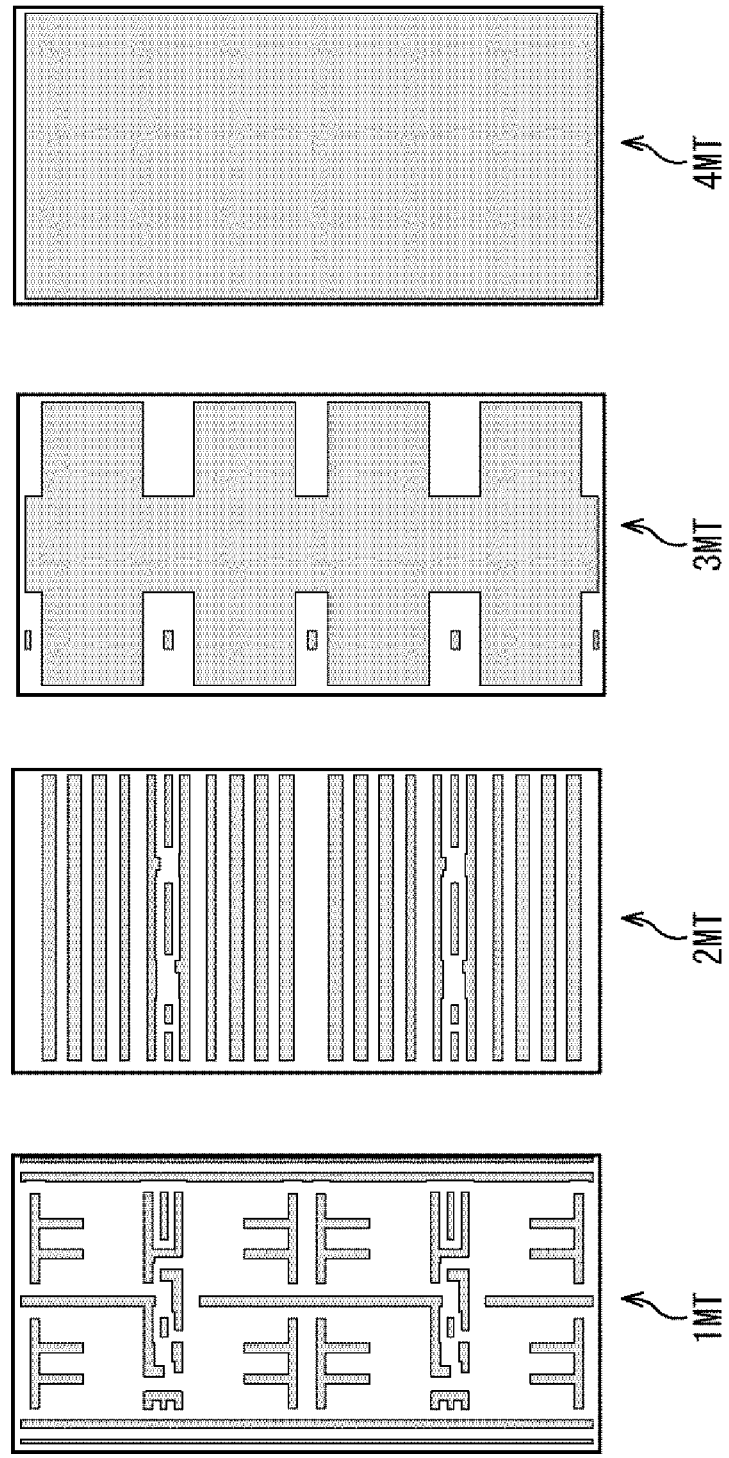
FIG. 38 is a figure which shows a wiring layout of an OPB region.

FIG. 38 shows a wiring layout of a first wiring layer 1MT, a second wiring layer 2MT, a third wiring layer 3MT, and a fourth wiring layer 4MT, from the bottom layer of each wiring layer in the addition signal OPB region 841*d*.

A wiring layout of an 8 pixel portion in the addition signal OPB region 841*d* is shown for each of the first wiring layer 1MT through to the fourth wiring layer 4MT shown in FIG. 38.

A comb type pattern in the first wiring layer 1MT shows the leader lines for the gate electrodes of the transfer transistors 62 of each pixel.

A horizontal striped pattern in the second wiring layer 2MT shows the signal wires for supplying the driving signal TRG to the gate electrodes of the transfer transistors 62 of each pixel.

Further, a latticed pattern in the third wiring layer 3MT shows the power supply wiring 873.

Also, a non-pattern, a so-called solid pattern, in the fourth wiring layer 4MT shows the shielding metal.

In this way, in the rear surface irradiation type CMOS image sensor 830, the wiring capacity of the power supply wiring 873 becomes smaller than the wiring capacity of the power supply wiring 872, due to a shielding metal included in the addition signal OPB region 841*d*.

Accordingly, in order to increase the wiring capacity of the power supply wiring 873, the pattern of the leader lines for the gate electrodes of the transfer transistors 62 of each pixel is changed from a horizontal straight line type shown in the first wiring layer 1MT of FIG. 37 to a comb type, such as shown in the first wiring layer 1MT of FIG. 38.

Further, the layer of the signal lines for supplying the driving signal TRG to the gate electrodes of the transfer transistors 62 of each pixel is changed from the third wiring layer 3MT of FIG. 37, such as shown in the second wiring layer 2MT of FIG. 38.

By countermeasures such as those described above, it becomes possible to reduce the difference of the wiring capacity between the power supply wiring 872 and the power supply wiring 873, even in a rear surface irradiation type CMOS image sensor 830.

While in the above description, the effective pixels and the OPB pixels, which output pixel signals serving as a standard for black in the video signals, are arranged in the same region (the effective pixel/OPB region 841*a*) as a pixel array in the pixel array 841, the addition signal OPB pixels may be used as the OPB pixels, which outputs pixel signals serving as a standard for black in the video signals.

[Another Example of a Pixel Array of the Present Embodiment]

Figure 39:
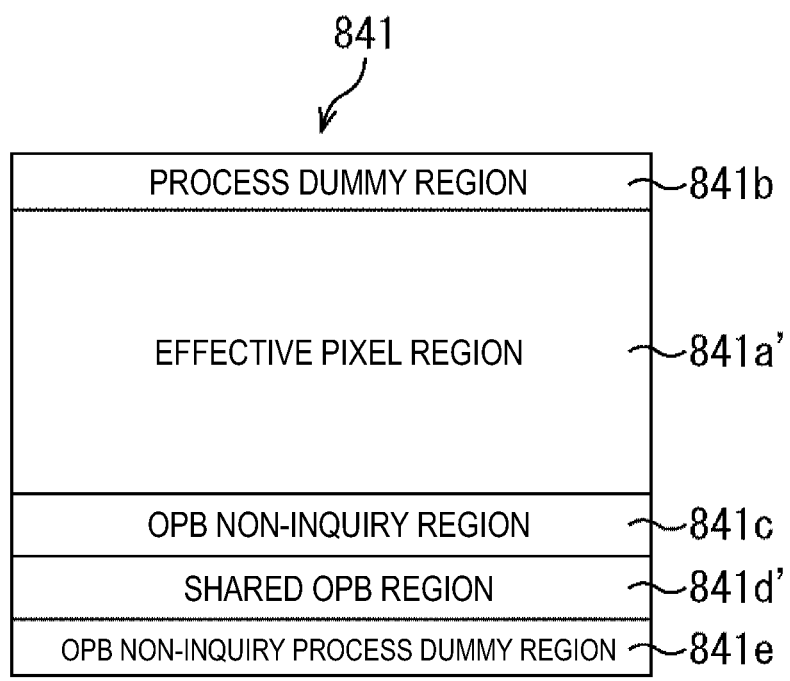
FIG. 39 is a figure which describes another example of a pixel array of the present embodiment.

FIG. 39 shows another example of a pixel array of the present embodiment.

As shown in FIG. 39, the pixel array 841 is divided into an effective pixel region 841*a*', a process dummy region 841*b*, an OPB non-inquiry region 841*c*, a shared OPB region 841*d*', and an OPB non-inquiry process dummy region 841*e*.

Note that in FIG. 39, the process dummy region 841*b*, the OPB non-inquiry region 841*c*, and the OPB non-inquiry process dummy region 841*e* are similar to those described with reference to FIG. 35.

Only effective pixels are arranged in the effective pixel region 841*a*'.

Further, the pixel signals serving as a standard for black in the video signals are output to the shared OPB region 841*d*', and OPB pixels, which output the pixel signals (standard signals) serving as a standard for black in the addition signals, are arranged in the shared OPB region 841*d*'.

Also in the pixel array 841 shown in FIG. 39, the power supply wiring connected to each pixel is formed so as to be electrically separable by the effective pixel region 841*a*' and the shared OPB region 841*d*', as well as by the OPB non-inquiry region 841*c*, the shared OPB region 841*d*' and the OPB non-inquiry process dummy region 841*e*.

Note that it is possible for the pixel array shown in FIG. 39 to be applied to a range in which characteristic deterioration due to an IR drop or periodic breaks does not have an effect on the image quality, when an electronic apparatus on which the CMOS image sensor 830 is mounted functions as a camera.

[Configuration Example of an Electronic Apparatus Applicable to the Present Disclosure]

The present disclosure is capable of being applied to a general electronic apparatus which uses the solid state imaging apparatus in an image capturing section (photoelectric conversion section), such as an imaging apparatus such as a digital still camera or video camera, a portable terminal apparatus having an imaging function, or a copier machine which uses a solid state imaging apparatus in an imaging reading section. The solid state imaging apparatus may have a configuration which is formed as one chip, or may have a module shaped configuration having an imaging function, in which an imaging section and a signal processing section or optical system are consolidated and packaged.

Figure 40:
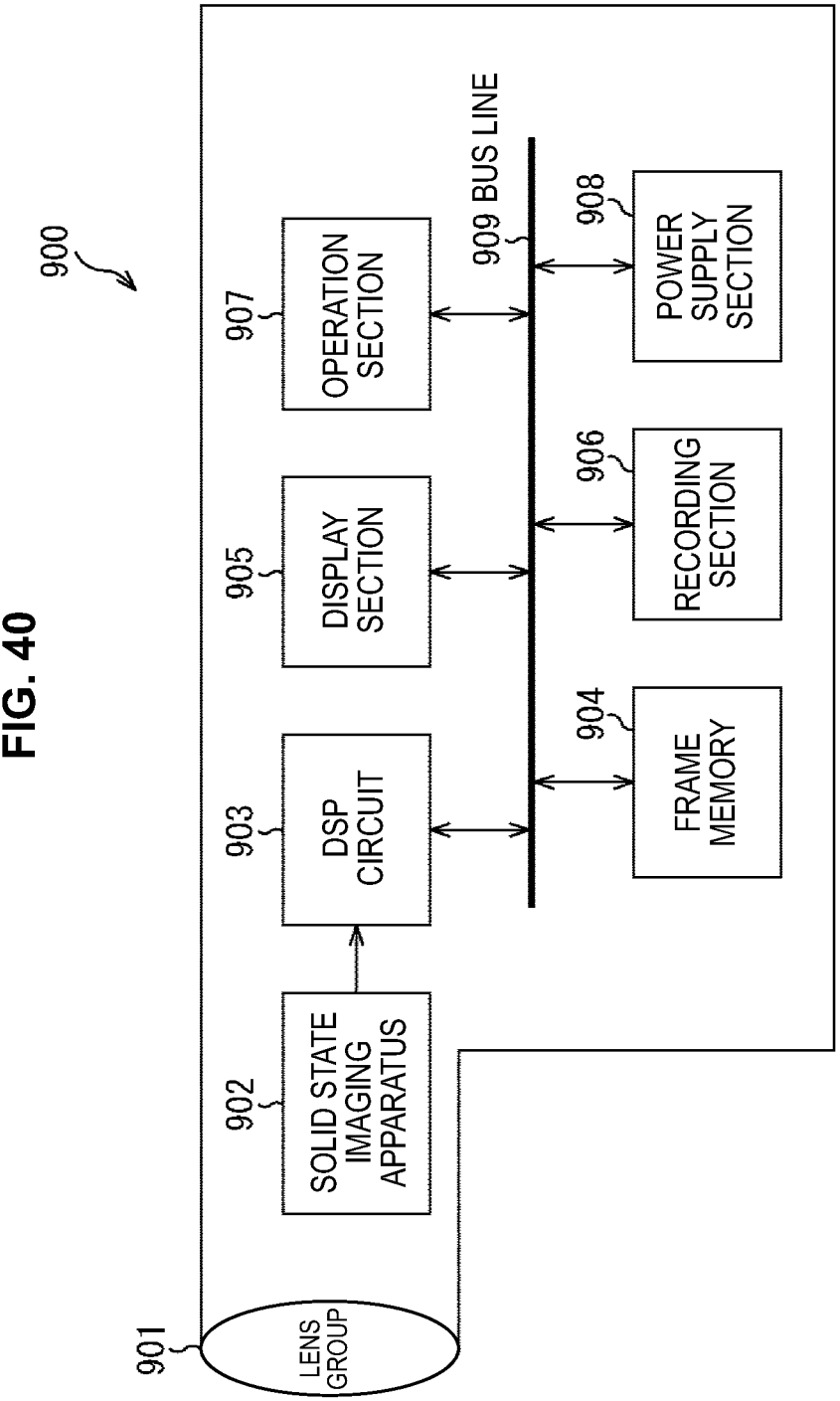
FIG. 40 is a figure which shows a configuration example for an embodiment of an electronic apparatus applicable to the present disclosure.

FIG. 40 is a block diagram which shows a configuration example for an imaging apparatus as an electronic apparatus applicable to the present disclosure.

The imaging apparatus 900 of FIG. 40 includes an optical section 901 which constitutes a lens group or the like, a solid state imaging apparatus (imaging device) 902 in which each configuration of the above described unit pixels 50 are adopted, and a DSP circuit 903 which is a camera signal processing circuit. Further, the imaging apparatus 900 also includes a frame memory 904, a display section 905, a recording section 906, an operation section 907, and a power supply section 908. The DSP circuit 903, the frame memory 904, the display section 905, the recording section 906, the operation section 907, and the power supply section 908 are mutually connected via a bus line 909.

The optical section 901 forms an image on an imaging surface of the solid state imaging apparatus 902 by taking in incident light (image light) from a photographic subject. The solid state imaging apparatus 902 converts the amount of incident light forming the image on the imaging surface by the optical section 901 into an electrical signal with a pixel unit, and outputs the electrical signal as a pixel signal. A solid state imaging apparatus such as the CMOS image sensor 30 according to the above described embodiments can be used as this solid state imaging apparatus 902.

The display section 905 is constituted of, for example, a panel type display apparatus such as a liquid crystal panel or an organic EL (Electro Luminescence) panel, and displays a moving image or a still image imaged by the solid state imaging apparatus 902. The recording section 906 records the moving image or still image imaged by the solid state imaging apparatus 902 to a recording medium such as a video tape or a DVD (Digital Versatile Disk).

The operation section 907 issues operation instructions for the various functions of the imaging apparatus 900, under operations by a user. The power supply section 908 arbitrary supplies various power supplies, which become the operation power supplies of the DSP circuit 903, the frame memory 904, the display section 905, the recording section 906, and the operation section 907, to these supply targets.

As described above, in the case where illuminance or movement is detected in a photography environment biased towards brightness, values can be provided for each imaging region, and more accurate illuminance detection and movement detection can be performed, by using the CMOS image sensor 30 or the like according to the above described embodiments as the solid state imaging apparatus 902.

Further, in the above described embodiments, an example has been included in the case of applying a CMOS image sensor in which unit pixels, which detect electric signals corresponding to the amount of visible light as a physical amount, are arranged in a matrix shape. However, the present disclosure is not limited to an application for a CMOS image sensor, and it is possible to be applied to a general solid state imaging apparatus.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1)
A solid state imaging apparatus including:
  a pixel array in which a plurality of unit pixels are arranged two-dimensionally, wherein each pixel includes
    a photoelectric conversion element,
    a transfer transistor which transfers a charge accumulated in the photoelectric conversion element to floating diffusion,
    a reset transistor which resets the charge of the floating diffusion, and
    an output transistor which outputs the charge of the floating diffusion,
  wherein the floating diffusion of at least one of the plurality of unit pixels is electrically connected via the output transistor.

(2)
The solid state imaging apparatus according to (1), further including:
  an addition node which adds the charge output from the output transistor of the at least one of the plurality of unit pixels; and
  an addition signal reading circuit which reads the charge added in the addition node as an addition signal.

(3)
The solid state imaging apparatus according to (2),
  wherein the addition node adds the charges output from the output transistors of all the unit pixels in the pixel array.

(4)
The solid state imaging apparatus according to (2),
  wherein the addition node is provided for each pixel block which is a set of the unit pixels in each region of the pixel array, and adds the charge output from the output transistor of the unit pixels included in the pixel block.

(5)
The solid state imaging apparatus according to (4),
  wherein each unit pixel further includes an amplification transistor which outputs a signal corresponding to the charge of the floating diffusion, and
  wherein, for each pixel block, the amplification transistor of a prescribed unit pixel included in the pixel block outputs the addition signal to the addition signal reading circuit.

(6)
The solid state imaging apparatus according to (5),
  wherein a vertical signal line is provided for each column of the unit pixels, and
  wherein, for each pixel block, the amplification transistor of the prescribed unit pixel included in the pixel block outputs the addition signal to the addition signal reading circuit via the vertical signal line.

(7)
The solid state imaging apparatus according to (6),
  wherein each unit pixel further includes a selection transistor which supplies an output of the amplification transistor to the vertical signal line, and
  wherein, for each pixel block, the amplification transistor of the unit pixel including the selection transistor selected by a driving signal supplied to each row of the unit pixels outputs the addition signal to the addition signal reading circuit via the vertical signal line.

(8)
The solid state imaging apparatus according to (7),
  wherein the addition signal reading circuit includes
    an A/D convertor connected to the vertical signal line to which the addition signal for each pixel block is output, and a dummy load connected to the vertical signal line to which the addition signal for each pixel block is not output.

(9)
The solid state imaging apparatus according to (7),
wherein the addition signal reading circuit includes an A/D convertor for each column connected to the vertical signal line, and
wherein, for each pixel block, the addition signal is output to the A/D convertor connected to the vertical signal line of a column selected by a column selection signal.

(10)
The solid state imaging apparatus according to any one of (1) to (9), further including:
a substrate potential control circuit which applies a prescribed potential to a substrate on which the pixel array is formed,
wherein the substrate potential control circuit applies a ground potential to the substrate at a time when performing a shutter operation which discharges the charge accumulated in the photoelectric conversion element, and applies a prescribed positive potential to the substrate at a time when performing an accumulation operation which accumulates the charge in the photoelectric conversion element.

(11)
The solid state imaging apparatus according to (10),
wherein the substrate potential control circuit applies, after performing the accumulation operation, the ground potential to the substrate at a time when performing a pixel signal reading operation which reads the charge output from the unit pixel as a pixel signal.

(12)
A signal reading method performed by a solid state imaging apparatus including a pixel array in which a plurality of unit pixels are arranged two-dimensionally,
wherein each pixel includes
a photoelectric conversion element,
a transfer transistor which transfers a charge accumulated in the photoelectric conversion element to floating diffusion,
a reset transistor which resets the charge of the floating diffusion, and
an output transistor which outputs the charge of the floating diffusion,
wherein the floating diffusion of at least one of the plurality of unit pixels is electrically connected via the output transistor, the signal reading method including:
reading an addition signal to which the charge output from the output transistor of the at least one of the plurality of unit pixels is added.

(13)
An electronic apparatus including:
a solid state imaging apparatus including
a pixel array in which a plurality of unit pixels are arranged two-dimensionally, wherein each pixel includes
a photoelectric conversion element,
a transfer transistor which transfers a charge accumulated in the photoelectric conversion element to floating diffusion,
a reset transistor which resets the charge of the floating diffusion, and
an output transistor which outputs the charge of the floating diffusion,
wherein the floating diffusion of at least one of the plurality of unit pixels is electrically connected via the output transistor.

(14)
A solid state imaging apparatus including:
a pixel array in which a plurality of unit pixels are arranged two-dimensionally, wherein each pixel outputs a signal corresponding to a charge accumulated in a photoelectric conversion element;
a vertical signal line formed for each column of the unit pixels; and
an addition signal reading circuit which reads an addition signal by adding the signal output to the vertical signal line of a prescribed column of the unit pixels,
wherein the addition signal reading circuit includes
capacitive elements provided corresponding to the prescribed columns, and an end of each of the capacitive elements is connected to the vertical signal line, and
an output circuit which is connected to another end of each of the capacitive elements and which adds and outputs the signal output to the vertical signal line.

(15)
The solid state imaging apparatus according to (14),
wherein the addition signal reading circuit further includes a switch which electrically connects the vertical signal line and the capacitive element.

(16)
The solid state imaging apparatus according to (14) or (15), further including:
an addition node which adds the signals output from a pixel block which is a set of the unit pixels,
wherein the addition signal reading circuit includes a plurality of the output circuits which add and output the signals from the addition node output to the vertical signal lines for each of a plurality of columns.

(17)
A solid state imaging apparatus including:
a pixel array in which a plurality of unit pixels are arranged two-dimensionally, wherein each pixel includes a photoelectric conversion element, a transfer transistor which transfers a charge accumulated in the photoelectric conversion element to floating diffusion, a reset transistor which resets the charge of the floating diffusion, and an amplification transistor which outputs a signal corresponding to the charge of the floating diffusion; and
a reading circuit which reads addition signals to which charges are added which are output via power supply wiring connected to drains of the reset transistors of the unit pixels arranged in a prescribed region of the pixel array,
wherein the power supply wiring is formed by electrically separating an effective pixel region in which the unit pixels are arranged as effective pixels, and an optical black region in which the unit pixels are arranged as optical black pixels, and
wherein the reading circuit reads each of the addition signals of the effective pixel region and the addition signals of the optical black region.

(18)
The solid state imaging apparatus according to (17), further including:
a vertical signal line formed for each column of the unit pixels; and a load MOS (Metal Oxide Semiconductor) which is connected to the vertical signal line and which constitutes the amplification transistor and a source follower circuit, wherein the load MOS is turned off at a time when the reading circuit reads the addition signal.

(19) The solid state imaging apparatus according to (17) or (18), further including:

a first transistor which connects the power supply wiring of the effective pixel region to a power supply; and a second transistor which connects the power supply wiring of the optical black region to the power supply, wherein the second transistor is configured so that a junction capacity is smaller than that of the first transistor.

(20) The solid state imaging apparatus according to any one of (17) to (19), wherein the power supply wiring of the effective pixel region is configured so that a wiring layout is different from that of the power supply wiring of the optical black region.

The present disclosure contains subject matter related to that disclosed in Japanese Priority Patent Application JP 2012-162688 filed in the Japan Patent Office on Jul. 23, 2021, the entire content of which is hereby incorporated by reference.

What is claimed is:

1. A solid state imaging apparatus, comprising:
a pixel array in which a plurality of unit pixels are arranged two-dimensionally, wherein each pixel includes
a photoelectric conversion element,
a transfer transistor configured to transfer a charge accumulated in the photoelectric conversion element to a floating diffusion,
a reset transistor configured to reset a charge of the floating diffusion, and
an output transistor configured to output the charge of the floating diffusion to an addition node, wherein based on a determination that a trigger pulse is applied to the transfer transistor, a shutter operation is performed, and wherein during the application of the trigger pulse to the transfer transistor, the reset transistor and the output transistor are in a high level state.

2. The solid state imaging apparatus according to claim 1, further comprising:
the addition node configured to add the charge output from the output transistor of the at least one of the plurality of unit pixels; and
an addition signal reading circuit configured to read the charge added in the addition node as an addition signal.

3. The solid state imaging apparatus according to claim 2, wherein the addition node is further configured to add the charges output from the output transistor of each of the plurality of unit pixels in the pixel array.

4. The solid state imaging apparatus according to claim 2, wherein the addition node is provided for each pixel block which is a set of the unit pixels in each region of the pixel array, and is configured to add the charge output from the output transistor of the unit pixels included in the pixel block.

5. The solid state imaging apparatus according to claim 4, wherein each unit pixel further includes an amplification transistor configured to output a signal corresponding to the charge of the floating diffusion, and wherein, for each pixel block, the amplification transistor of a prescribed unit pixel included in the pixel block is configured to output the addition signal to the addition signal reading circuit.

6. The solid state imaging apparatus according to claim 5, wherein a vertical signal line is provided for each column of the unit pixels, and wherein, for each pixel block, the amplification transistor of the prescribed unit pixel included in the pixel block is configured to output the addition signal to the addition signal reading circuit via the vertical signal line.

7. The solid state imaging apparatus according to claim 6, wherein each unit pixel further includes a selection transistor configured to supply an output of the amplification transistor to the vertical signal line, and wherein, for each pixel block, the amplification transistor of the unit pixel including the selection transistor selected by a driving signal supplied to each row of the unit pixels is configured to output the addition signal to the addition signal reading circuit via the vertical signal line.

8. The solid state imaging apparatus according to claim 7, wherein the addition signal reading circuit includes
an A/D convertor connected to the vertical signal line to which the addition signal for each pixel block is output, and
a dummy load connected to the vertical signal line to which the addition signal for each pixel block is not output.

9. The solid state imaging apparatus according to claim 7, wherein the addition signal reading circuit includes an A/D convertor for each column connected to the vertical signal line, and wherein, for each pixel block, the addition signal is output to the A/D convertor connected to the vertical signal line of a column selected by a column selection signal.

10. The solid state imaging apparatus according to claim 1, further comprising:
a substrate potential control circuit is configured to apply a prescribed potential to a substrate on which the pixel array is formed,
wherein the substrate potential control circuit is configured to apply a ground potential to the substrate based on a determination that the shutter operation is performed which discharges the charge accumulated in the photoelectric conversion element, and apply a prescribed positive potential to the substrate based on a determination that an accumulation operation is performed which accumulates the charge in the photoelectric conversion element.

11. The solid state imaging apparatus according to claim 10, wherein the substrate potential control circuit is configured to apply, after the accumulation operation is performed, the ground potential to the substrate based on a determination that a pixel signal reading operation is performed which reads the charge output from the unit pixel as a pixel signal.

12. A signal reading method performed by a solid state imaging apparatus including a pixel array in which a plurality of unit pixels are arranged two-dimensionally, wherein each pixel includes
a photoelectric conversion element,
a transfer transistor configured to transfer a charge accumulated in the photoelectric conversion element to a floating diffusion,
a reset transistor configured to reset a charge of the floating diffusion, and
an output transistor configured to output the charge of the floating diffusion to an addition node, the signal reading method comprising:

performing a shutter operation based on a determination that a trigger pulse is applied to the transfer transistor, wherein during the application of the trigger pulse to the transfer transistor, driving signals in a high level state are applied to the reset transistor and the output transistor.

13. An electronic apparatus, comprising:

a solid state imaging apparatus including a pixel array in which a plurality of unit pixels are arranged two-dimensionally, wherein each pixel includes a photoelectric conversion element, a transfer transistor configured to transfer a charge accumulated in the photoelectric conversion element to a floating diffusion, a reset transistor configured to reset a charge of the floating diffusion, and an output transistor configured to output the charge of the floating diffusion to an addition node, wherein based on a determination that a trigger pulse is applied to the transfer transistor, a shutter operation is performed, and wherein during the application of the trigger pulse to the transfer transistor, the reset transistor and the output transistor are in a high level state.

* * * * *